(12) United States Patent
Truong et al.

(10) Patent No.: US 11,034,796 B1
(45) Date of Patent: Jun. 15, 2021

(54) POLY(ARYLAMINE)S AND USES THEREOF

(71) Applicant: Cornell University, Ithaca, NY (US)

(72) Inventors: Thanh-Tam Truong, Aiken, SC (US); Hector D. Abruna, Ithaca, NY (US); Geoffrey W. Coates, Lansing, NY (US); Brett P. Fors, Ithaca, NY (US)

(73) Assignee: CORNELL UNIVERSITY, Ithaca, NY (US)

( * ) Notice: Subject to any disclaimer, the term of this patent is extended or adjusted under 35 U.S.C. 154(b) by 605 days.

(21) Appl. No.: 15/231,368

(22) Filed: Aug. 8, 2016

Related U.S. Application Data

(60) Provisional application No. 62/202,040, filed on Aug. 6, 2015.

(51) Int. Cl.
| | | |
|---|---|---|
| C08G 73/02 | (2006.01) | |
| H01G 11/48 | (2013.01) | |
| H01G 11/28 | (2013.01) | |
| H01M 4/60 | (2006.01) | |
| H01M 4/04 | (2006.01) | |
| H01M 4/137 | (2010.01) | |
| H01M 4/1399 | (2010.01) | |

(52) U.S. Cl.
CPC ......... *C08G 73/0253* (2013.01); *C08G 73/02* (2013.01); *H01G 11/28* (2013.01); *H01G 11/48* (2013.01); *H01M 4/0466* (2013.01); *H01M 4/137* (2013.01); *H01M 4/1399* (2013.01); *H01M 4/606* (2013.01)

(58) Field of Classification Search
CPC ................ C08G 73/02; C08G 73/0253; C08G 73/0273; C08G 73/0266
See application file for complete search history.

(56) References Cited

U.S. PATENT DOCUMENTS

| | | | |
|---|---|---|---|
| 4,940,517 A | 7/1990 | Wei | |
| 5,006,633 A * | 4/1991 | Shikatani | C08G 73/02 528/230 |
| 5,282,955 A | 2/1994 | Leventis et al. | |
| 5,421,982 A * | 6/1995 | Ikeda | C08F 220/54 204/403.02 |
| 5,486,439 A * | 1/1996 | Sakakibara | C08G 64/12 430/58.45 |

(Continued)

FOREIGN PATENT DOCUMENTS

| | | |
|---|---|---|
| EP | 0348795 | 1/1990 |
| JP | 6068973 B * | 8/1994 |

(Continued)

OTHER PUBLICATIONS

JP-6068973-B Original and Translation from Patentscope (Year: 1994).*

(Continued)

*Primary Examiner* — Barbara L Gilliam
*Assistant Examiner* — Nathanael T Zemui
(74) *Attorney, Agent, or Firm* — Johnson, Marcou, Issacs & Nix, LLC; Paul J. Roman, Jr., Esq.

(57) ABSTRACT

Provided are poly(arylamine)s. The polymers can be redox active. The polymers can be used as electrode materials in, for example, electrochemical energy storage systems. The polymers can be made by electropolymerization on a conducting substrate (e.g., a current collector).

31 Claims, 51 Drawing Sheets
(22 of 51 Drawing Sheet(s) Filed in Color)

- deposition of polymer film directly onto conductive substrates
- theoretical capacities: 170-224 mA h g$^{-1}$
- two reversible redox couples, E >3.3 V
- electrochromic polymer

(56) References Cited

U.S. PATENT DOCUMENTS

| | | |
|---|---|---|
| 7,056,675 B2 | 6/2006 | Samuelson et al. |
| 7,082,027 B2 | 7/2006 | Nobuta et al. |
| 2002/0086203 A1 | 7/2002 | Nobuta et al. |
| 2003/0055212 A1 | 3/2003 | Freund et al. |
| 2011/0175069 A1* | 7/2011 | Son .................. C08G 61/12 257/40 |
| 2011/0278175 A1 | 11/2011 | Whitcombe et al. |
| 2014/0220455 A1* | 8/2014 | Lee .................. H01M 4/386 429/331 |
| 2015/0108413 A1* | 4/2015 | Gutel ............. H01M 4/0466 252/511 |
| 2016/0128187 A1 | 5/2016 | Liou et al. |
| 2016/0268508 A1* | 9/2016 | Kim .................. H01L 51/006 |
| 2016/0315259 A1* | 10/2016 | Fennimore ......... H01L 51/56 |
| 2017/0263934 A1* | 9/2017 | Schmuck ........... H01M 4/364 |

FOREIGN PATENT DOCUMENTS

| | | | |
|---|---|---|---|
| WO | 9614343 | 5/1996 | |
| WO | 9855532 | 12/1998 | |
| WO | 20111178871 | 9/2011 | |
| WO | 2013028061 | 2/2013 | |
| WO | WO-2015089304 A1 * | 6/2015 | ............. H01L 51/56 |
| WO | 2015153989 | 10/2015 | |

OTHER PUBLICATIONS

Nonezyan et. al; "Synthesis and conversion of β,γ-unsaturated amines. XXVIII. Reaction of secondary diamines with trans-1,4-dihalogen-2-butenes"; USSR Source: Armyanskii Khimicheskii Zhurnal (1975), 28(9), 730-4 (Year: 1975).*

Chuang, Polymides based on 2,2',6,6'-tetramethylbenzidine, High Performance Polymers, vol. 7, No. 1, pp. 81-92 Feb. 1, 1995.

Chandrasekhar, et al., Electrosyntheses, Spectroelectrochemical, Electrochemical, and Chronovoltabsorptometric Properties of Family of Poly (aromatic Amines), Novel Processible Conducting Polymers, J. Electrochem. Soc., vol. 138, No. 5, pp. 1337-1346 May 1, 1991.

Ekinci, et al., Preparation and Properties of Polybenzidine Film-Coated Electrode as an H2O2 Selective Polymeric Material, Journal of Applied Polymer Science, vol. 70, pp. 2227-2234 Jan. 23, 1998.

Marfurt, et al, Stabilization of tetramethylbenzidine (TMB) reaction product at the electron microscopic level by ammonium molybdate, Journal of Neuroscience Methods, vol. 25, pp. 215-223 May 15, 1988.

D'eramo, et al, Preparation and electrochemical behavior of conducting films obtained by electropolymerization of benzidine in aqueous media, Journal of Electroanalytical Chemistry, vol. 382, pp. 85-95 Feb. 1, 1995.

* cited by examiner

R = Me, Bu, Ph, p-PhBu

POLY(ARYLAMINE)S AND USES THEREOF

CROSS REFERENCE TO RELATED APPLICATIONS

This application claims priority to U.S. Provisional Application No. 62/202,040, filed on Aug. 6, 2015, the disclosure of which is hereby incorporated by reference.

STATEMENT REGARDING FEDERALLY SPONSORED RESEARCH

This invention was made with government support under Grant No. N00014-14-10551 awarded by the Office of Naval Research and Grant No. DGE-0903653 awarded by the National Science Foundation Integrative Graduate Education and Research Traineeship (IGERT) program. The government has certain rights in the invention.

FIELD OF THE DISCLOSURE

The disclosure generally relates to redox active polymers and uses thereof. More particularly the disclosure generally relates to poly(arylamine)s and uses thereof.

BACKGROUND OF THE DISCLOSURE

The demand for and integration of sustainable energy technologies and the intermittent nature of renewable energy sources, such as solar and wind, promotes the advancement of electrochemical energy storage (EES) systems.

Lithium ion batteries (LIBs) are employed in a wide range of applications, from portable electronics and electric vehicles to grid energy storage, due to their high energy and power densities. However, current LIBs do not meet the performance requirements for future applications, especially automotive and grid applications. The disparity between conventional cathodes (e.g. $LiCoO_2$, $LiFePO_4$) and anodes (e.g. $LiC_6$) in terms of capacity, cost and abundance, motivates research on alternative cathode materials such as organic compounds. Organic molecules are especially attractive for EES applications because they may be designed and tuned to be light weight and capable of multiple electron transfers at high potentials, thereby maximizing gravimetric capacity and energy density to potentially achieve values greater than commercial LIBs (>160 mA h $g^{-1}$, >250 W h $kg^{-1}$), although at lower volumetric energy densities.

The demand for higher performing electrochemical energy storage (EES) systems for portable electronics, electric vehicles, and grid energy storage has motivated researchers to investigate materials with higher energy and power densities. In the field of organic electrodes, thin electroactive polymer films have attracted interest as electrodes in flexible batteries for wearable technologies and microbatteries for miniaturized electronic devices. Due to the diversity of organic redox-active compounds, there are a variety of types of organic electrode materials that can be applied to EES devices, including electronically conducting polymers, organosulfur compounds, stable radicals, and carbonyl-based compounds. Organic compounds are a promising class of materials for EES devices, such as batteries and supercapacitors, due to their abundance, light weight, and diverse and tuneable structures. Their charge/discharge rates are not kinetically limited by metal ion insertion reactions like many inorganic materials (e.g. $LiCoO_2$), and can thus be used in high power applications.

A strategy to improve the performance of EES devices is to develop better cathode materials since current devices are limited, in general, by the cathode capacity. Low molar mass organic compounds that undergo multiple electron transfer processes at high redox potentials have higher theoretical capacities (>160 mA h $g^{-1}$) and energy densities (>550 W h $kg^{-1}$) than many commercial inorganic cathode materials, although they have lower volumetric energy densities.

Thin films of redox-active amorphous polymers are mechanically flexible and can have high power densities because of the short ion transport lengths and the fact that charge/discharge processes do not involve intercalation. Conducting polymers (e.g. polypyrrole) and radical polymers have been employed as cathodes in paper-based batteries. The conductivity and insolubility of conducting polymers are attractive features but their small capacities, due to low doping levels and sloping charge/discharge curves, limit their usefulness. Nitroxide-based polymers are stable for hundreds of cycles, but they typically undergo only one electron transfer per repeat unit, and consequently, have limited specific capacity. The practical use of organic materials requires the development of electrodes with better performance.

SUMMARY OF THE DISCLOSURE

The present disclosure provides poly(arylamine)s, methods of making the polymers, and methods of making electrodes comprising the polymers. The polymers of the present disclosure/materials comprising one or more polymer of the present disclosure are attractive for numerous applications including, for example, electrical energy storage, electrochromics, redox mediators for electrosynthesis and (bio) sensor applications. The polymers can be redox active polymers.

In an aspect, the present disclosure provides films and thin films comprising one or more polymers of the present disclosure. An electrode can comprise one or more polymer of the present disclosure.

In an aspect, the present disclosure provides methods of making electrodes using polymers of the present disclosure. For example, an electrode is made by electropolymerization of a polymer on a substrate (e.g., a current collector).

In an aspect, the present disclosure provides uses of polymers of the present disclosure. For example, the polymers can be used in devices and as redox mediators for electrocatalysis. In an example, a device comprises one or more thin film comprising a polymer of the present disclosure. Examples of devices include, but are not limited to, electrochemical energy storage (EES) systems, electrochromic devices, biosensors (e.g., amperometric biosensors), and switching devices.

BRIEF DESCRIPTION OF THE FIGURES

The patent or application file contains at least one drawing executed in color. Copies of this patent or patent application publication with color drawing(s) will be provided by the Office upon request and payment of the necessary fee.

For a fuller understanding of the nature and objects of the disclosure, reference should be made to the following detailed description taken in conjunction with the accompanying figures.

Figure 28:
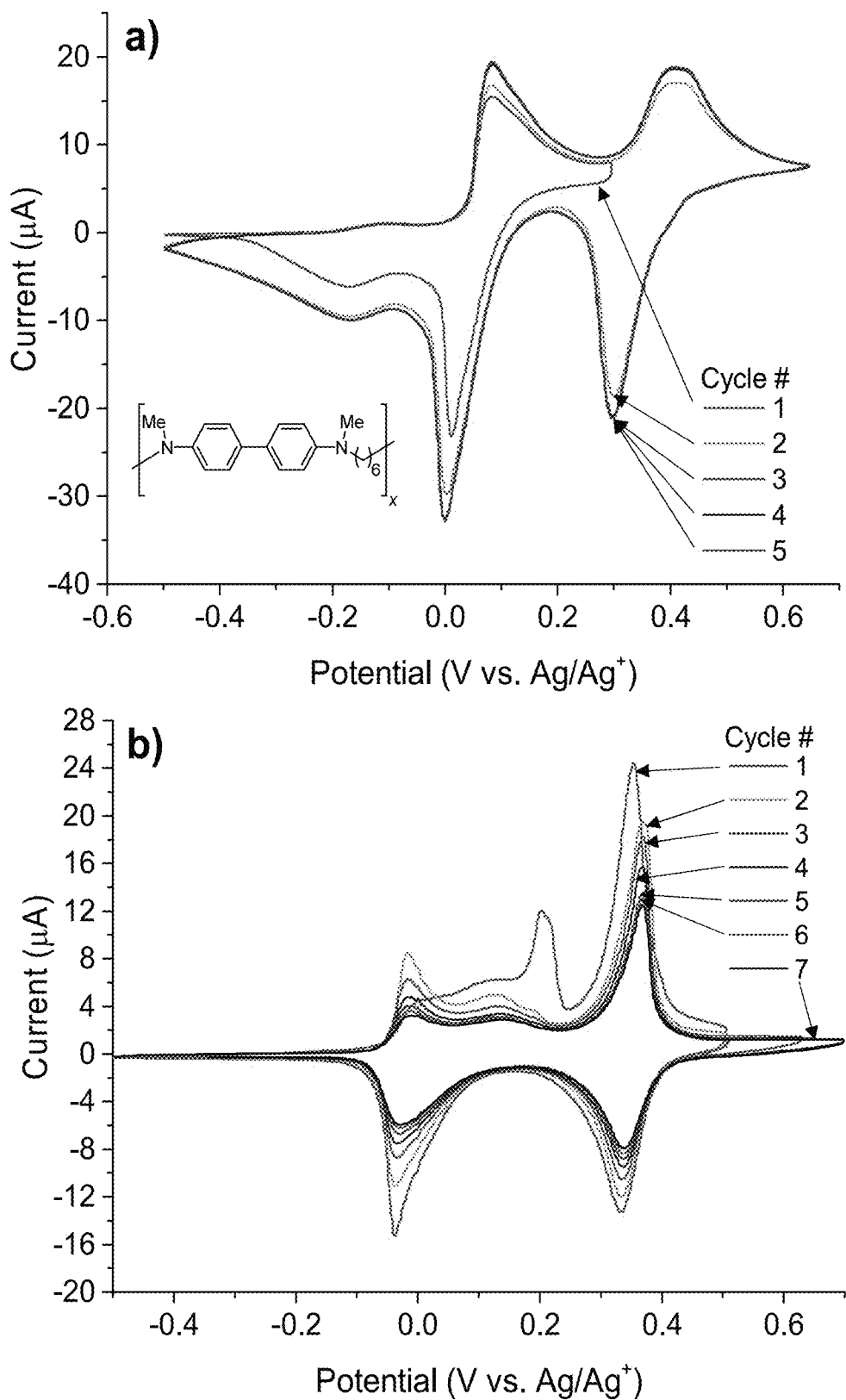

FIG. 28 shows (a) A polymer film of poly(1d-2c) was adsorbed onto GCE by 5 CV cycles in 4 mM concentration in repeat unit of poly(1d-2c) in 0.1 M [NBu$_4$][ClO$_4$]/ CH$_2$Cl$_2$. (b) The CV of the modified electrode from a) cycled in 0.1 M [NBu$_4$][ClO$_4$]/CH$_3$CN at 20 mV s$^{-1}$.

Figure 29:
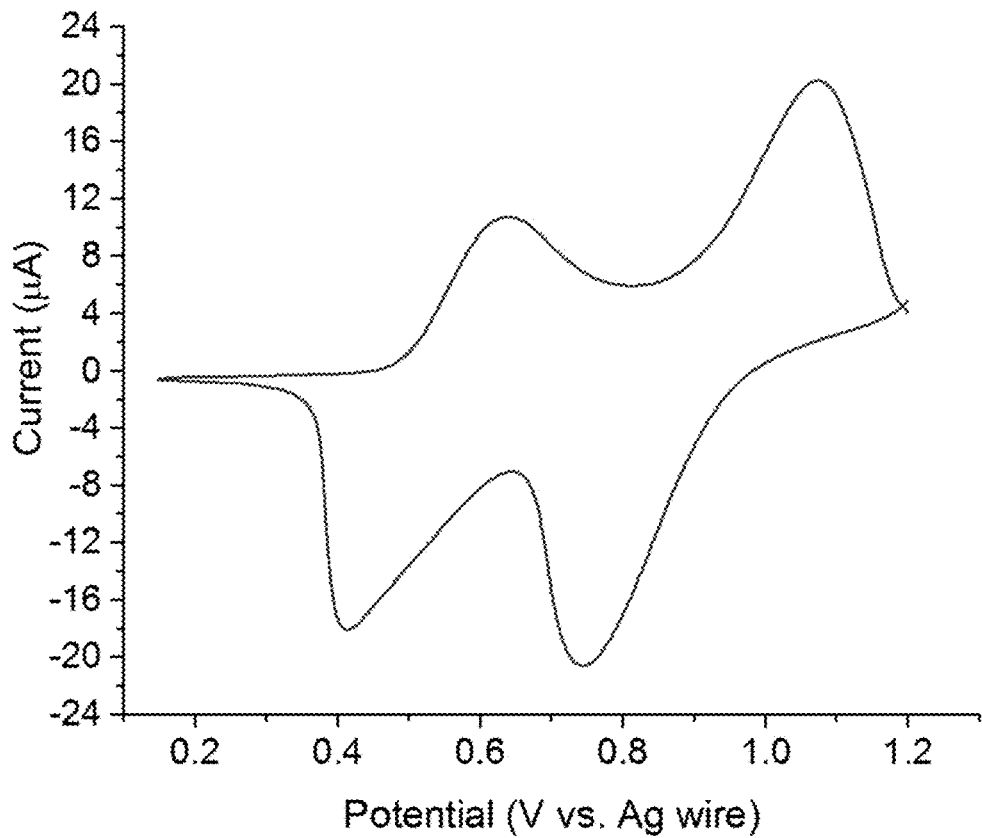

FIG. 29 shows a polymer film of poly(1d-2c) cycled in 0.1 M LiPF$_6$/tetraglyme at 50 mV s$^{-1}$.

Figure 30:
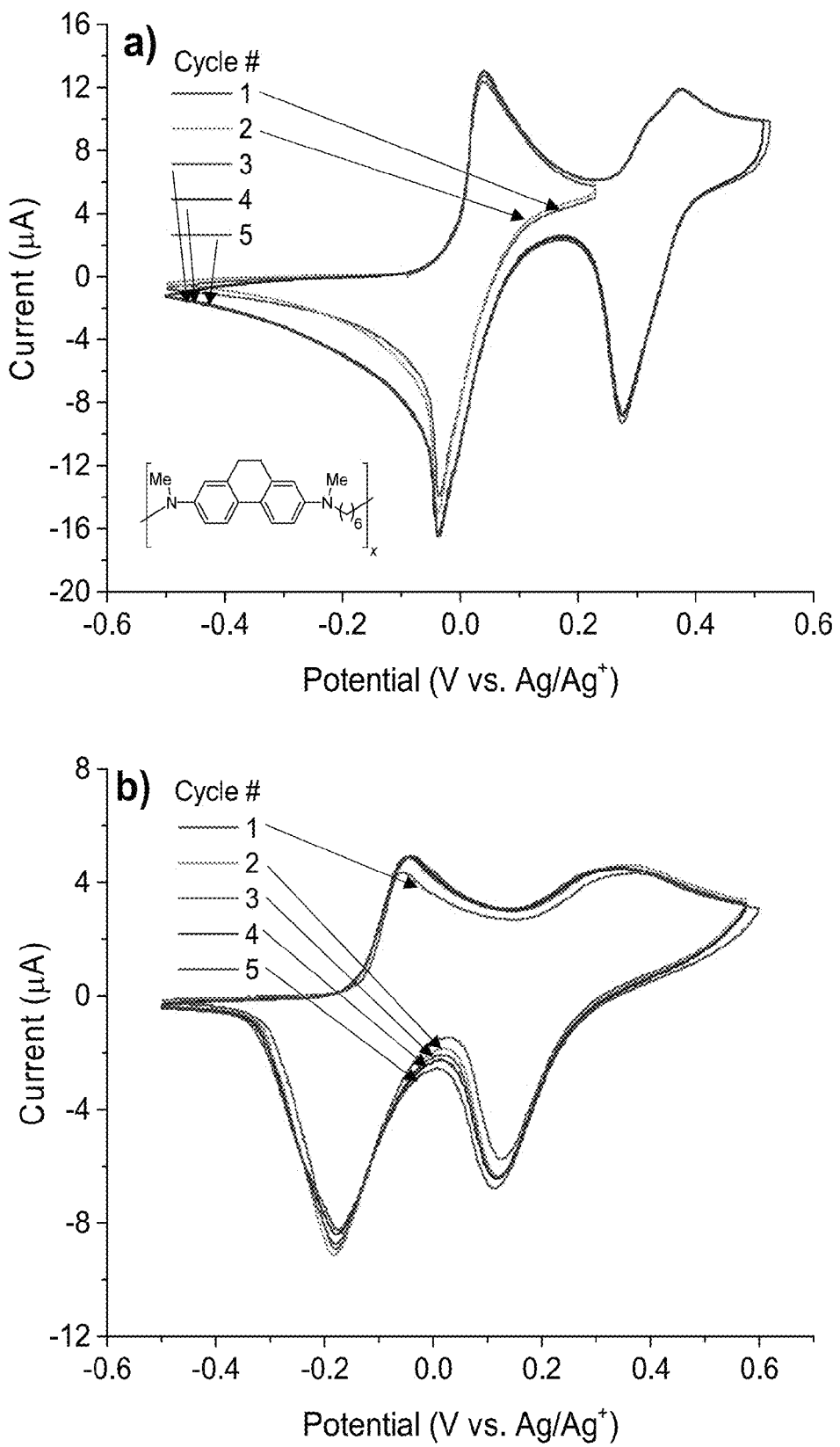

FIG. 30 shows (a) a polymer film of poly(1d-2d) was adsorbed onto GCE by 5 CV cycles in 4 mM concentration in repeat unit of poly(1d-2d) in 0.1M [NBu$_4$][ClO$_4$]/ CH$_2$Cl$_2$. (b) The CV of the modified electrode from (a) cycled in 0.1 M LiClO$_4$/tetraglyme at 20 mV s$^{-1}$.

Figure 31:
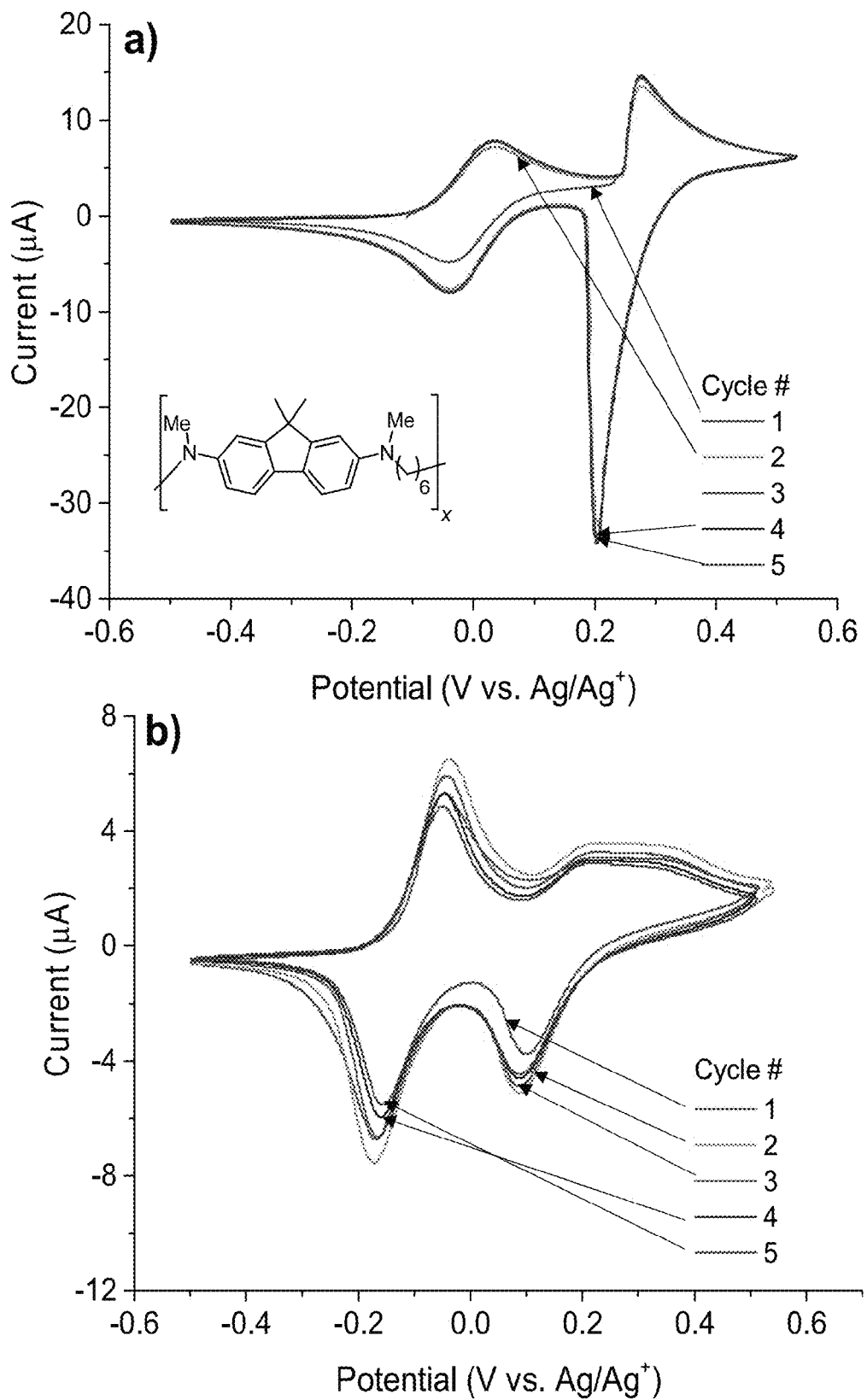

FIG. 31 shows (a) a polymer film of poly(1d-2e) was adsorbed onto GCE by 5 CV cycles in 4 mM concentration in repeat unit of poly(1d-2e) in 0.1 M [NBu$_4$][ClO$_4$]/ CH$_2$Cl$_2$. (b) The CV of the modified electrode from (a) cycled in 0.1 M LiClO$_4$/tetraglyme at 20 mV s$^{-1}$.

Figure 32:
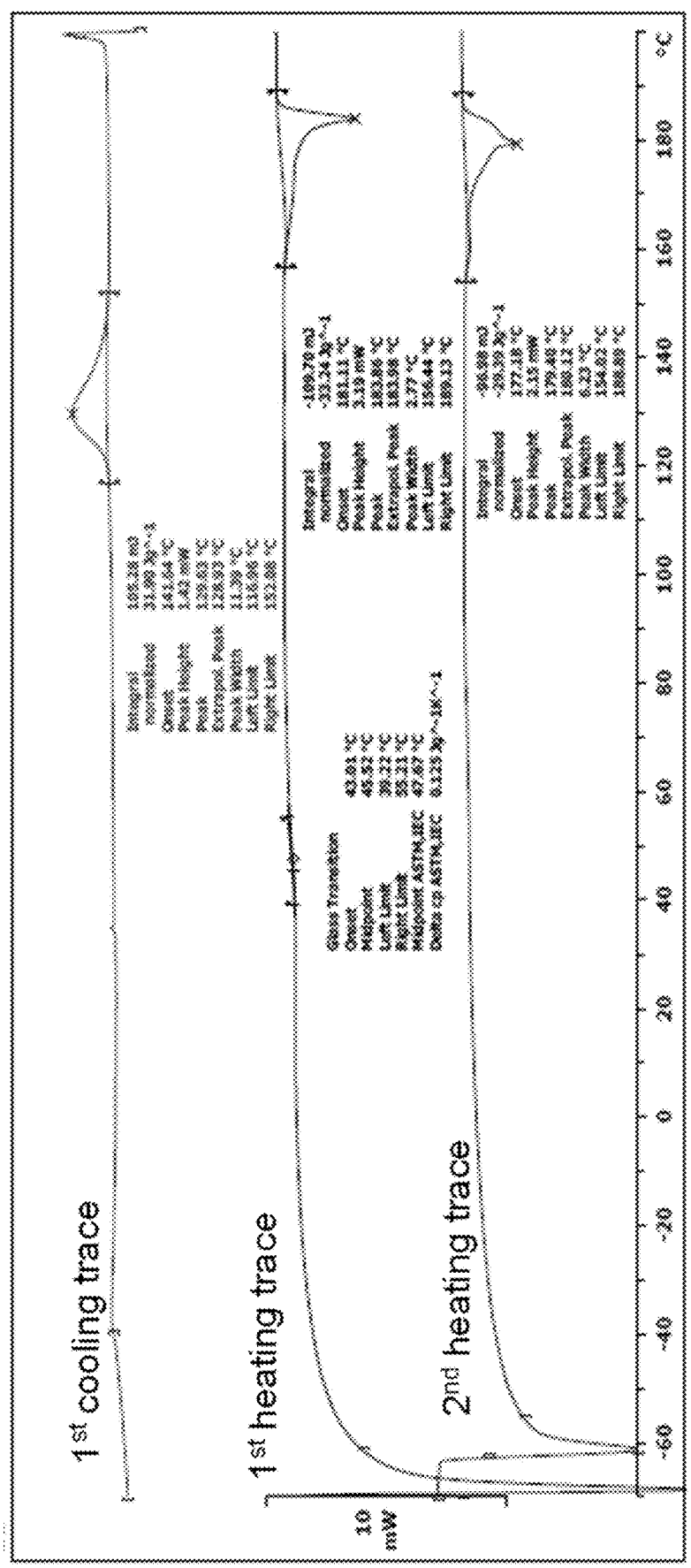

FIG. 32 shows a DSC thermogram for Poly(1a-2a) (Table 1, entry 1)

Figure 33:
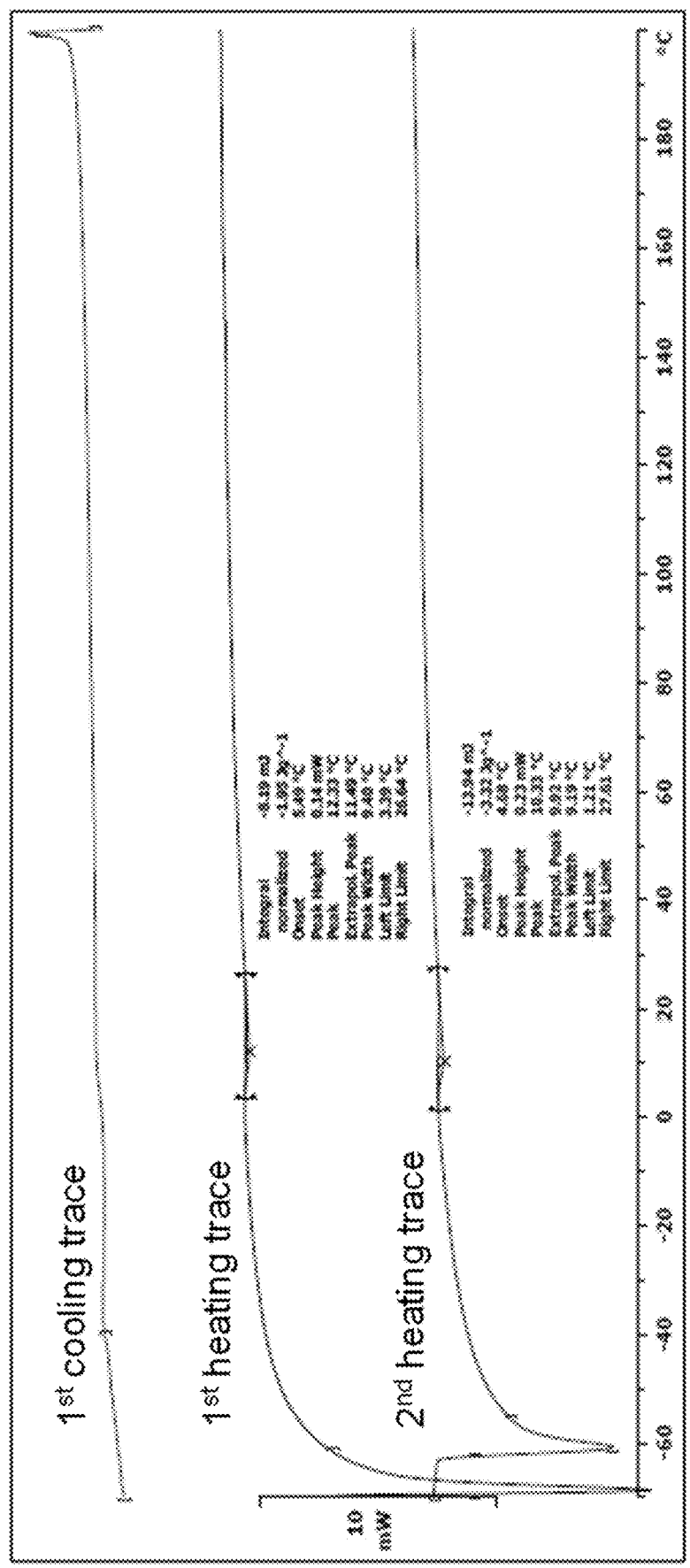

FIG. 33 shows a DSC thermogram for Poly(1b-2a) (Table 1, entry 2)

Figure 34:
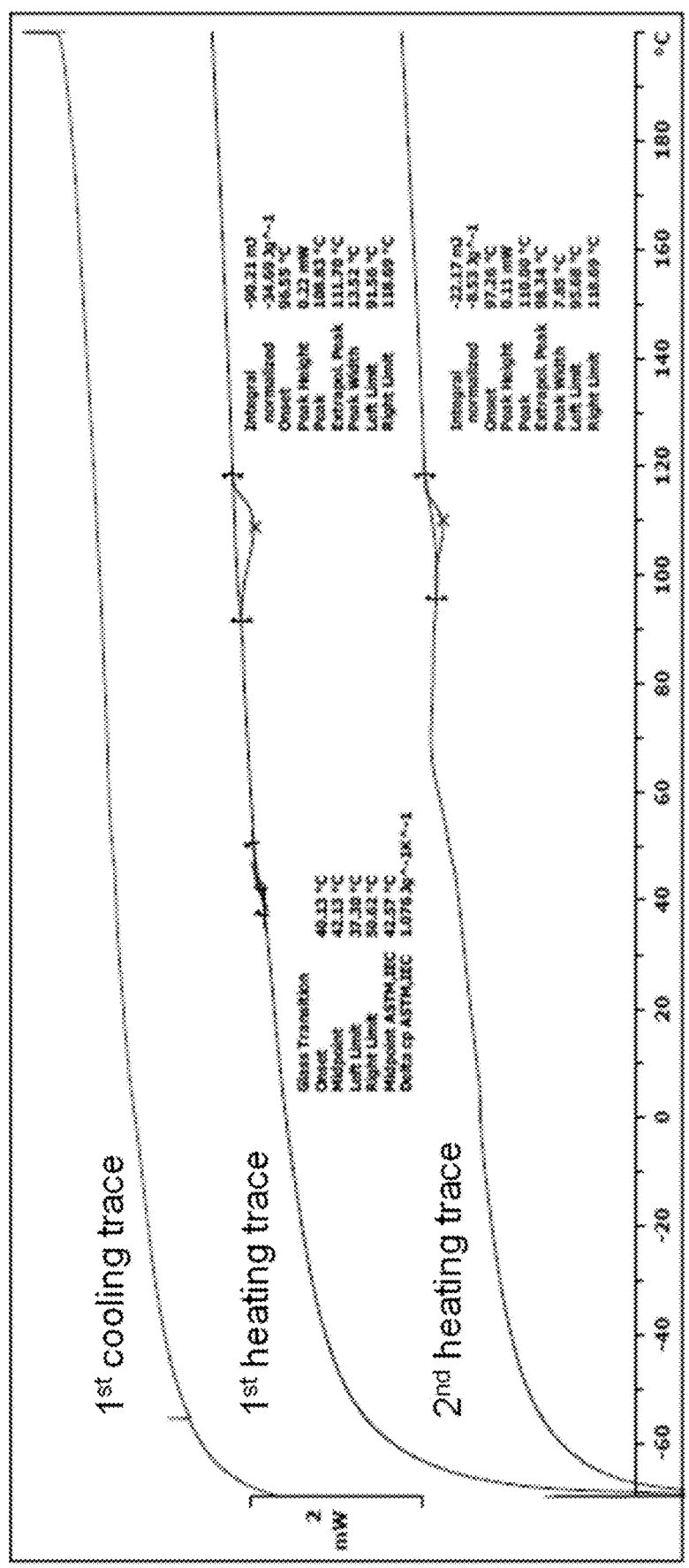

FIG. 34 shows a DSC thermogram for Poly(1c-2a) (Table 1, entry 3)

Figure 35:
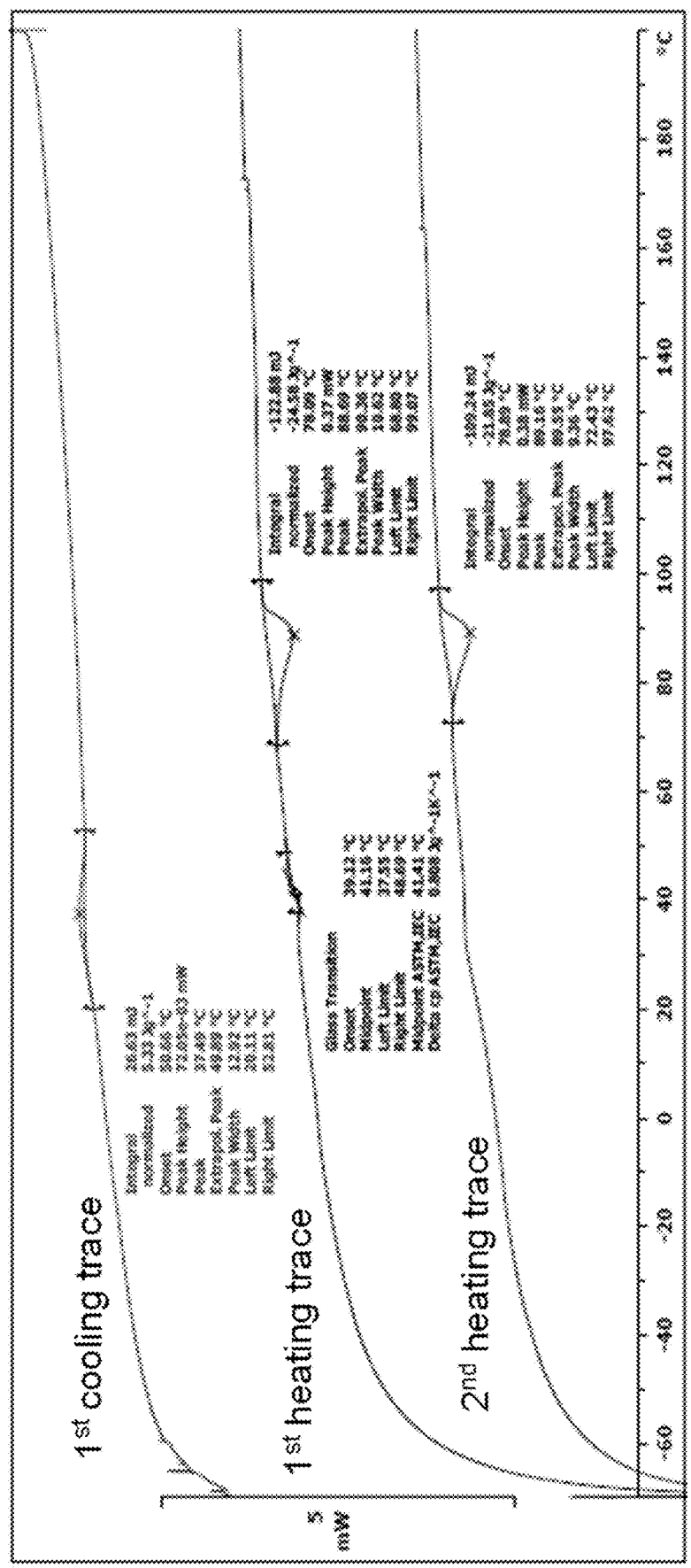

FIG. 35 shows a DSC thermogram for Poly(1d-2a) (Table 1, entry 4)

Figure 36:
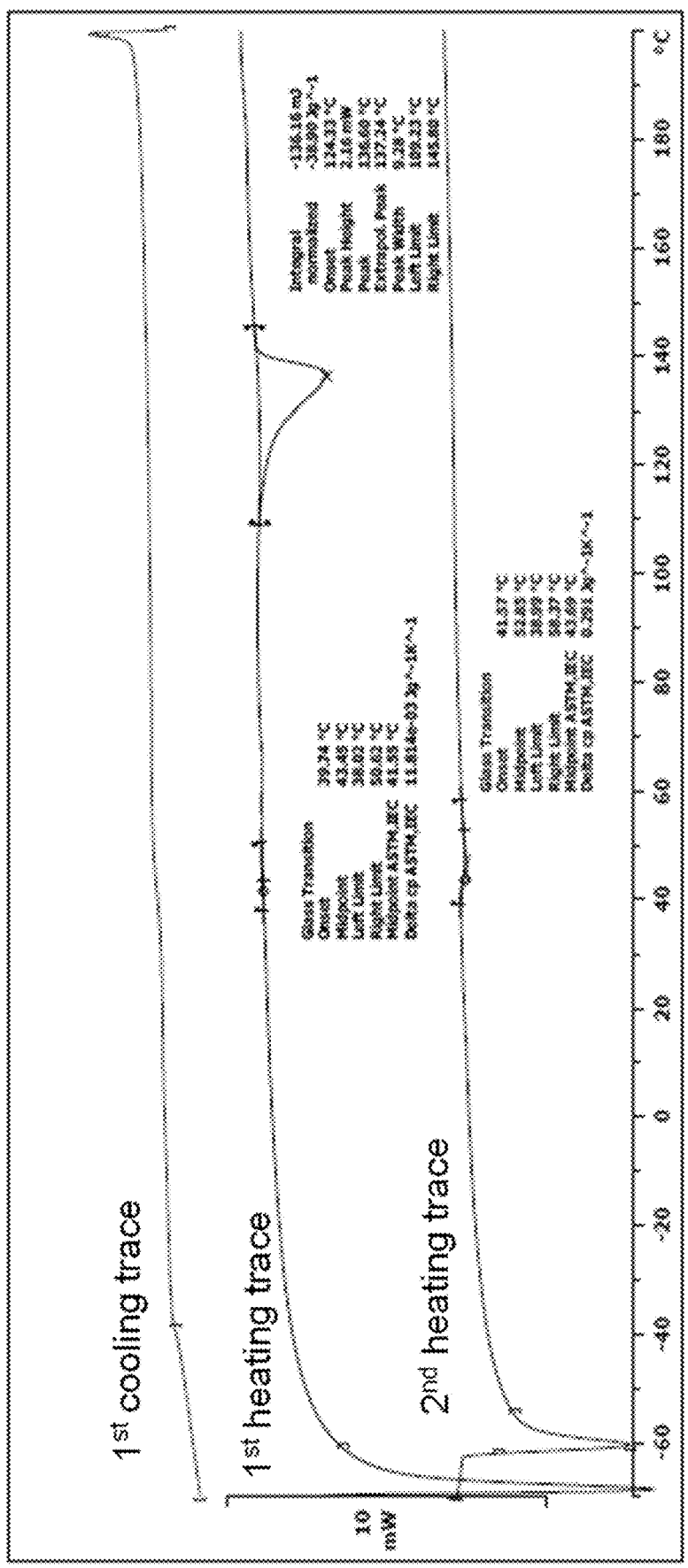

FIG. 36 shows a DSC thermogram for Poly(1d-2b) (Table 2, entry 1)

Figure 37:
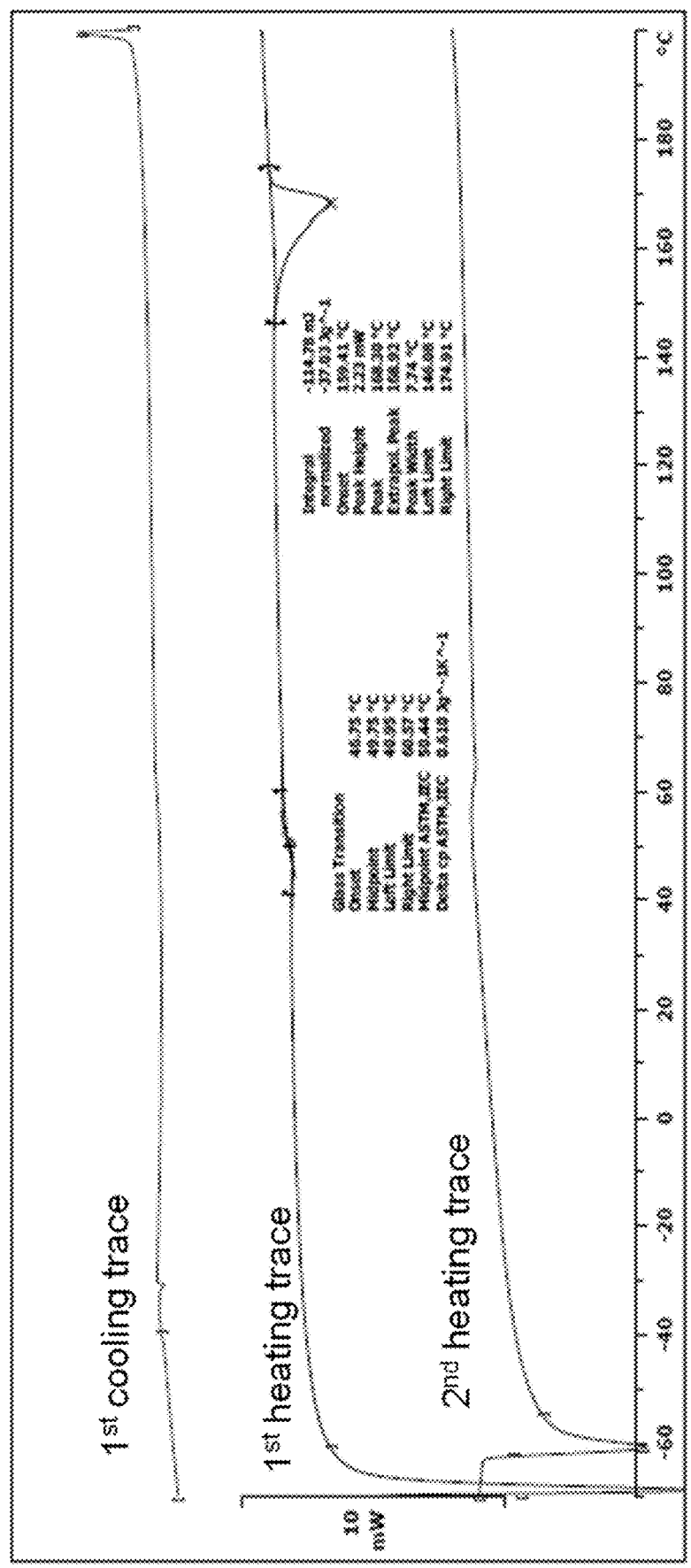

FIG. 37 shows a DSC thermogram for Poly(1d-2c) (Table 2, entry 2)

Figure 38:
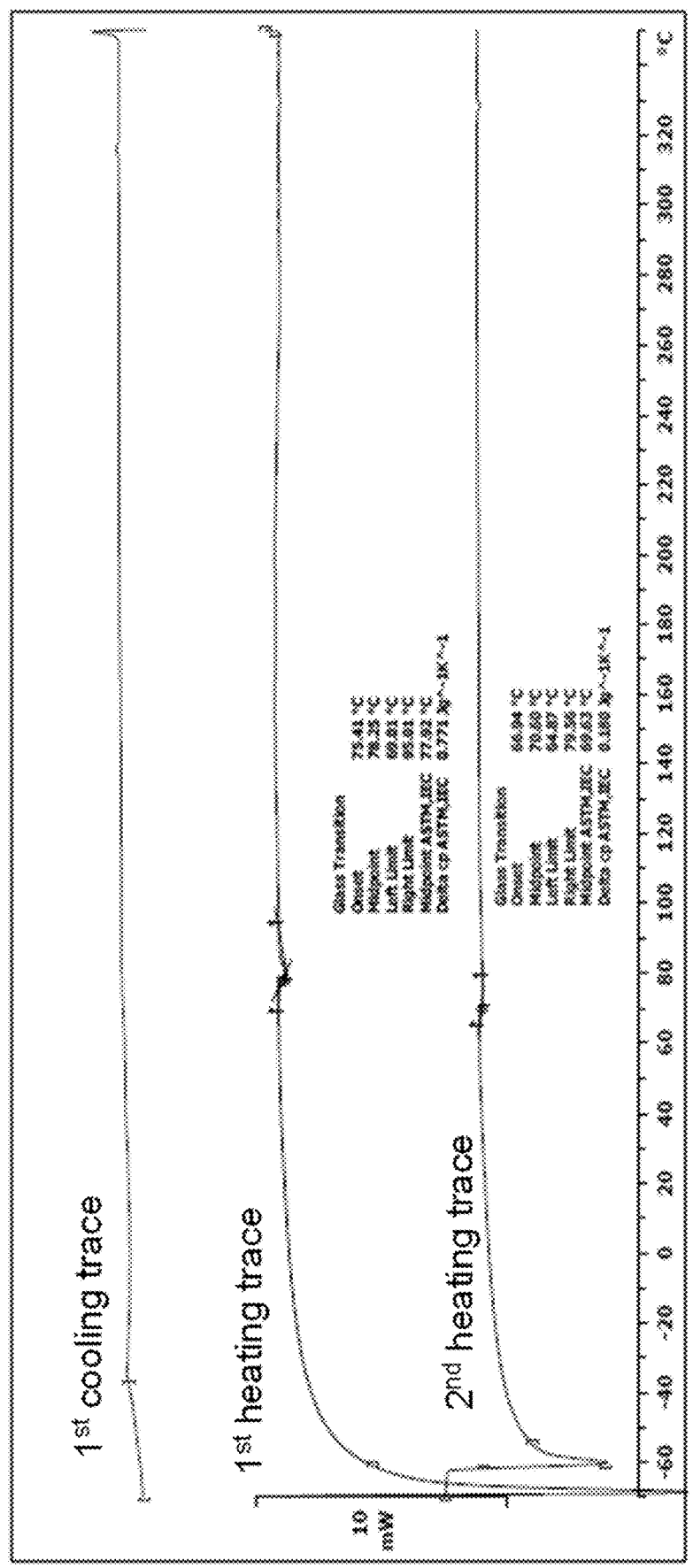

FIG. 38 shows a DSC thermogram for Poly(1d-2d) (Table 1, entry 3)

Figure 39:
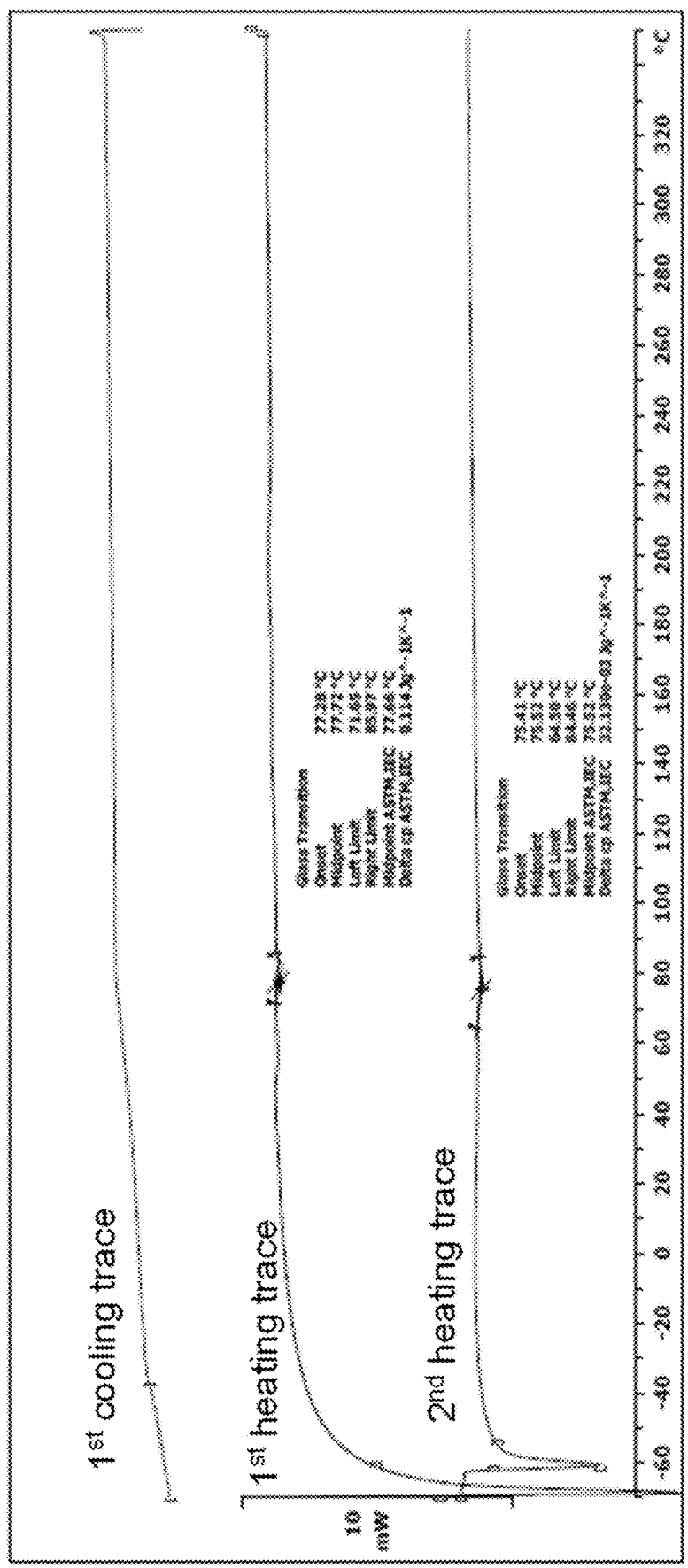

FIG. 39 shows a DSC thermogram for Poly(1d-2e) (Table 1, entry 4)

Figure 40:
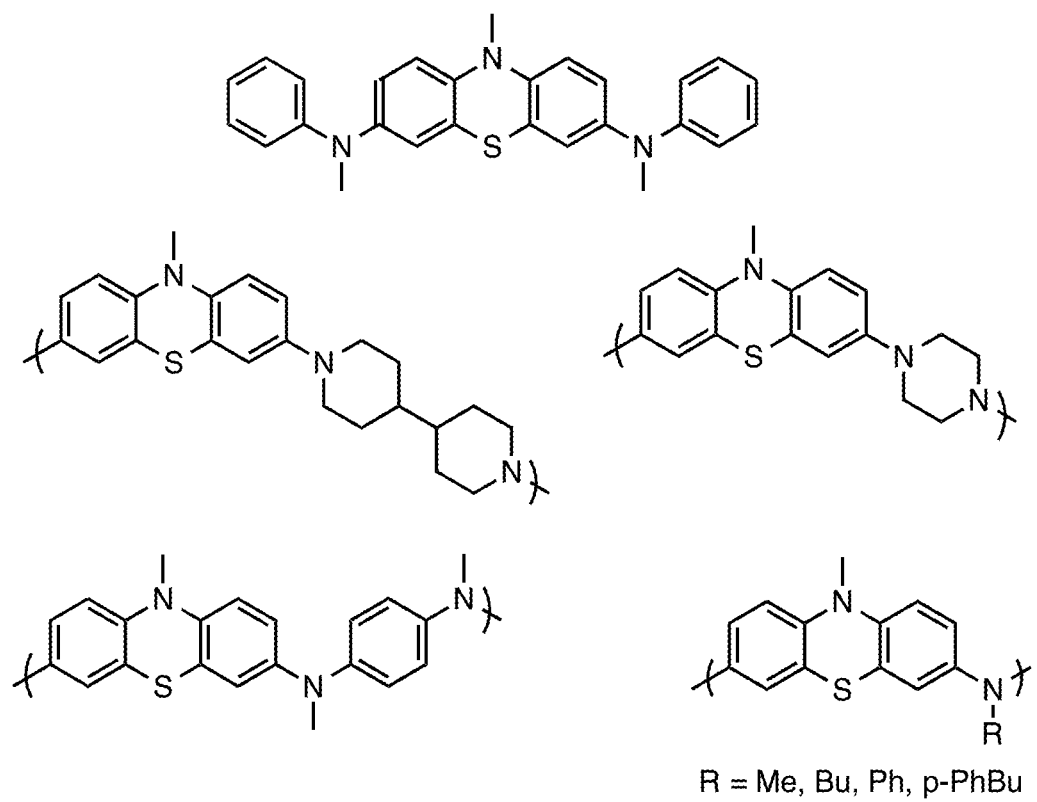

FIG. 40 shows examples of a monomer and polymers of the present disclosure.

Figure 41:
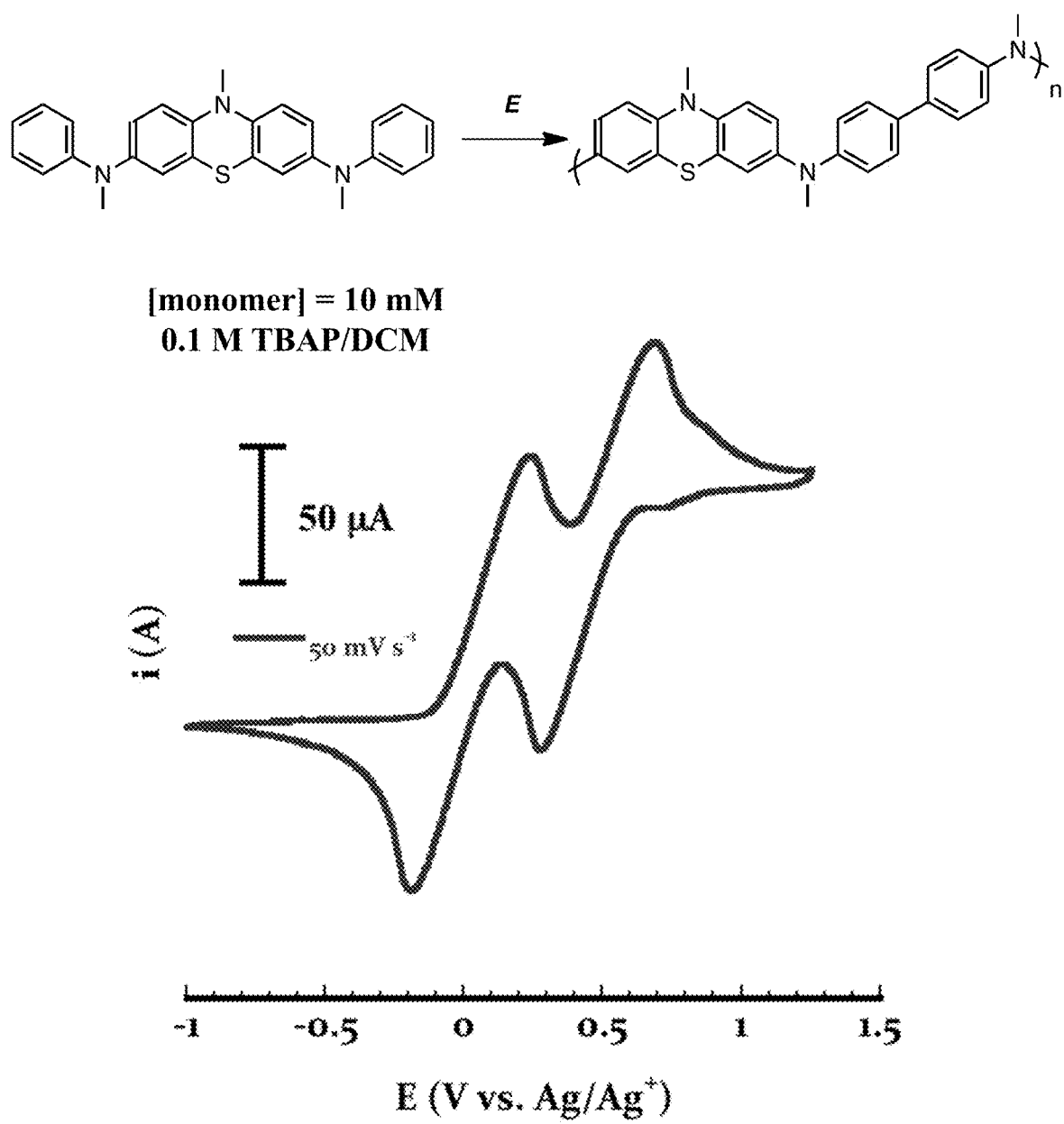

FIG. 41 shows an example of a polymerization to form a polymer of the present disclosure and a CV obtained during the polymerization process.

Figure 42:
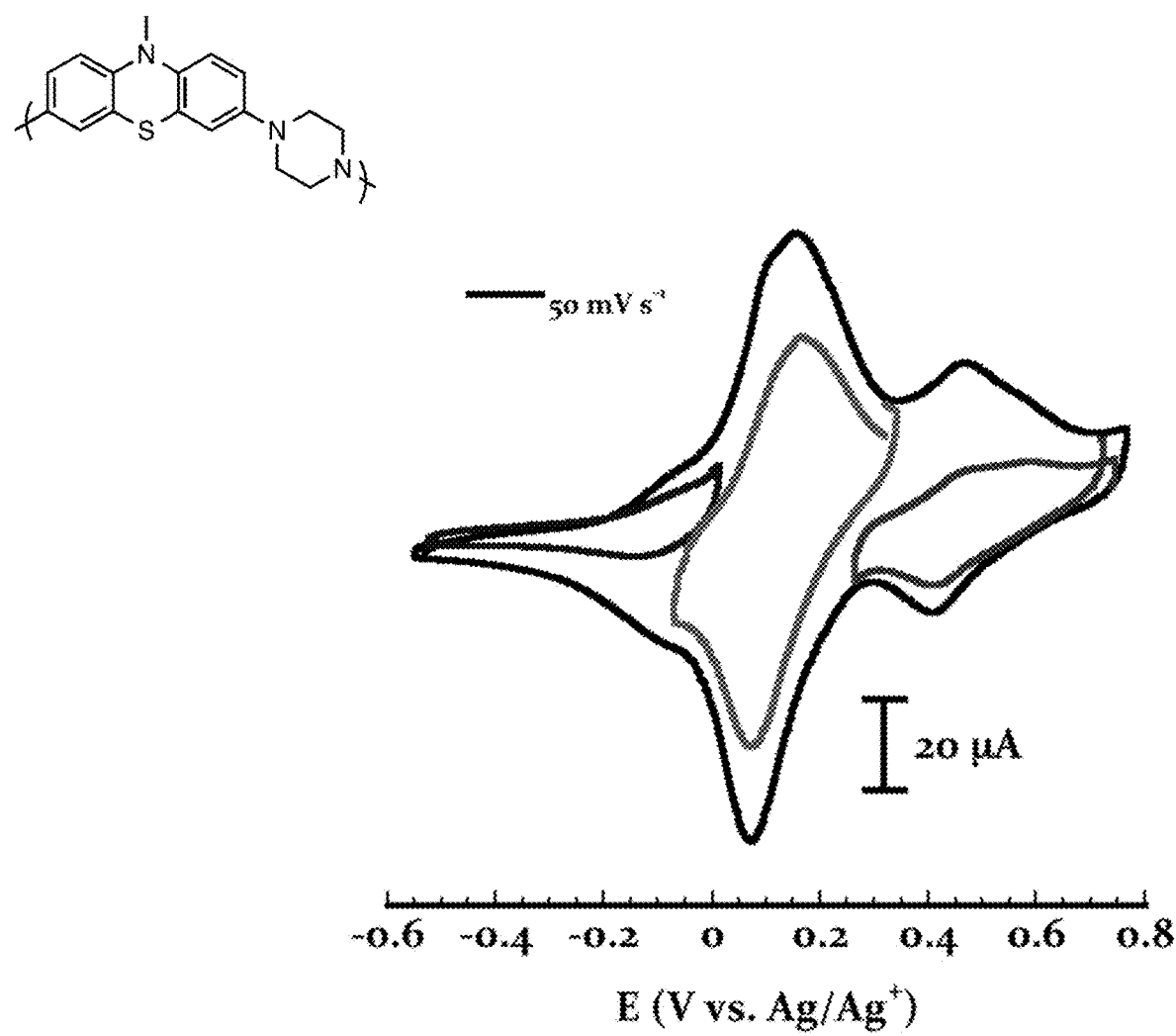

FIG. 42 shows an example of CV characterization of a polymer of the present disclosure.

Figure 43:
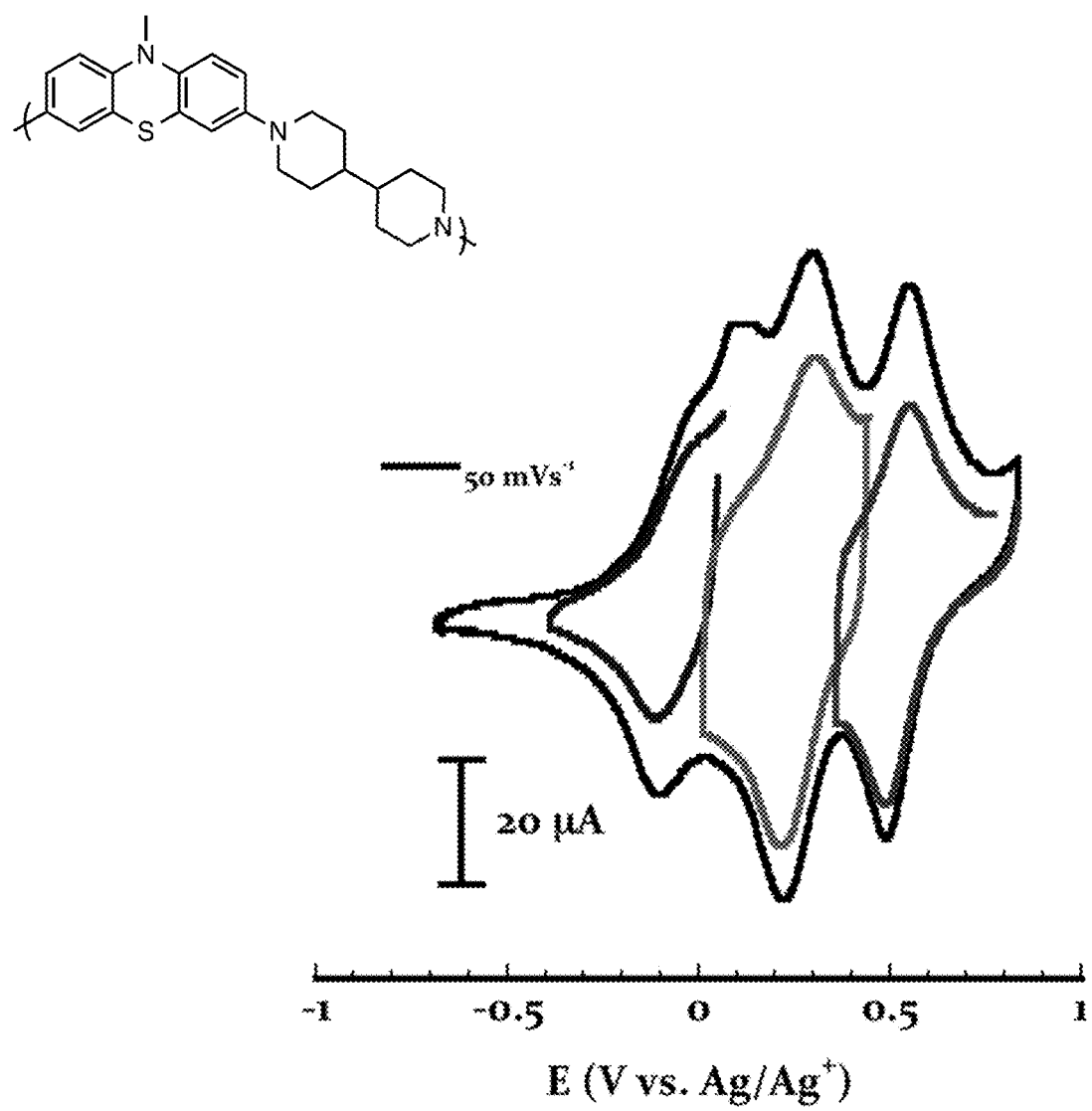

FIG. 43 shows an example of CV characterization of a polymer of the present disclosure.

Figure 44:
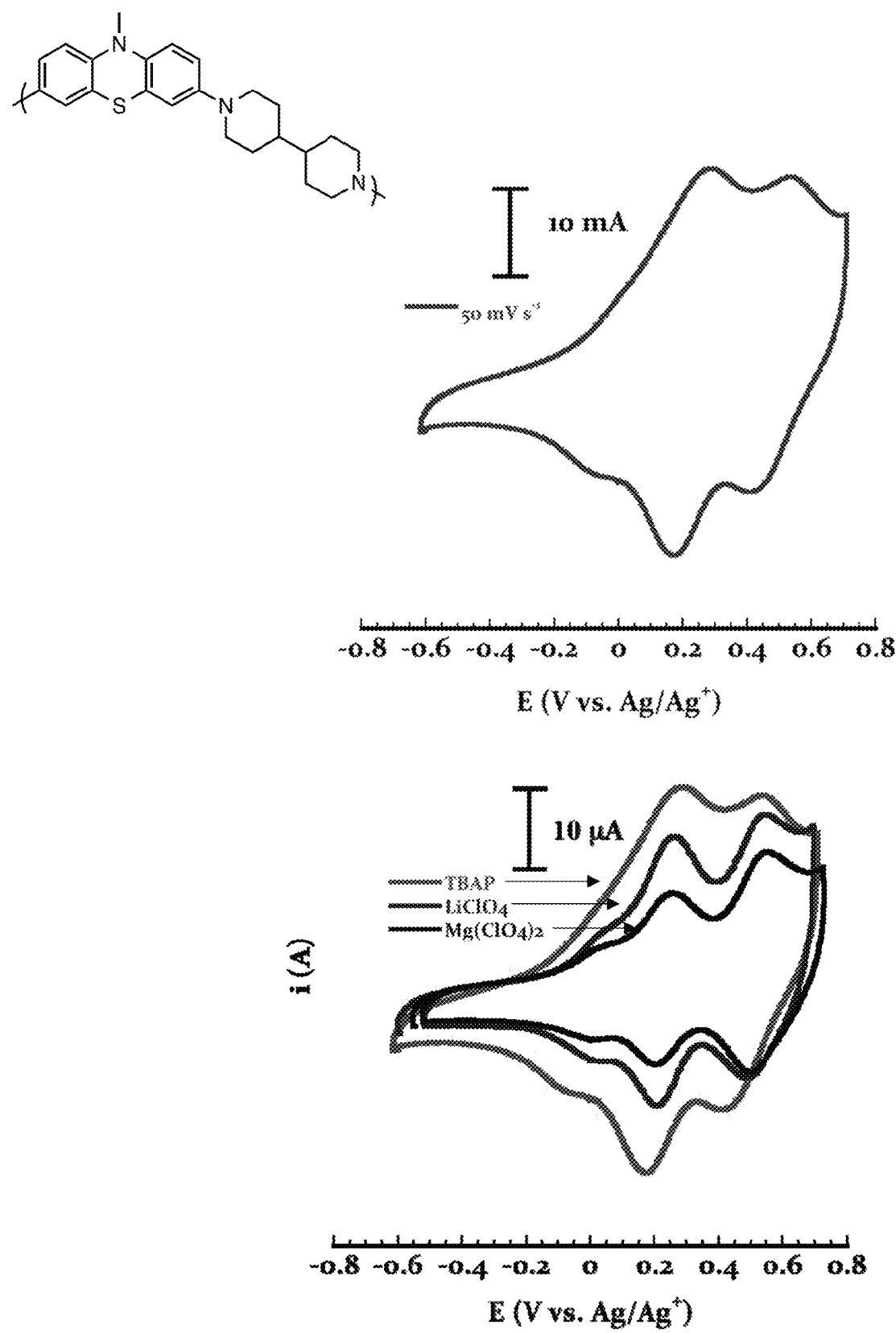

FIG. 44 shows an example of CV characterization of a polymer of the present disclosure.

Figure 45:
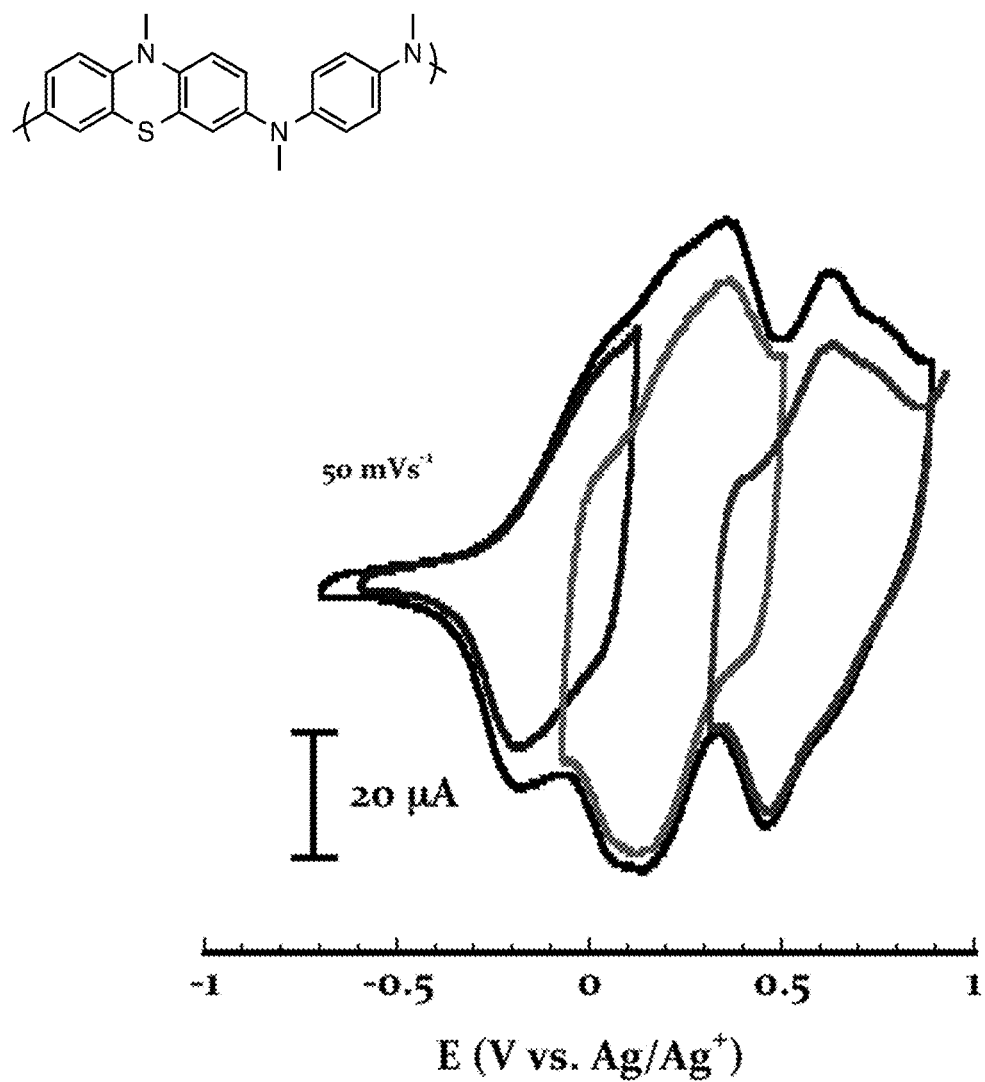

FIG. 45 shows an example of CV characterization of a polymer of the present disclosure.

Figure 46:
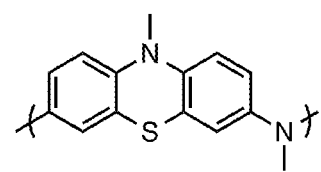
Figure 46:
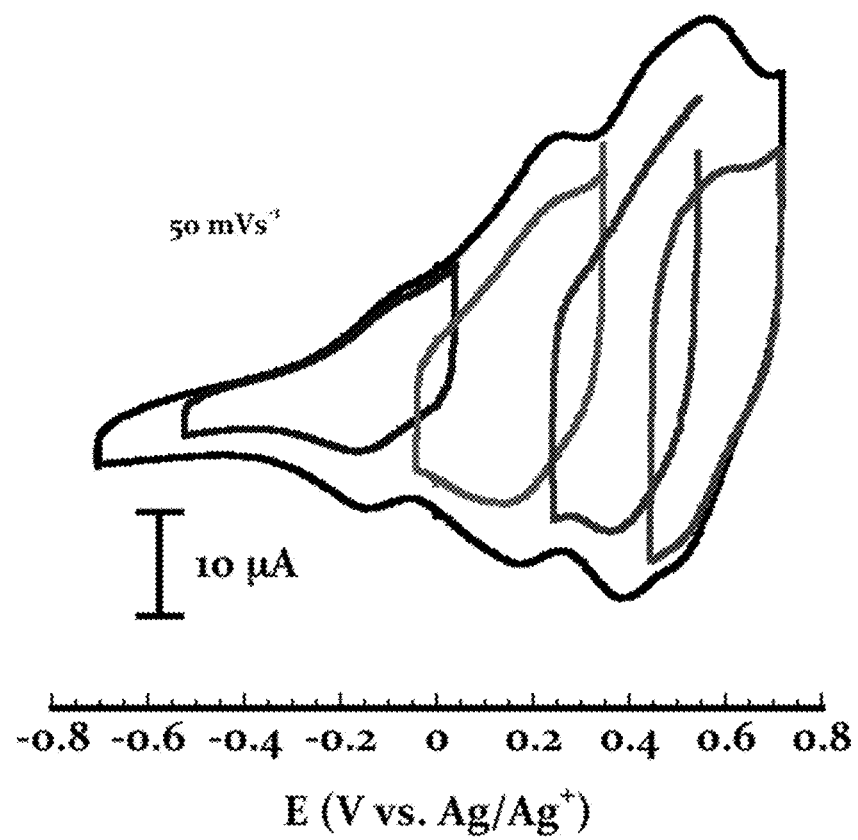

FIG. 46 shows an example of CV characterization of a polymer of the present disclosure.

Figure 47:
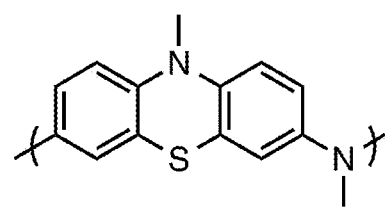
Figure 47:
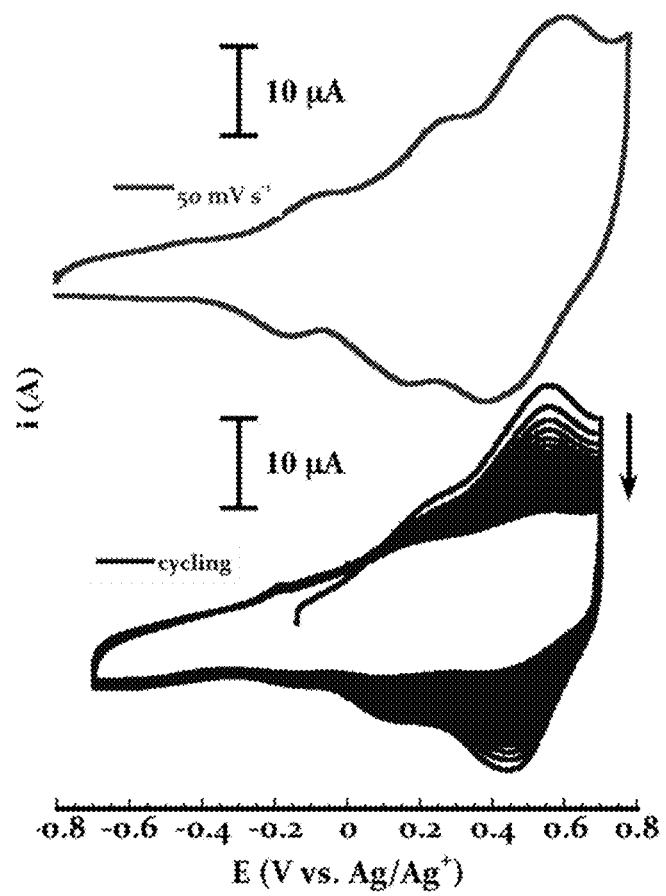

FIG. 47 shows an example of CV characterization of a polymer of the present disclosure.

Figure 48:
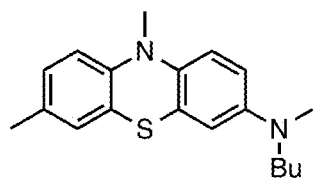
Figure 48:
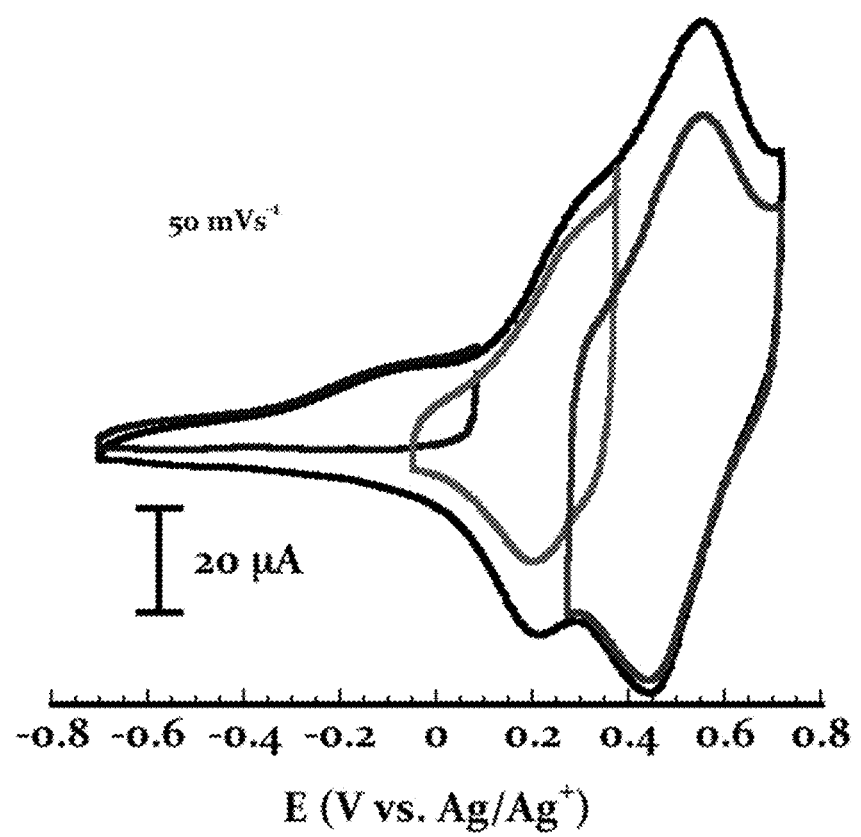

FIG. 48 shows an example of CV characterization of a polymer of the present disclosure.

Figure 49:
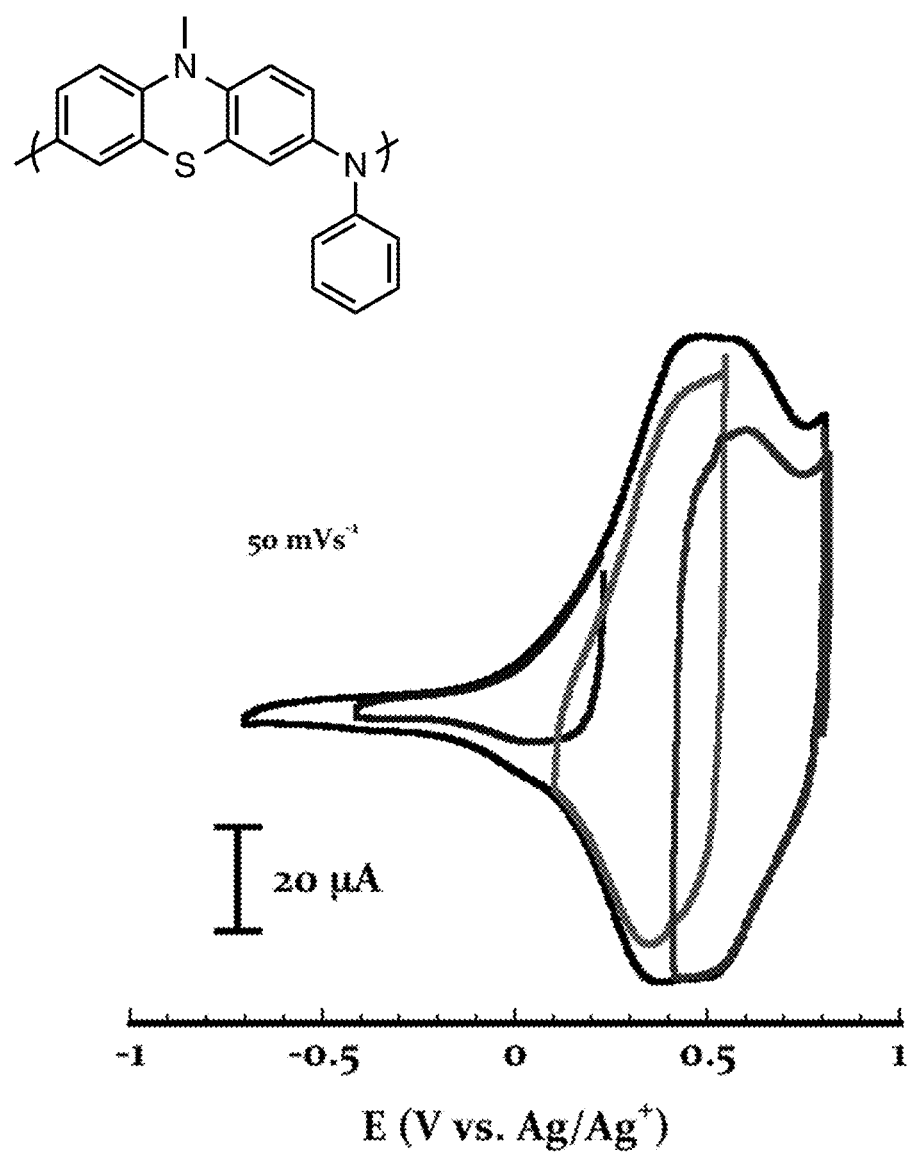

FIG. 49 shows an example of CV characterization of a polymer of the present disclosure.

Figure 50:
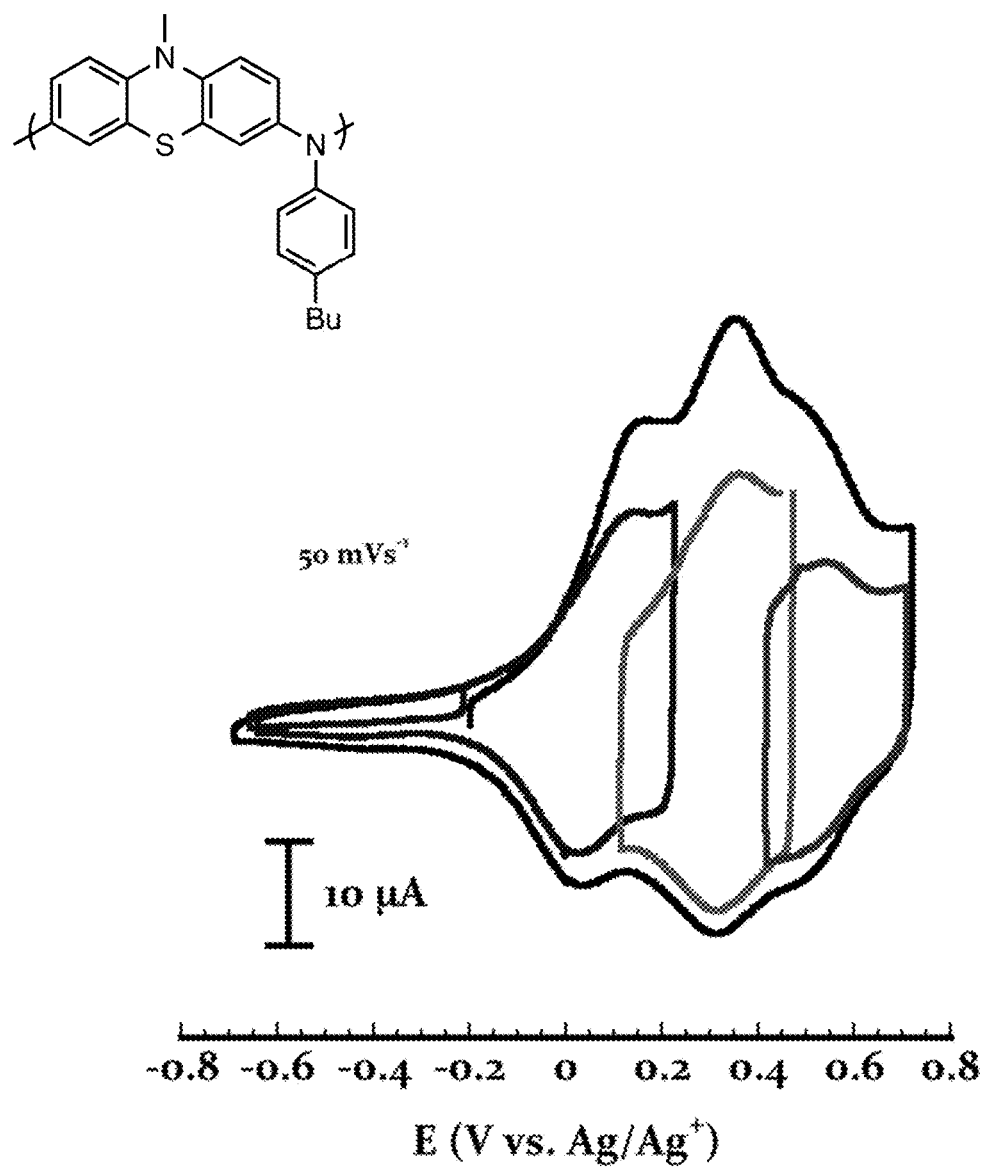

FIG. 50 shows an example of CV characterization of a polymer of the present disclosure.

Figure 51:
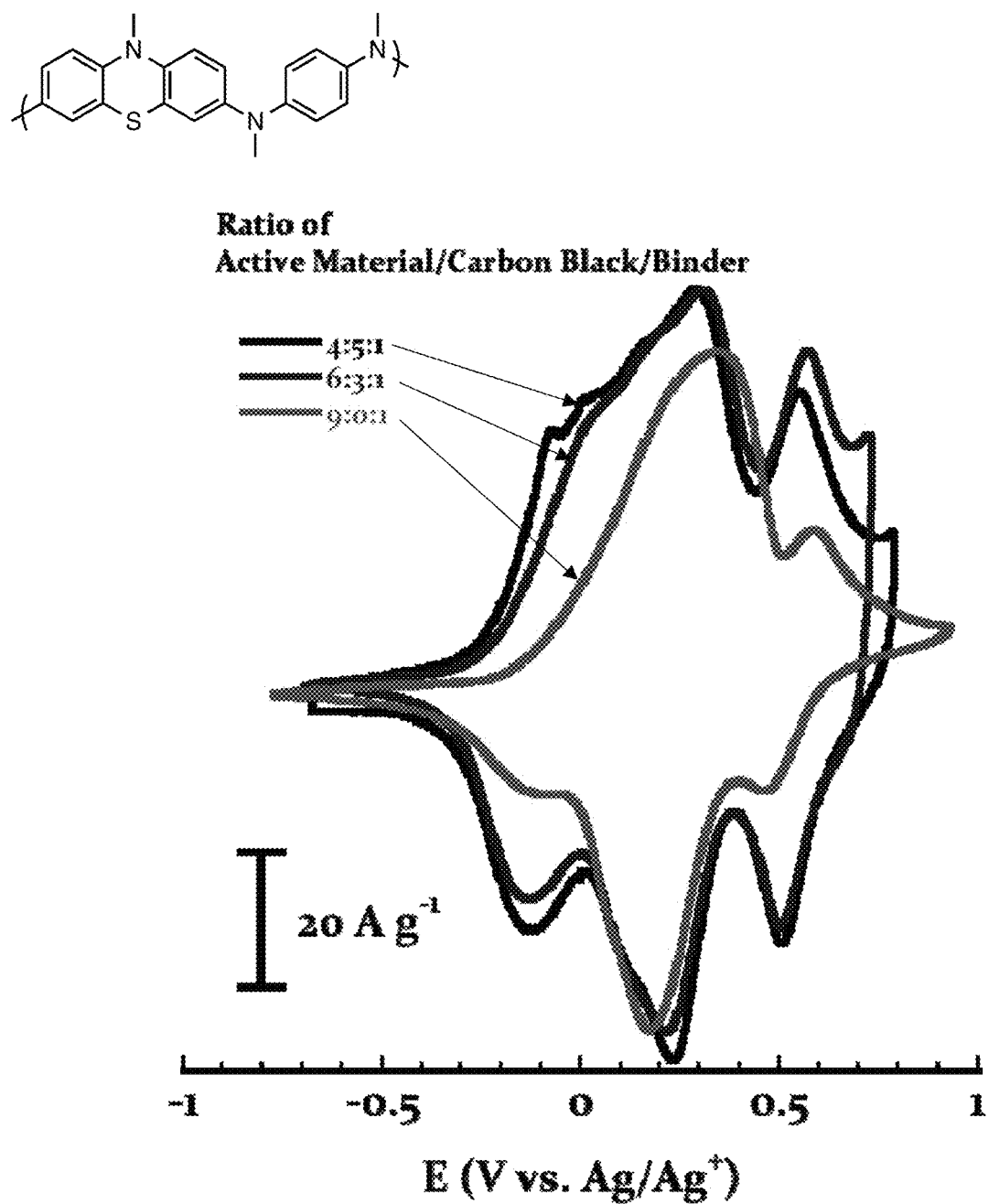

FIG. 51 shows an example of CV characterization of an example of a material comprising a polymer of the present disclosure.

Figure 52:
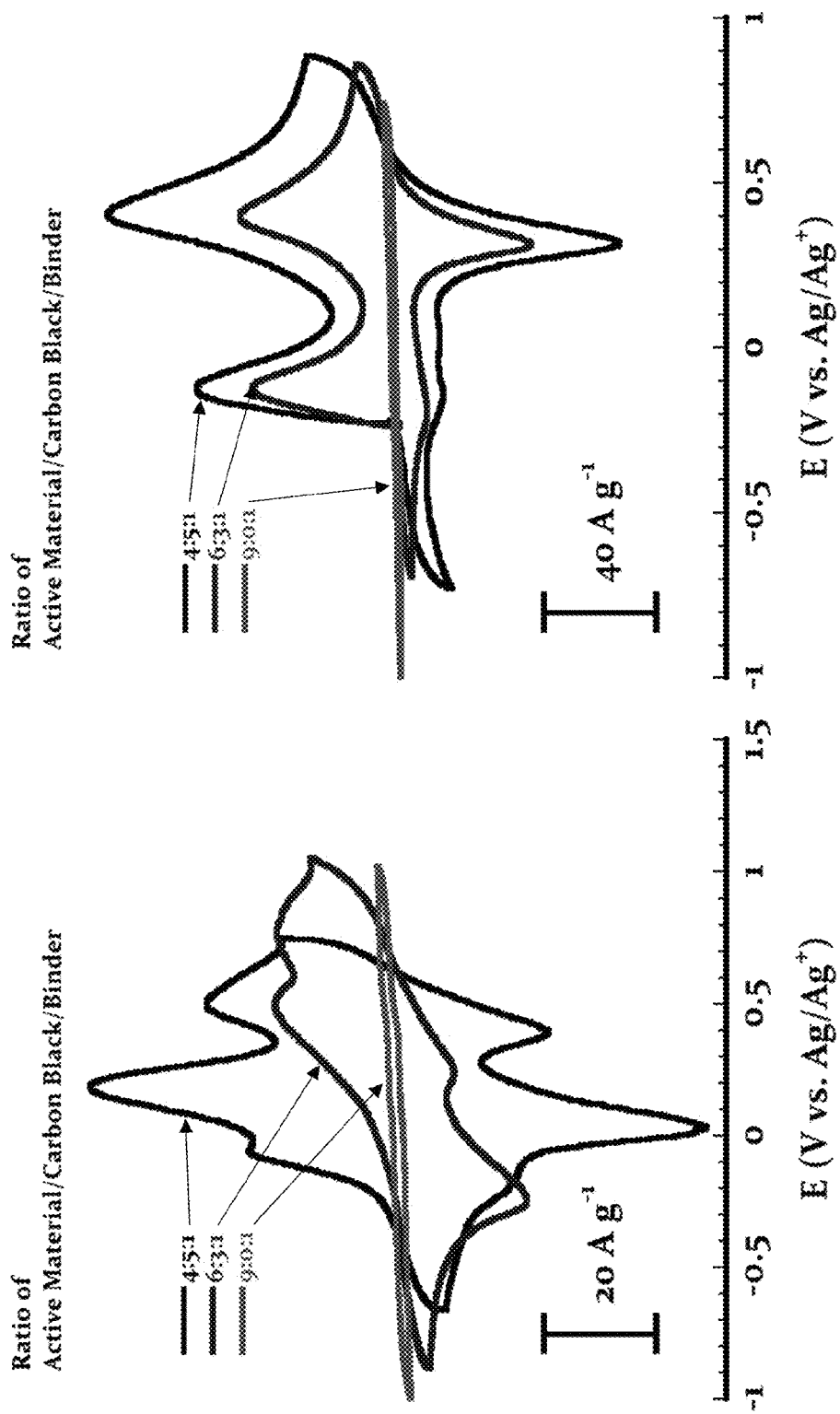

FIG. 52 shows an example of CV characterization of examples of a material comprising a polymer of the present disclosure.

DETAILED DESCRIPTION OF THE DISCLOSURE

Although claimed subject matter will be described in terms of certain embodiments, other embodiments, including embodiments that do not provide all of the benefits and features set forth herein, are also within the scope of this disclosure. Various structural, logical, process step, and electronic changes may be made without departing from the scope of the disclosure.

Ranges of values are disclosed herein. The ranges set out a lower limit value and an upper limit value. Unless otherwise stated, the ranges include all values to the magnitude of the smallest value (either lower limit value or upper limit value) and ranges between the values of the stated range.

As used herein, the term "moiety", unless otherwise stated, refers to a chemical entity that has two or more termini that can be covalently bonded to other chemical species. Examples of moieties include, but are not limited to:

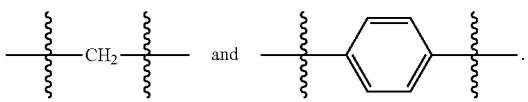

As used herein, unless otherwise expressly stated, "aliphatic moiety" refers to branched or unbranched hydrocarbons and is meant to include alkyl (saturated) moieties, alkene moieties (unsaturated moieties having one or more terminal or internal carbon-carbon double bond), alkyne moieties (unsaturated moieties having one or more terminal or internal carbon-carbon triple bond), or moieties comprising a combination thereof. For example, the aliphatic group is a C$_1$ to C$_6$ aliphatic moiety. The aliphatic moiety can be an alkyl moiety such as a methyl moiety, ethyl moiety, n-propyl moiety, isopropyl moiety, n-butyl moiety, isobutyl moiety, sec-butyl moiety, pentyl moiety, or hexyl moiety. The aliphatic moiety can be unsubstituted or substituted with one or more substituent. Examples of substituents include, but are not limited to, various substituents such as, for example, halogens (—F, —Cl, —Br, and —I), alkenes, alkynes, aliphatic groups, aryl groups, alkoxides, carboxylates, carboxylic acids, ether groups, and the like, and combinations thereof.

As used herein, the term "aryl moiety", unless otherwise stated, refers to C$_6$ to C$_{24}$ aromatic or partially aromatic carbocyclic moieties, including all integer numbers of carbons and ranges of numbers of carbons there between. The aryl moiety can comprise polyaryl moieties (such as, e.g. fused rings and/or biaryl moieties). The aryl moiety can be unsubstituted or substituted with one or more substituent. Examples of substituents include, but are not limited to, various substituents such as, for example, halogens (—F, —Cl, —Br, and —I), alkenes, alkynes, aliphatic groups, aryl groups, alkoxides, carboxylates, carboxylic acids, ether groups, and the like, and combinations thereof. Non-limiting examples of suitable aryl moieties include substituted/unsubstituted phenyl moieties and substituted/unsubstituted biphenyl moieties.

As used herein, unless otherwise expressly stated, "heteroaryl moiety" refers to C$_6$ to C$_{24}$ aromatic or partially aromatic carbocyclic moiety, including all integer numbers of carbons and ranges of numbers of carbons there between. The heteroatom(s) can be in an aromatic ring (e.g., a pyridine moiety) and/or not in an aromatic ring (e.g., an aniline moiety). The heteroaryl moiety can comprise polyaryl moieties (such as, e.g. fused rings and/or biaryl moieties) that can have one or more heteroatom in an aromatic ring or aromatic rings of the moiety and/or have one or more heteroatom that is not in the aromatic ring or aromatic rings of the moiety. The heteroaryl moiety can be unsubstituted or substituted with one or more substituent. Examples of substituents include, but are not limited to, various substituents such as, for example, halogens (—F, —Cl, —Br, and —I), alkenes, alkynes, aliphatic groups, aryl groups, alkoxides, carboxylates, carboxylic acids, ether groups, and the like, and combinations thereof. Non-limiting examples of suitable heteroaryl moieties include substituted/unsubstituted phenothiazines.

As used herein, the term "alkyl group", unless otherwise stated, refers to branched or unbranched hydrocarbons. Examples of such alkyl groups include methyl groups (—CH$_3$), ethyl groups, propyl groups, butyl groups, isopropyl groups, tert-butyl groups, and the like. For example, the alkyl group can be a $C_1$-$C_6$ alkyl group including all integer numbers of carbons and ranges of numbers of carbons there between. The alkyl group can be unsubstituted or substituted with one or more substituent. Examples of substituents include, but are not limited to, various substituents such as, for example, halogens (—F, —Cl, —Br, and —I), alkenes, alkynes, aliphatic groups, aryl groups, alkoxides, carboxylates, carboxylic acids, ether groups, and the like, and combinations thereof.

As used herein, the term "aryl group", unless otherwise stated, refers to a $C_6$ to $C_{24}$ aromatic or partially aromatic carbocyclic group including all integer numbers of carbons and ranges of numbers of carbons there between. The aryl group can comprise polyaryl moieties (such as, e.g. fused rings and/or biaryl moieties). The aryl group can be unsubstituted or substituted with one or more substituent. Examples of substituents include, but are not limited to, various substituents such as, for example, halogens (—F, —Cl, —Br, and —I), alkenes, alkynes, aliphatic groups, aryl groups, alkoxides, carboxylates, carboxylic acids, ether groups, and the like, and combinations thereof. A non-limiting example of a suitable aryl group include phenyl groups and biphenyl groups.

The present disclosure provides polymers, methods of making polymers, methods of making films and thin films comprising the polymers. The present disclosure also provides uses of the polymers.

The polymers of the present disclosure/materials comprising one or more polymer of the present disclosure are attractive for numerous applications including, for example, electrical energy storage, electrochromics, redox mediators for electrosynthesis and (bio)sensor applications for one or more of the following reasons:

They incorporate organic structures that can exhibit multiple stable redox process (leading to high capacity; C) at high potentials (E) which leads to high energy density (energy density=C×E) in electrical energy storage applications. Since different redox states generally have different colors, these materials can be used in a wide range of electrochromic applications. The formal potentials of these materials can be readily tuned by appropriate substitution, allowing for subtle control in not only the above-mentioned areas (electrical energy storage, electrochromics) but also as redeox mediators in electrosynthesis and in (bio)sensors applications;

Many of these materials can be generated/deposited via electrochemically induced processes (electrodeposition, electropolymerization, electroprecipitation), making the modification of any conducting surface (e.g., metals, conducting (including transparent) metal oxides, semiconductors, and semimetals) a simple process. In the case of electrical energy storage applications, this makes for an "infinite form factor" as any conducting surface serves as a current collector;

The materials are essentially amorphous and the kinetics of charge transfer are rapid (and do not involve intercalation) so that electrical energy storage devices can sustain very high "C" (charge/discharge) rates, electrochromic devices can rapidly switch color, redox mediators are rapid and sensors can provide rapid read-out; and In some cases, materials can exhibit "synergistic effects" so that they can exchange more electrons than would be expected based on the simple sum of the individual fragments. They can also stabilize species in unusual geometries and oxidation states.

Figure 1:
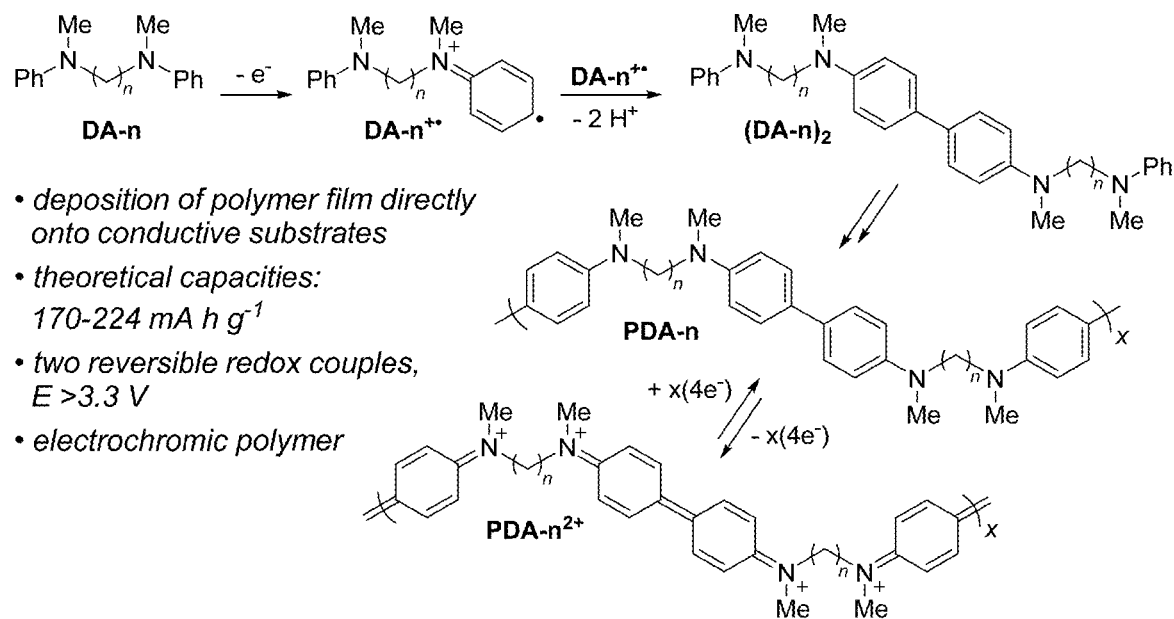
FIG. 1 shows electropolymerization of DA-n monomers and the oxidation of PDA-n.

We disclose herein a novel family of polymers, which can be used as electrode materials, and a method of their preparation, for use in, for example, electrical energy storage devices, particularly pseudo capacitors, lithium ion batteries, and supercapacitors. Broadly, the material class we are exploiting is that of oxidatively coupled anilines (FIG. 1). Electrodes can be readily prepared from electropolymerization of anilines, as the resulting polymer is the electrochemically active electrode, for use in high power energy storage applications. In other words, described is a high performance pseudocapacitive material with the voltage plateaus and high capacities characteristic of batteries, but capable of the high cycling rates of supercapacitors.

For example, the polymers are based upon formulations tetramethyl benzidine, or specifically, N,N,N',N'-tetramethylbenzidine (TMB). While others have studied the two one-electron reversible oxidations of TMB to the cation radical and quinoidal dication, respectively, at high potentials (>3.3 V vs. Li/Li$^+$), TMB itself is not suitable as an electrode material. The solubility of small molecules, including TMB and others anilines, precludes their feasibility as electrode materials.

The polymer materials (e.g., electrode materials) disclosed herein can generate a polymer film containing a redox-active group (including but not limited to benzidine and related derivatives) in situ as a result of the electrogenerated coupling and polymerization. In general, any aniline (or similar derivative) that is not substituted in the "4" position (see, e.g., the following structure) can be utilized in this way, as will be obvious to those skilled in the art. Specific functionalization of these anilines can result in variation of energy storage properties (including, but not limited to capacity, potential, energy density), which permits tuning to specific needs of the end-use application. We believe we are the first to detect the electrochemically active behavior of these polymerized materials, and exploit them for applications in electrical energy storage.

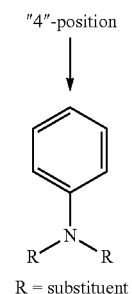

R = substituent

The resulting materials exhibit very high power density (very fast charge and recharge times) with charge density on the order of or exceeding today's commercialized battery cathodes.

The polymers of the present disclosure can not only exchange multiple electrons per formula unit at high potentials, but can also sustain high charge and discharge rates. This system combines the energy density of a battery with the power density of a supercapacitor. Furthermore, these polymers can be generated via electropolymerization, thus yielding a conformal film on any conductive substrate serving as current collector, which provide a system with an arbitrary "form factor."

In an aspect, the present disclosure provides polymers. The polymers can be referred to as poly(arylamine)s. The polymers can be redox active polymers.

In an example, the polymers have the following structure:

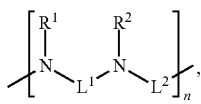

where $R^1$ and $R^2$ are independently, at each occurrence in the polymer, an alkyl group comprising 1 to 6 carbons or an aryl group comprising 6 to 24 carbons;
$L^1$ is independently, at each occurrence in the polymer, an aryl moiety comprising 6 to 24 carbons, wherein the aryl moiety is completely aromatic or partially aromatic, or a heteroaryl moiety comprising 6 to 24 carbons, wherein the heteroaryl moiety is completely aromatic or partially aromatic;
$L^2$ is independently, at each occurrence in the polymer, an aliphatic moiety comprising 1 to 24 carbons, an aryl moiety comprising 6 to 24 carbons, a heteroaryl moiety comprising 6 to 24 carbons, wherein the heteroaryl moiety is completely aromatic or partially aromatic; or a heteroalkyl branching moiety comprising one or more aliphatic moiety comprising 1 to 24 carbons and one or more heteroatom (e.g., O, N, S, and combinations thereof); and n is an integer from 1 to 20,000, including all integer values and ranges therebetween. In an example, in a repeat unit $R^1$ and $R^2$ are not present and the repeat unit comprises two $L^2$ moieties (e.g., aliphatic moieties) that are covalently bound to the same two nitrogen atoms.

$L^1$ is a moiety that links two nitrogen atoms in a repeat unit of the polymers. $L^1$ comprises an aryl moiety. Two aromatic carbons of the aryl moiety are each covalently bound to a different nitrogen atom of a repeat unit of the polymer. The individual aryl moieties in the polymer can comprise polyaryl moieties (such as, e.g. fused ring moieties or biaryl moieties). The aryl moiety can be completely or partially aromatic. For example, $L^1$ is independently at each occurrence in the polymer an $L^1$ aryl moiety comprising 6 to 24 carbons, where the aryl moiety is completely aromatic or partially aromatic.

For example, $L^1$ is:

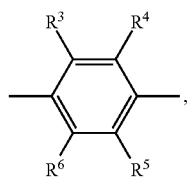

where $R^3$, $R^4$, $R^5$, and $R^6$ are individually at each occurrence in the polymer selected from hydrogen, alkyl groups comprising 1 to 6 carbons, halogen substituents, amines, ethers, and thioethers.

For example, $L^1$ is:

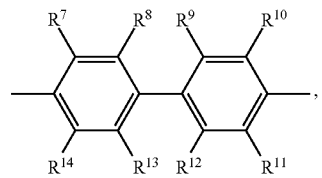

where $R^7$, $R^8$, $R^9$, $R^{10}$, $R^{11}$, $R^{12}$, $R^{13}$, and $R^{14}$ are individually at each occurrence in the polymer selected from hydrogen, alkyl groups comprising 1 to 6 carbons, halogen substituents, amines, ethers, and thioethers.

For example, $L^1$ is:

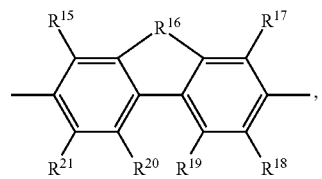

wherein $R^{15}$, $R^{17}$, $R^{18}$, $R^{19}$, $R^{20}$, and $R^{21}$ are individually at each occurrence in the polymer selected from hydrogen, alkyl groups comprising 1 to 6 carbons, halogen substituents, amines, ethers, and thioethers; $R^{16}$ is independently at each occurrence in the polymer from —$(CR'R'')_d$—, wherein R' and R'' are independently selected from H and alkyl groups —$CH(CH_3)_2$—, O, S, NR''', wherein R''' is selected from the group consisting of hydrogen and alkyl groups comprising 1 to 6 carbons, wherein d is an integer from 1 to 6; and optionally, at any occurrence in the polymer $R^{20}$ and $R^{19}$ are joined to form a $C_6$ ring with the proviso that the ring including $R^{16}$ is a six-membered ring (e.g., d is 2).

For example, $L^1$ is:

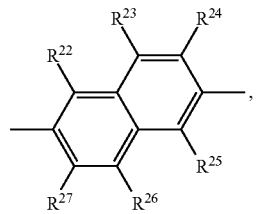

where $R^{22}$, $R^{23}$, $R^{24}$, $R^{25}$, $R^{26}$, and $R^{27}$ are individually at each occurrence in the polymer selected from hydrogen, alkyl groups comprising 1 to 6 carbons, halogen substituents, amines, ethers, and thioethers.

For example, $L^1$ is:

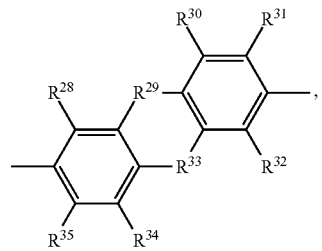

wherein $R^{28}$, $R^{30}$, $R^{31}$, $R^{32}$, $R^{34}$, and $R^{35}$ are individually at each occurrence in the polymer selected from hydrogen, alkyl groups comprising 1 to 6 carbons, halogen substituents, amines, ethers, and thioethers; and $R^{29}$ and $R^{33}$ are independently at each occurrence in the polymer from —(CR'R")$_d$—, wherein R' and R" are independently selected from H and alkyl groups, —CH(CH$_3$)$_2$—, O, S, NR''', wherein R''' is selected from the group consisting of hydrogen and alkyl groups comprising 1 to 6 carbons, wherein d is an integer from 1 to 6.

$L^2$ is a moiety that links two nitrogen atoms in a repeat unit of the polymers. $L^2$ can be, independently at each occurrence in the polymer, an aliphatic moiety (e.g., an alkyl moiety or alkenyl moiety) (e.g., an $L^2$ aliphatic moiety such as, for example, an $L^2$ alkyl or an $L^2$ alkenyl moiety), an aryl moiety (e.g., an $L^2$ aryl moiety), or a heteroalkyl branching moiety (e.g., an $L^2$ heteroalkyl branching moiety). For example, $L^2$ is independently at each occurrence in the polymer an $L^2$ alkyl moiety comprising 1 to 6 carbons, an $L^2$ aryl moiety comprising 6 to 24 carbons and at least one heteroatom (e.g., O, N, S, or a combination thereof) or a heteroalkyl branching moiety, wherein the alkyl moiety of the heteroalkyl branching moiety comprises 1 to 12 carbons (e.g., two alkyl moieties each comprising 1 to 6 carbons) and the heteroalkyl branching moiety comprises one or more heteroatom and at least one heteroatom (e.g., N, S, or a combination thereof).

The polymer can comprise one or more heteralkyl branching moiety. A heteroalkyl branching moiety can comprise one or more secondary nitrogen and/or one or more tertiary nitrogen. For example, a heteroalkyl branching moiety comprises one or more alkyl moiety comprising 1 to 24 carbons and one or more heteroatom (e.g., nitrogen). Examples of heteroalkyl branching moieties are provided herein.

A heteroalkyl branching moiety may provide a branch point in a polymer comprising a heteroalkyl branching moiety. Polymer comprising heteroalkyl branching moieties can be crosslinked through a covalent bond between two heteroalkyl branching moieties. For example, the covalent bond can be between aryl moieties of two heteroalkyl branching moieties on the same polymer chain (intrachain crosslink) or different polymer chains (interchain crosslink). A polymer can be hyperbranched.

In various examples, a polymer has all L moieties having the following structure:

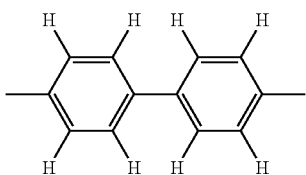

and all $L^2$ moieties having the following structure:

where f is an integer from 1 to 6. In various other examples, the polymer has the following structure:

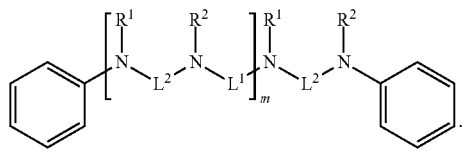

For example, all of the $L^1$ moieties are biphenyl moieties. The polymers in these examples can be made by electropolymerization.

The polymers can have various terminal groups. For example, a polymer has terminal groups independently, at each occurrence in the polymer, selected from the group consisting of hydrogen, aryl groups (e.g., phenyl groups), aryl amine groups (e.g., phenyl amine groups), aryl halides (e.g., phenyl halide groups), and alkyl amines. For example, a terminal group is:

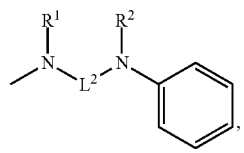

where $R^1$ and $R^2$ are as described herein.

The polymers can have a range of molecular weight. For example, the polymers can have a molecular weight (Mw or Mn) of 500 g/mol to 10,000,000 g/mol, including all integer g/mol values and ranges therebetween.

The polymers can have various polydispersity. For example, a polymer has a polydispersity of 1 to 10, including all 0.1 values and ranges therebetween.

The polymers can have desirable redox activity (e.g., redox behavior and/or electrochemical capacity). In an example, a polymer is redox-active (e.g., has one or more redox-active fragment and/or exhibits reversible electron transfer). For example, polymers containing a tetra N-methyl p-phenylene diamine ("Wurster's Blue") fragment have reversible two electron exchanges. The specific potential at which these processes take place can be tuned by appropriate substitution (as shown herein). Other redox-active fragments include, for example, tetra N-methyl benzidine fragments and phenothiazine derivative fragments. In some cases, polymers exhibit additional redox processes that are considered to arise from synergistic interaction. In another example, a polymer exhibits reversible electron transfer (e.g., reversible one or multiple, such as, for example, two, electron transfer). In another example, a polymer exhibits two redox couples.

The polymers can have various electrochemical capacity values. For example, a polymer has an electrochemical capacity of 225 to 400 mAhr/gm, including all integer mAhr/gm values and ranges therebetween.

Polymers of the present disclosure can be made by various methods. In an example, polymers are made by electropolymerization of aniline monomers (e.g., substituted aniline monomers). Examples of making polymers of the present disclosure by electropolymerization are provided herein. In another example, polymers are made by palladium coupled addition polymerization. Examples of making polymers of the present disclosure by Pd-catalyzed polycondensation of dibromoarenes with secondary acyclic, aliphatic diamines to synthesize redox-active polyarylamines palladium coupled addition polymerization are provided herein.

A composition can comprise one or more polymers of the present disclosure. For example, a composition comprises one or more polymer of the present disclosure, one or more carbon material (e.g., carbon black, graphitic carbon, carbon nanotubes, graphene, and combinations thereof) in addition to the polymer(s) and, optionally, one or more additional material such as, for example, a binder.

In an aspect, the present disclosure provides films. The films comprise a polymer of the present disclosure. The films can be used in articles of manufacture and devices. For example, an article of manufacture or a device comprises one or more film of the present disclosures. The films can be disposed on a substrate. For example, electropolymerized films conformally coat a non-planar substrate. The films can be made using methods known in the art.

In an aspect, the present disclosure provides methods of making electrodes using polymers of the present disclosure. For example, an electrode is made by electropolymerization of a polymer on a substrate (e.g., a current collector).

Methods of making an electrode comprising a polymer of the present disclosure are described herein. For example, an electrode is made by contacting a solution comprising one or more precursor with an electrically conducting substrate (e.g., a current collector) and applying a potential such that a thin film is deposited on at least a portion of the substrate.

It is desirable that the films have one or more of the following qualities: be dense, have desirable adherence to the substrate, exhibit rapid rate of charge transfer and counterion transport, and exhibit desirable solvation. These properties can be quantified via electrochemical measurements (e.g., cyclic voltammetry, rotating disk electrode voltammetry, single and double potential step chronoamperometry), electrochemical impedance spectroscopy, and electrochemical quartz crystal microbalance measurements (including, for example, acoustic impedance).

The films can be substantially defect and/or pinhole free. By "substantially defect and pinhole free" it is meant that the films do not have observable defects (e.g., observable by optical microscopy and/or electron microscopy and/or electrochemical measurement methods) and/or pinholes. Defects and/or pinholes can be observed by methods known in the art. For example, defects and/or pinholes can be observed by optical microscopy, electron microscopy, and electrochemical measurement methods. It is desirable to deposit films using electropolymerization, because incipient pinholes would expose the conducting substrate surface (e.g., electrode (metal) surface), which would have a higher current density than the film itself and thus electropolymerization would preferentially take place at those locations, which can provide a substantially defect and pinhole-free film.

In an aspect, the present disclosure provides uses of polymers of the present disclosure. For example, the polymers can be used in devices and as redox mediators for electrocatalysis.

In an example, a device comprises one or more thin film comprising a polymer of the present disclosure. Examples of devices include, but are not limited to, electrochemical energy storage (EES) systems, electrochromic devices, biosensors (e.g., amperometric biosensors), and switching devices. Examples of EES systems include, but are not limited to, batteries (e.g., ion-conduction batteries such as, for example, lithium-conducting batteries, sodium-conducting batteries, and magnesium-conducting batteries), capacitive devices (e.g., pseudo capacitors, capacitors, supercapacitors, and ultracapacitors), and battery-capacitor hybrid devices. Examples of EES devices that can comprise one or more thin film comprising a polymer of the present disclosure (e.g., an electrode comprising one or more thin film comprising a polymer of the present disclosure.)

The thin film(s) can be electrode materials (e.g., a cathode or an anode) in the device. For example, an electrode comprises one or more thin film of the present disclosure. The thin film can be disposed on a substrate. For example, an electrode comprises a thin film comprising a polymer of the present disclosure on a substrate. Examples of substrate materials include, but are not limited to, metals (e.g., Pt, Au, and Pd), alloys (e.g., steel), metal oxides (e.g., indium tin oxide (ITO)), semi-metals, various forms of carbon (e.g., carbon black, graphitic carbon, carbon nanotubes, and graphene), 2-D materials (e.g., $MoS_2$).

The thin film or electrode material comprising one or more polymer of the present disclosure can further comprise one or more carbon material (e.g., carbon black, graphitic carbon, carbon nanotubes, graphene, and combinations thereof) in addition to the polymer(s). The thin film or electrode material comprising one or more polymer of the present disclosure can also further comprise additional materials such as, for example, binders.

The thin film can be formed by electropolymerization, in which a film is deposited by virtue of its charge and lowered solubility, particularly in low dielectric constant solvents, directly on the conducting substrate. The substrate can be a current collector. It is desirable that the current collector comprises materials that are electrochemically stable within the potential range in which the polymer(s) are redox active.

The thin film can be formed by electrodeposition directly on a substrate (e.g., a conducting substrate). The substrate can be a current collector. It is desirable that the current collector comprises materials that are electrochemically stable within the potential range in which the polymer(s) are redox active.

The thin film can form a conformal coating on a substrate (e.g., a current collector). For example, where the substrate (e.g., current collector) is non-planar (e.g., having one or more non-planar feature) the thin film can provide a conformal coating on the substrate. The conformal thin film can be provided by electropolymerization (e.g., as described herein) or electroprecipitation.

The thin film can have a variety of thickness. For example, a thin film has a thickness of 10 nm to 100 μm, including all integer nm values and ranges therebetween.

The following Statements describe various examples of the polymers and methods of the present disclosure:
Statement 1. A polymer or composition comprising:

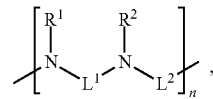

where $R^1$ and $R^2$ are independently, at each occurrence in the polymer, an alkyl group comprising 1 to 6 carbons or an aryl group comprising 6 to 24 carbons; $L^1$ is independently, at each occurrence in the polymer, as described herein (e.g., an aryl moiety comprising 6 to 24 carbons, wherein the aryl moiety is completely aromatic or partially aromatic); $L^2$ is independently, at each occurrence in the polymer, an aliphatic moiety as described herein (e.g., comprising 1 to 24 carbons), an aryl moiety as described herein (e.g., comprising 6 to 24 carbons), or a heteroalkyl branching moiety as described herein (e.g., comprising one or more alkyl moiety comprising 1 to 24 carbons and one or more heteroatom); and n is described herein (e.g., an integer from 1 to 20,000).

Statement 2. A polymer or composition according to Statement 1, where $L^1$ is:

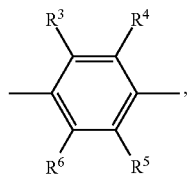

where $R^3$, $R^4$, $R^5$, and $R^6$ are individually at each occurrence in the polymer selected from hydrogen, alkyl groups comprising 1 to 6 carbons, halogen substituents, amines, ethers, and thioethers.

Statement 3. A polymer or composition according to any one of Statements 1 or 2, where L is:

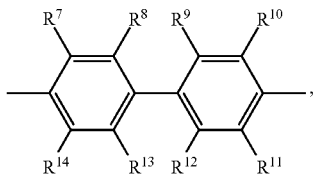

where $R^7$, $R^8$, $R^9$, $R^{10}$, $R^{11}$, $R^{12}$, $R^{13}$, and $R^{14}$ are individually at each occurrence in the polymer selected from hydrogen, alkyl groups comprising 1 to 6 carbons, halogen substituents, amines, ethers, and thioethers.

Statement 4. A polymer or composition according to any one of the preceding Statements, where $L^1$ is:

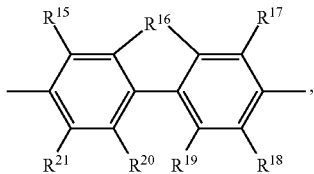

where $R^{15}$, $R^{17}$, R", $R^{19}$, $R^{20}$, and $R^{21}$ are individually at each occurrence in the polymer selected from hydrogen, alkyl groups comprising 1 to 6 carbons, halogen substituents, amines, ethers, and thioethers; $R^{16}$ is independently at each occurrence in the polymer from —(CR'R")$_d$—, wherein R' and R" are independently selected from H and alkyl groups, —CH(CH$_3$)$_2$—, O, S, NR''', wherein R''' is selected from the group consisting of hydrogen and alkyl groups comprising 1 to 6 carbons, wherein d is an integer from 1 to 6; and optionally, at any occurrence in the polymer $R^{20}$ and $R^{19}$ are joined to form a $C_6$ ring and d is 2.

Statement 5. A polymer or composition according to any one of the preceding Statements, where $L^1$ is:

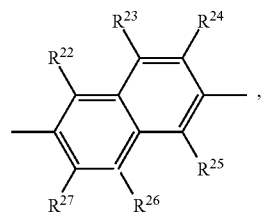

wherein $R^{22}$, $R^{23}$, $R^{24}$, $R^{25}$, $R^{26}$, and $R^{27}$ are individually at each occurrence in the polymer selected from hydrogen, alkyl groups comprising 1 to 6 carbons, halogen substituents, amines, ethers, and thioethers.

Statement 6. A polymer or composition according to any one of the preceding Statements, where $L^1$ is:

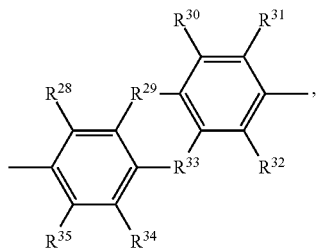

where $R^{28}$, $R^{30}$, $R^{31}$, $R^{32}$, $R^{34}$, and $R^{35}$ are individually at each occurrence in the polymer selected from hydrogen, alkyl groups comprising 1 to 6 carbons, halogen substituents, amines, ethers, and thioethers; and $R^{29}$ and $R^{33}$ are independently at each occurrence in the polymer from —(CR'R")$_d$—, wherein R' and R" are independently selected from H and alkyl groups —CH(CH$_3$)$_2$—, O, S, NR''', wherein R''' is selected from the group consisting of hydrogen and alkyl groups comprising 1 to 6 carbons, wherein d is an integer from 1 to 6.

Statement 7. A polymer or composition according to any one of the preceding Statements, where the alkyl moiety is:

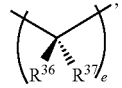

where $R^{36}$ and $R^{37}$ are individually at each occurrence in the polymer selected from hydrogen, and an alkyl group comprising 1 to 6 carbons; and e is an integer from 1 to 10.

Statement 8. A polymer or composition according to any one of the preceding claims, where at each occurrence in the polymer the heteroalkyl branching moiety comprises a secondary nitrogen or a tertiary nitrogen.

Statement 9. A polymer or composition according to any one of the preceding Statements, where the heteroalkyl branching moiety is:

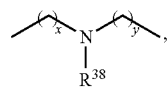

where x is individually at each occurrence in the polymer from 1 to 6; y is individually at each occurrence in the polymer from 1 to 6; and $R^{38}$ is individually at each occurrence in the polymer selected from an alkyl group, an aryl group, and covalent linkage to different heteroalkyl branching moiety in the polymer.

Statement 10. A polymer or composition according to any one of the preceding Statements, where the polymer comprises one or more intrachain crosslink and/or interchain crosslink.

Statement 11. A polymer or composition according to any one of the preceding Statements, where $L^1$ is:

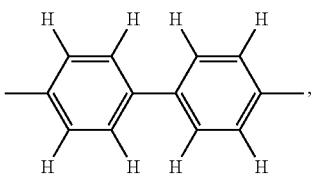

and $L^2$ is:

where f is an integer from 1 to 6.

Statement 12. A polymer or composition according to any of the preceding Statements, where the polymer has the following structure:

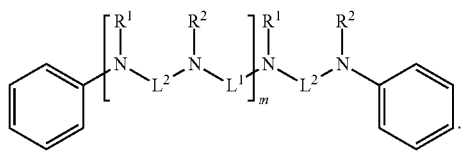

Statement 13. An electrode comprising a film comprising one or more polymer of the present disclosure (e.g., a polymer of Statement 1).

Statement 14. An electrode of Statement 13, wherein the film comprising a polymer of the present disclosure (e.g., a polymer of any one of Statements 1 to 12) is disposed on at least a portion of a substrate.

Statement 15. An electrode of any one of Statements 13 or 14, where the polymer is electropolymerized on the substrate.

Statement 16. An electrode of any one of Statements 13 to 15, wherein the substrate is a current collector.

Statement 17. A device comprising an electrode of the present disclosure (e.g., an electrode of any one of Statements 13 to 16).

Statement 18. A device of Statement 17, wherein the device is an electrochemical energy storage (EES) system.

Statement 19. A device of any one of Statements 17 or 18, where the EES is a battery.

Statement 20. A device of any one of Statements 17 or 18, wherein the EES is a capacitor or battery-capacitor hybrid.

The following examples are presented to illustrate the present disclosure. They are not intended to limiting in any matter.

Example 1

This example provides a description of examples of synthesis and characterization of polymers of the present disclosure.

Thin films of benzidine polymers were electrochemically deposited directly onto conductive substrates by oxidative coupling of di- and trianilinoalkane monomers. The electropolymerization and electrochemical properties of the polymers were optimized by varying the alkyl linker. Polymer films exhibited two reversible one-electron transfers at high potentials (>3.3 V vs. Li/Li$^+$) and maintained discharge capacities in excess of 150 mA h g$^{-1}$ even when discharged in under 4 seconds.

In this example, we describe an electropolymerized benzidine polymer that can be reversibly oxidized in two one-electron steps at high potentials (>3.3 V vs. Li/Li$^+$) and at fast rates (1,000 C), with minimal capacity loss after one hundred cycles. In other words, we have developed a cathode material with the voltage plateaus and high capacities characteristic of batteries, but capable of the high cycling rates of supercapacitors.

N,N,N',N'-tetramethylbenzidine (TMB) was used as a potential cathode material because of its two reversible oxidations to the quinoidal dication at high potentials (>3.3 V vs. Li/Li$^+$). However, the solubility of small molecules precludes their feasibility as electrode materials. Our strategy to overcome those issues was to incorporate TMB moieties into insoluble polymers through the oxidative coupling of anilines (FIG. 1). For example, TMB is the well-known coupling product of the oxidation of N,N-dimethylaniline (DMA). We describe the electropolymerization and electrochemical properties of benzidine films with varying alkyl linkers between the polymerizable end groups to develop a redox-active polymer with excellent cycling stability and high capacities at fast rates.

Figure 2:
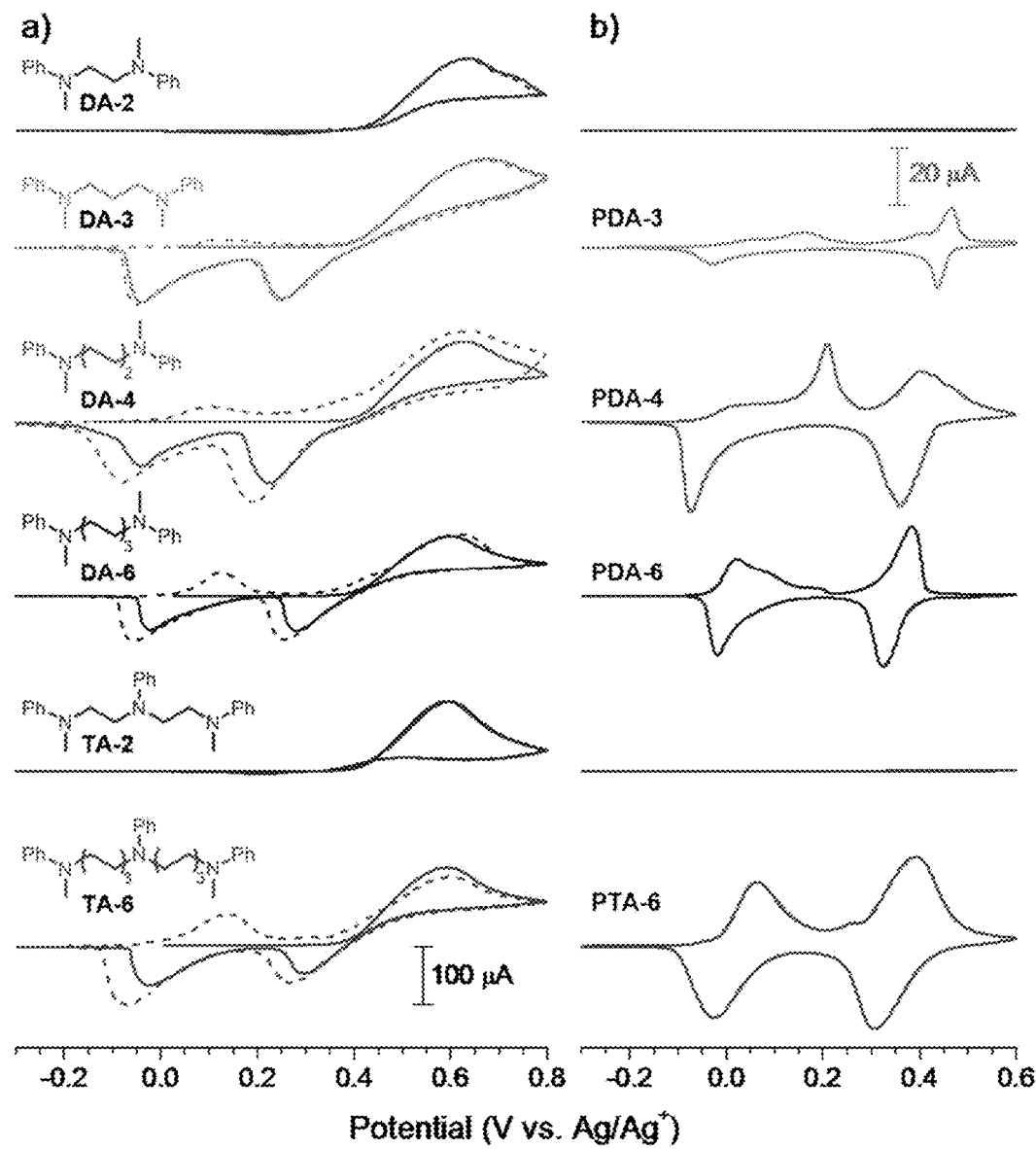
FIG. 2 shows (a) cyclic voltammograms (CVs) of 10 mM monomer in 0.1 M $(C_4H_9)_4NPF_6$ in $CH_2Cl_2$ on the $1^{st}$ (-) and $2^{nd}$ cycle (---). (b) CVs of electrodes prepared from (a) cycled in 0.1 M $(C_4H_9)_4NPF_6$ in $CH_3CN$. All CVs on 100 μA scale except as indicated. Scan rate: 20 mV s$^{-1}$.

A series of di- and trianilinoalkanes was synthesized with different alkyl lengths connecting the anilines (FIG. 2a). These monomers electropolymerized to form polymer films on the electrodes. Electropolymerization is a valuable technique to deposit conformal films directly on conductive surfaces. Moreover, film thickness and morphology can be controlled. FIG. 1 shows the proposed mechanism for the electropolymerization of dianilines, analogous to the oxidation and dimerization of DMA to TMB. Initially, the dianiline (DA-n) oxidizes to the radical cation that can form a C—C bond at the para-position of the anilines with another DA-n$^{+\bullet}$. Deprotonation affords the neutral dimer that can continue the process of oxidation, coupling, and deprotonation. At sufficient molecular weight, the polymer precipitates and deposits on the electrode. Oxidation of benzidine in the repeat unit of the polymer (PDA-n) forms the radical cation (PDA-n$^{+\bullet}$) that can be further oxidized to the quinoidal dication, PDA-n$^2$ (FIG. 1). The benzidine polymers have theoretical capacities of 170-224 mA h g$^{-1}$, which are greater than the practical capacity of LiCoO$_2$ (140 mA h g$^{-1}$).

FIG. 2a shows the cyclic voltammograms (CV) of 10 mM monomer in 0.1 M (C$_4$H$_9$)$_4$NPF$_6$ in CH$_2$Cl$_2$ at glassy carbon electrodes (GCE). On the first cycle (-), all of the monomers begin oxidizing at >+0.42 V vs. Ag/Ag$^+$. The appearance of two reduction peaks on the subsequent negative sweep corresponded to the newly formed benzidine, indicating that the oxidative coupling was successful. These assignments were based on similar observations in the coupling of DMA to TMB. DA-2 and TA-2 were the only monomers that did not display two reduction peaks suggesting unwanted side reactions. On the second cycle (---), some of the monomers display a new oxidation peak between 0-0.2 V that also corresponds to benzidine. The increase in reduction peak currents on successive cycles is indicative of polymer deposition and film growth.

Figure 6:
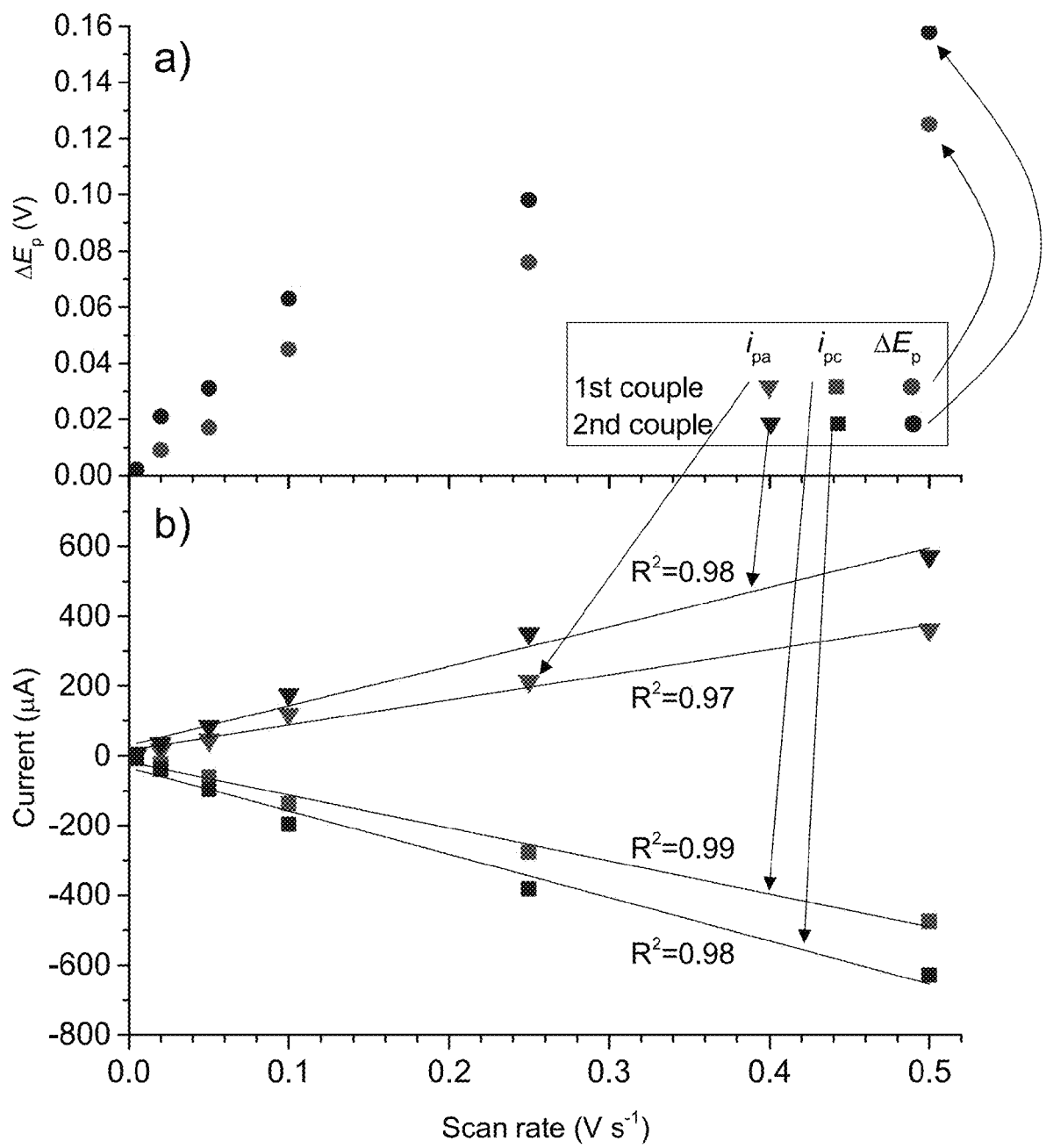
FIG. 6 shows (a) the difference in peak potentials ($\Delta E_p$) of the two redox couples of PDA-6 at various scan rates. (b) The dependence of the anodic and cathodic peak currents ($i_{pa}$ and $i_{pc}$, respectively) of the first and second couples of PDA-6 on scan rate. The decrease in $\Delta E_p$ is expected at slower sweep rates since the electrolyte ions have more time to diffuse into the polymer film. The linear correlation is expected for redox-active polymers that are confined to the surface of the electrode, and undergo kinetically facile electron transfers. The films on GCE were cycled in 0.5 M [NBu$_4$][PF$_6$]/CH$_3$CN between −0.3-0.6 V.

After electropolymerization, the electrodes were rinsed with $CH_2Cl_2$ to remove soluble oligomers and cycled in monomer-free 0.1 M $(C_4H_9)_4NPF_6$ in $CH_3CN$ (FIG. 2b). As expected from FIG. 2a, there was no Faradaic (redox) response for electrodes cycled in DA-2 or TA-2. All of the other modified electrodes exhibited two redox couples, corresponding to the PD(T)A-n/PD(T)A-n$^{+\bullet}$ and the PD(T)A-n$^{+\bullet}$/PD(T)A-n$^{2+}$ couples, referred to in this report as the first and second redox couples, respectively. As the alkyl linker size was increased from ethyl to butyl, the Faradaic response of the modified electrodes also increased which indicates that more polymer was deposited onto the electrode. This trend suggests that there are repulsive interferences between charged benzidine moieties that interfere with the electropolymerization and film deposition process. Alkyl linker size also has an effect on the electrochemistry of the polymer films. The first redox couples of PDA-3 and PDA-4 have a large peak to peak separation ($\Delta E_p$>+0.19 V) while PDA-6 and PTA-6 have $\Delta E_p$<+0.09 V. The $\Delta E_p$ is expected to be 0 V for kinetically facile surface-confined systems and the non-zero $\Delta E_p$ for the polymer films can be partially accounted for by the fast scan rate, since at slower scan rates, the $\Delta E_p$s of PDA-6 approached 0 V (FIG. 6). The second redox couple for all films had $\Delta E_p$<+0.09 V and the oxidation potentials shift negative with increasing alkyl linker length in the transition from PDA-n$^{+\bullet}$ to PDA-n$^{2+}$. This negative shift indicates that the dication is more stable (i.e. it is easier to oxidize the radical cation) with longer alkyl chains between the charged benzidine moieties.

Figure 7:
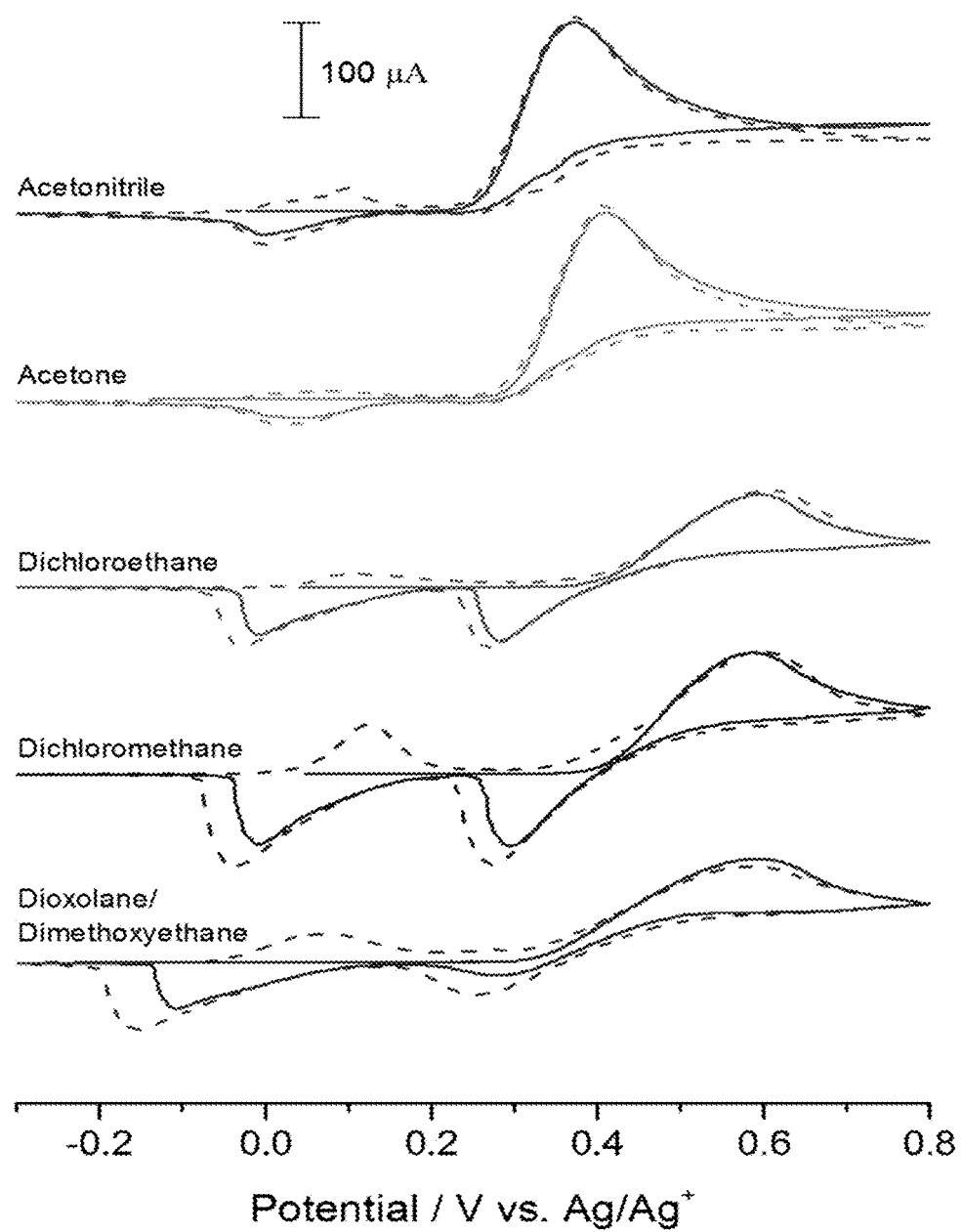
FIG. 7 shows cyclic voltammograms of 10 mM DA-6 in 0.1 M [NBu$_4$][PF$_6$]/solvent on the 1$^{st}$ (-) and 2$^{nd}$ cycle (---). All CVs on 100 μA scale. Scan rate: 20 mV s$^{-1}$.
Figure 8:
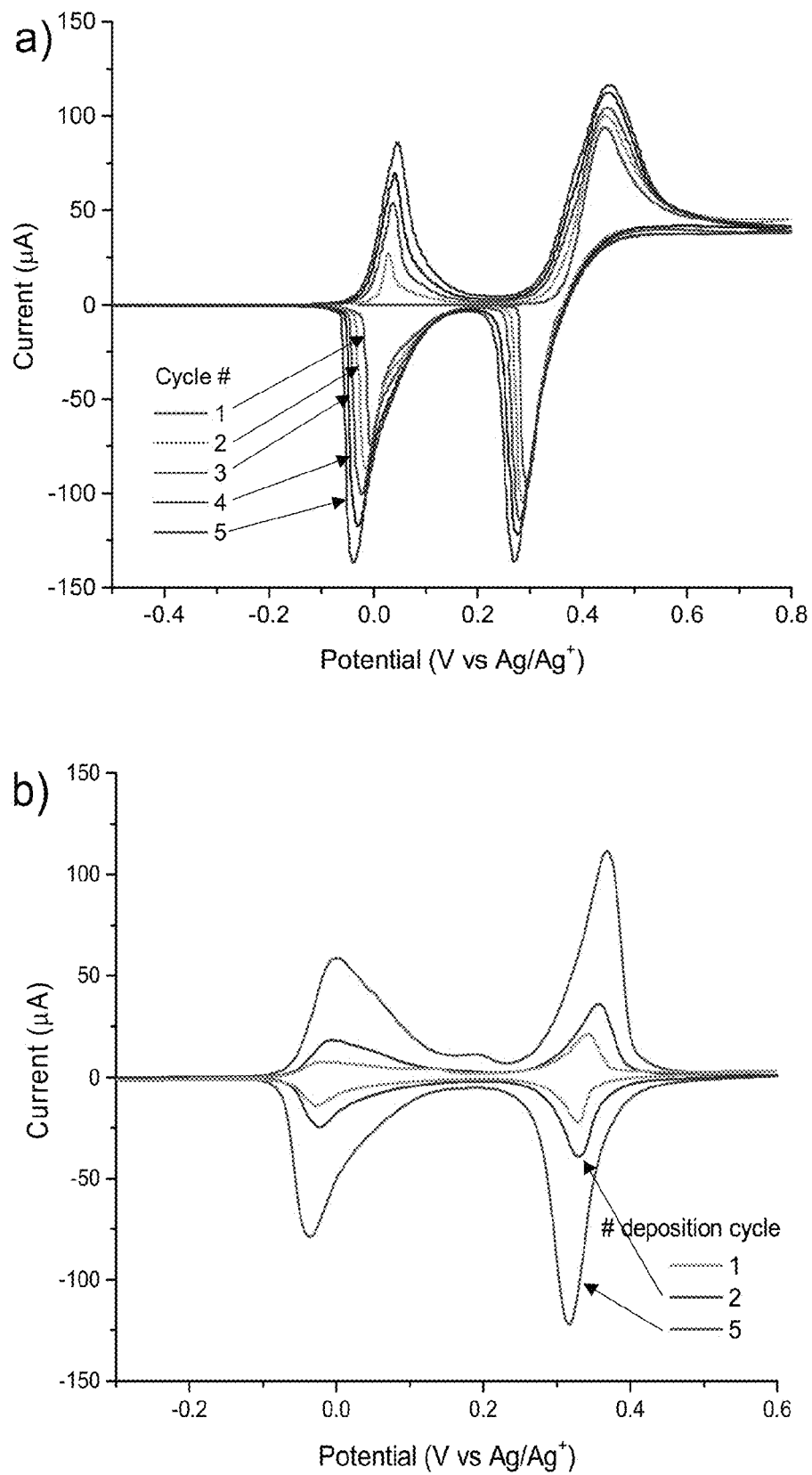
FIG. 8 shows (a) successive CVs of 5 mM DA-6 in 0.5 M [NBu$_4$][PF$_6$]/CH$_2$Cl$_2$ during electropolymerization at 20 mV s$^{-1}$. (b) CVs of PDA-6 films that were prepared by different deposition cycles, cycled in 0.5 M [NBu$_4$][PF$_6$]/CH$_3$CN at 20 mV s$^{-1}$. (c) Dependence of the anodic and cathodic peak currents ($i_p$a and $i_{pc}$, respectively) of PDA-6 on the number of deposition cycles during film preparation. These plots indicate that the polymer film growth follows a linear correlation with the number of electropolymerization cycles.
Figure 8:
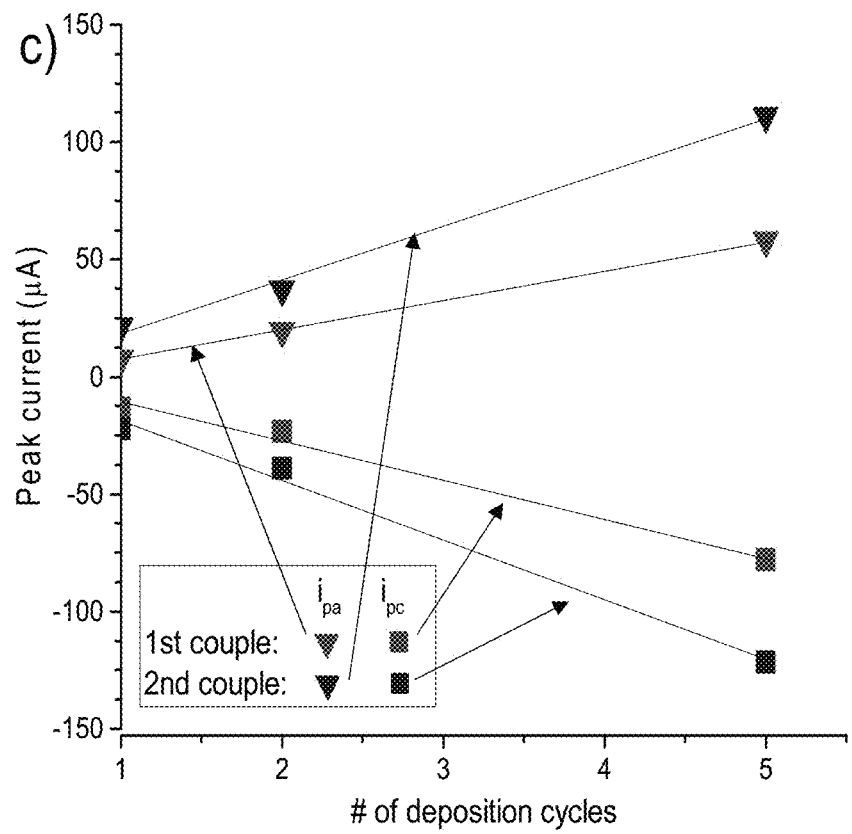

Along with the linker size of the monomers, we studied the effect of solvent polarity on the electropolymerization of DA-6 (FIG. 7). The onset of monomer oxidation shifts negative in more polar solvents, e.g. from +0.41 V in $CH_2Cl_2$ to 0.25 V in $CH_3CN$. The cathodic peak currents are larger in lower dielectric solvents and correspondingly, more polymer was deposited on the electrodes. Dichloromethane was found to be the best solvent for the electropolymerization, and a higher concentration of electrolyte (0.5 M) was used to lower the solution resistance.

Figure 13:
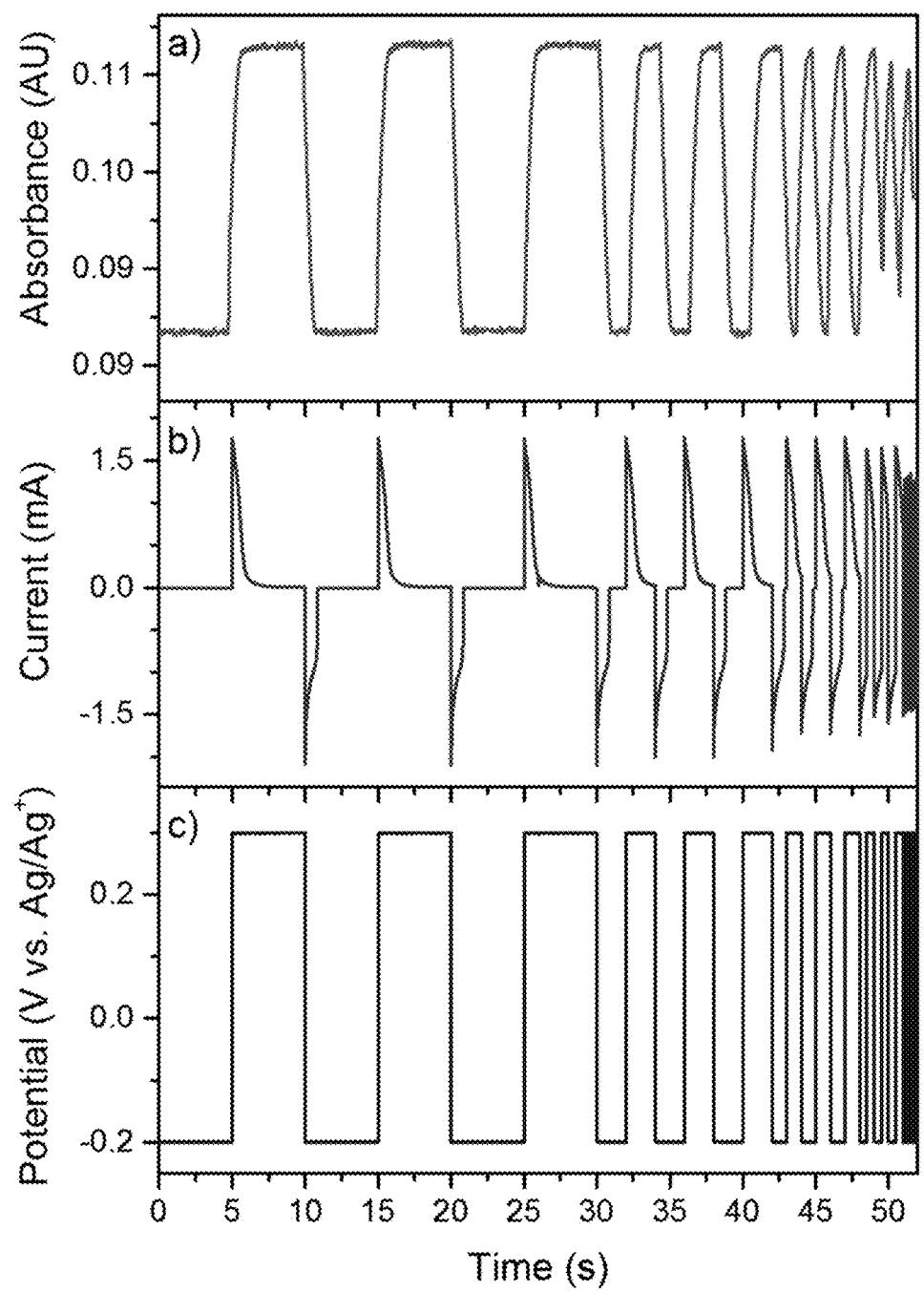
FIG. 13 shows simultaneously acquired (a) absorbance at 400 nm and (b) current measurements at set (c) applied potentials of PDA-6 deposited onto an ITO electrode in 0.5 M [NBu$_4$][PF$_6$]/CH$_3$CN. The switching time between the neutral, colorless polymer film and the green-colored PDA-6$^{+\cdot}$ is 0.9 seconds.
Figure 14:
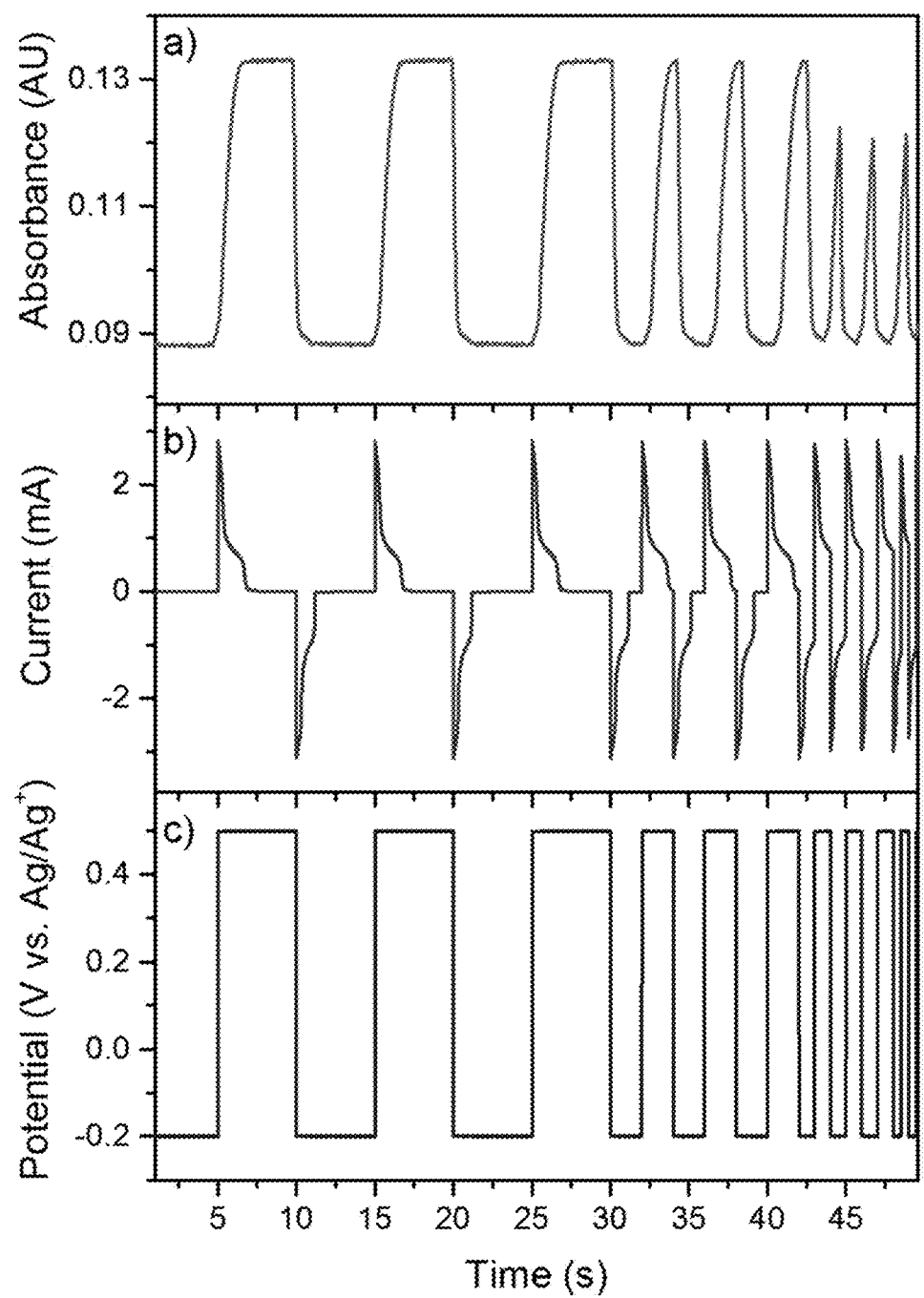
FIG. 14 shows simultaneously acquired (a) absorbance at 469 nm and (b) current measurements at set (c) applied potentials of PDA-6 deposited onto an ITO electrode in 0.5 M [NBu$_4$][PF$_6$]/CH$_3$CN. The switching time between the neutral, colorless polymer film and the dicationic, marigold-colored PDA-6$^{2+}$ is 1.8 seconds.

The progress of DA-6 electropolymerization and the charged state of PDA-6 can be followed visually due to the electrochromic properties of benzidines. The indium tin oxide (ITO) electrode is colorless at potentials before the first redox couple, turns green during the first redox couple, and marigold during the second redox couple. The changes in absorbance of PDA-6 deposited on ITO were monitored throughout one cycle by in situ spectroelectrochemistry. The contour plot of UV-Vis spectra (FIG. 3a) demonstrates that the spectroelectrochemistry of PDA-6 is highly reversible and symmetric. The UV-Vis spectra of the ITO electrode at potentials during the first redox couple contain several well-defined isosbestic points at 360, 498, and 565 nm (FIG. 3b), while the UV-Vis spectra of the second redox couple contain two isosbestic points at 411 and 570 nm (FIG. 3c). The isosbestic points indicate that the polymer cleanly and reversibly converts between the three redox states. The spectra of neutral PDA-6 at potentials I and IX, before any oxidation and after complete reduction respectively, overlap entirely. Similarly, the spectra match at potentials III and VII when the polymer has been oxidized and reduced to PDA-6+ respectively. The electrochromic nature of PDA-6 means the state of charge can be determined visually in transparent EES devices, and the films displayed typical switching times for electrochromic polymer films on the order of 1-2 seconds (FIG. 13-14).

Figure 9:
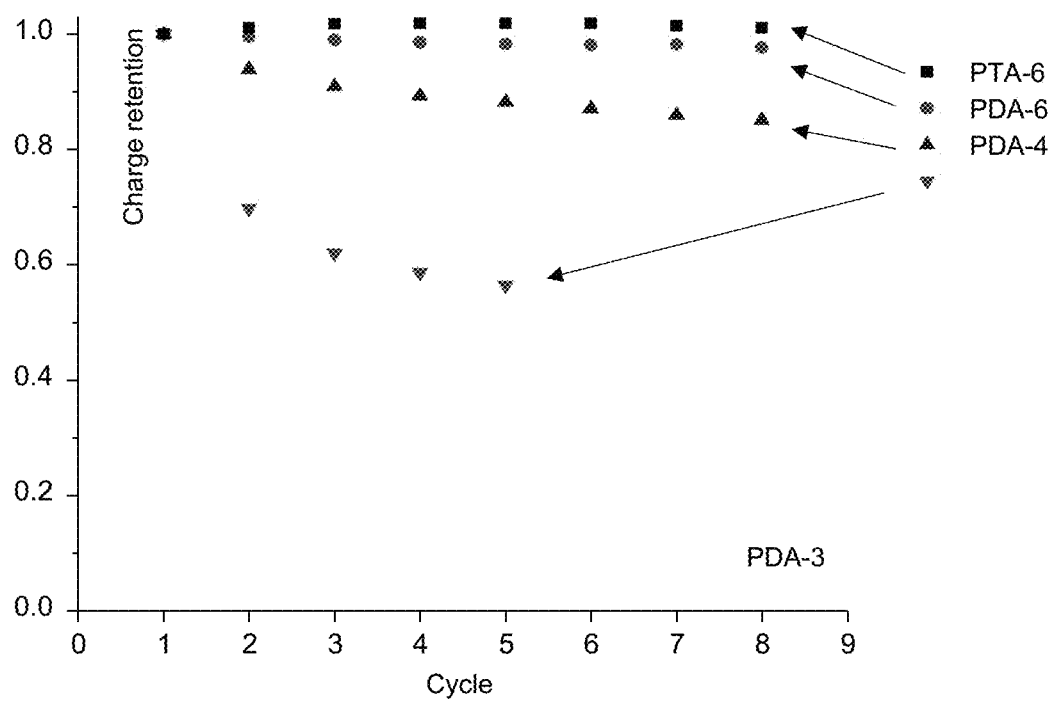
FIG. 9 shows the performance of polymer films, deposited on GCE as in FIG. 2a, cycled in 0.1 M [NBu$_4$][PF$_6$]/CH$_3$CN at 20 mV s$^{-1}$.
Figure 10:
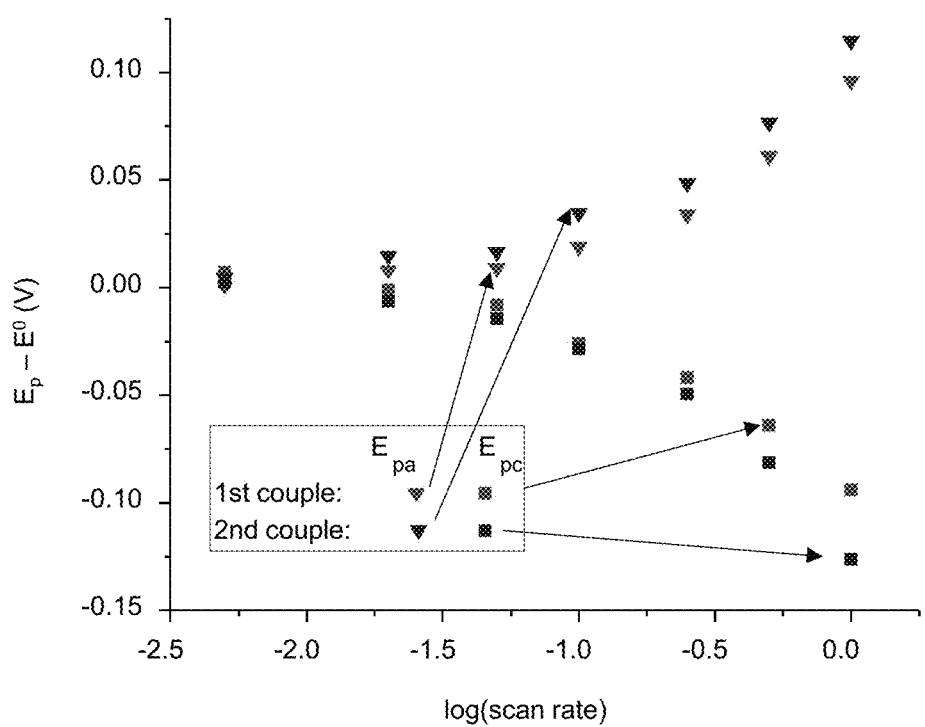
FIG. 10 shows dependence of the difference between peak potentials ($E_p$) and the formal redox potential (E') on the logarithm of the scan rate (log(v)).
Figure 11:
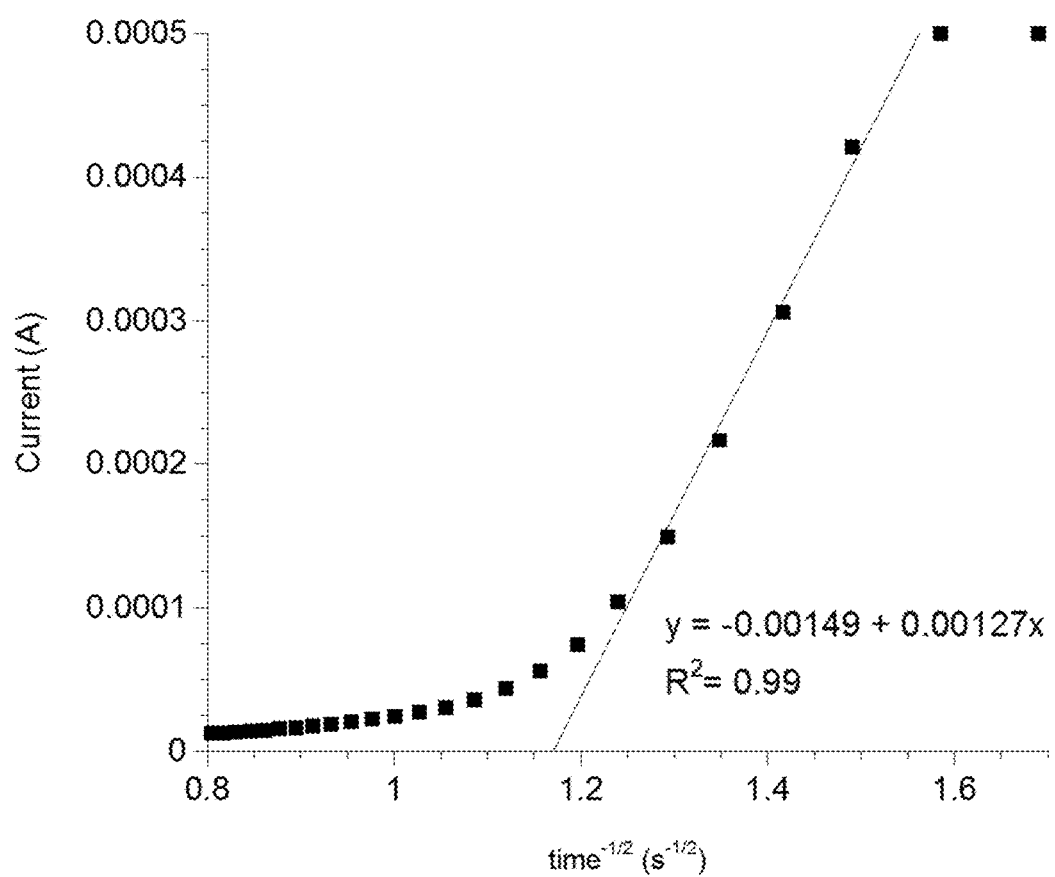
FIG. 11 show Cottrell plot of PDA-6 in 0.1 M [NBu$_4$][PF$_6$]/CH$_3$CN.

The applicability of this family of benzidine polymers, as cathode materials in thin-film electrochemical energy storage systems, was initially examined by cycling the electropolymerized films using CV in 0.1 M $(C_4H_9)_4NPF_6$ in $CH_3CN$. Further studies focused on PDA-6 because the polymer, with a theoretical capacity of 181 mA h g$^{-1}$, exhibits two well-behaved redox couples and desireable charge retention (FIG. 9). Cycle-life performance testing was conducted using galvanostatic cycling experiments at different current densities. Thin films of PDA-6 were electrodeposited onto GCE in 0.5 M $(C_4H_9)_4NPF_6$ in $CH_2Cl_2$ and cycled in 0.5 M $(C_4H_9)_4NPF_6$ in $CH_3CN$. The film thickness of PDA-6 on GCE was measured to be 101 nm by contact profilometry. After PDA-6 was charged to PDA-6$^{2+}$, the polymer was discharged at various "C" rates, where a rate of 1 C indicates that it takes 1 h for a full charge or discharge. The discharge curves in FIG. 4a display two voltage plateaus at approximately +0.31 and 0 V vs. Ag/Ag$^+$ (3.6 and 3.3 V vs. Li/Li$^+$) that correspond closely to the two reductions from PDA-6$^{2+}$ to neutral PDA-6. Remarkably, at rates of 100-1,000 C, the thin film was discharged to ~165 mA h g$^{-1}$ (or 5.09 mC cm$^{-2}$). At the current rate of 1,000 C, the polymer was fully discharged in less than 4 s. The higher current densities at high C rates lead to an increase in the IR voltage drop due to the internal cell resistance, lowering cell performance. Contrary to prior art, including 50 nm polymer films, the capacity did not decrease considerably at high current rates for PDA-6. While the discharge plateaus shifted negative at faster rates, as expected, the IR drop was not significant, even at 1,000 C, to dramatically impact the capacity (only a 2% decrease in capacity with a tenfold increase in rate). The remarkable rate capability of PDA-6 is a result of the rapid kinetics of the two electron transfer reactions ($k_s$=0.4, 0.5 s$^{-1}$) and the efficient charge propagation within the 100 nm polymer film, which has diffusion coefficients on the order of 10-9 cm$^2$ s$^{-1}$ (FIG. 10-11).

Figure 4:
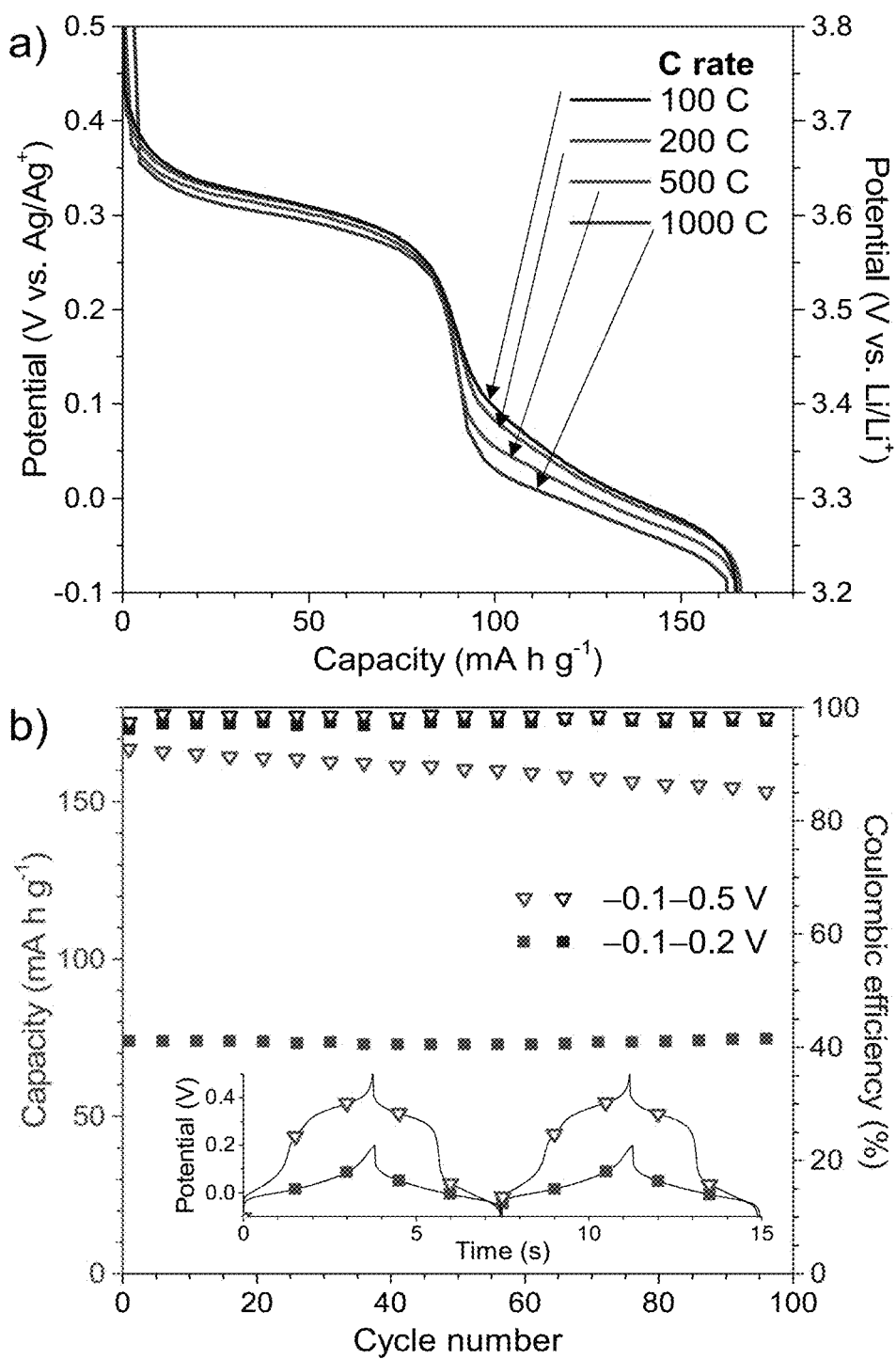
FIG. 4 shows (a) discharge curves for PDA-6 at various C rates. (b) The capacity (red) and Coulombic efficiency (blue) of PDA-6 with different positive cutoffs in 0.5 M [NBu$_4$][PF$_6$]/CH$_3$CN at rate of 1,000 C. Inset: Representative charge and discharge curves for PDA-6 with different potential ranges. The range was −0.1-0.2 V (square) and −0.1-0.5 V (triangle) vs. Ag/Ag$^+$.
Figure 5:
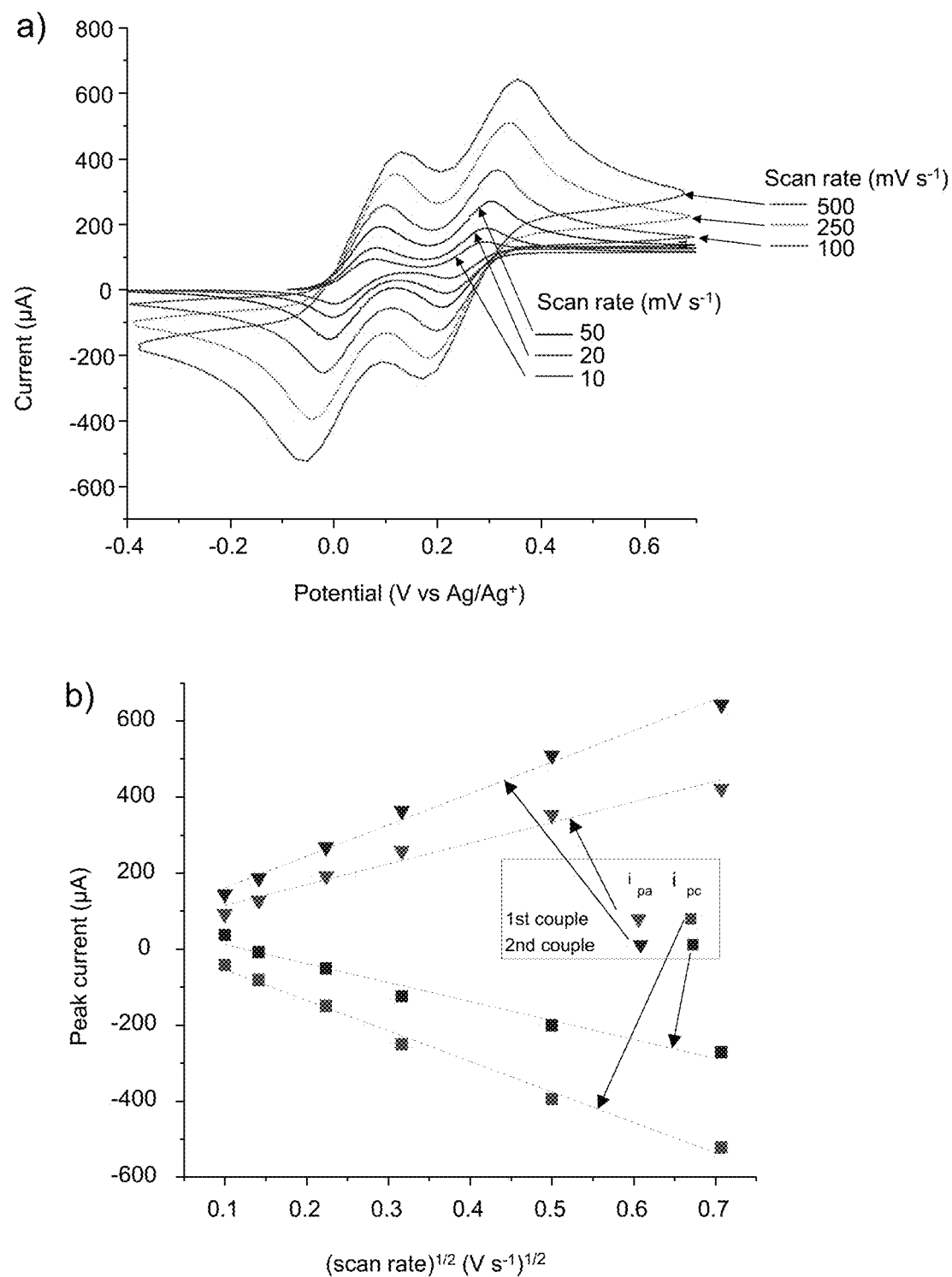
FIG. 5 shows (a) sweep rate dependent CVs of 10 mM N,N,N',N'-tetramethylbenzidine (TMB, Aldrich) in 0.1 M [NBu$_4$][PF$_6$]/CH$_3$CN. (b) The dependence of the peak currents of the two redox couples of TMB on the square root of the scan rate. The linear fits indicate that TMB undergoes two reversible one-electron transfers in solution.
Figure 15:
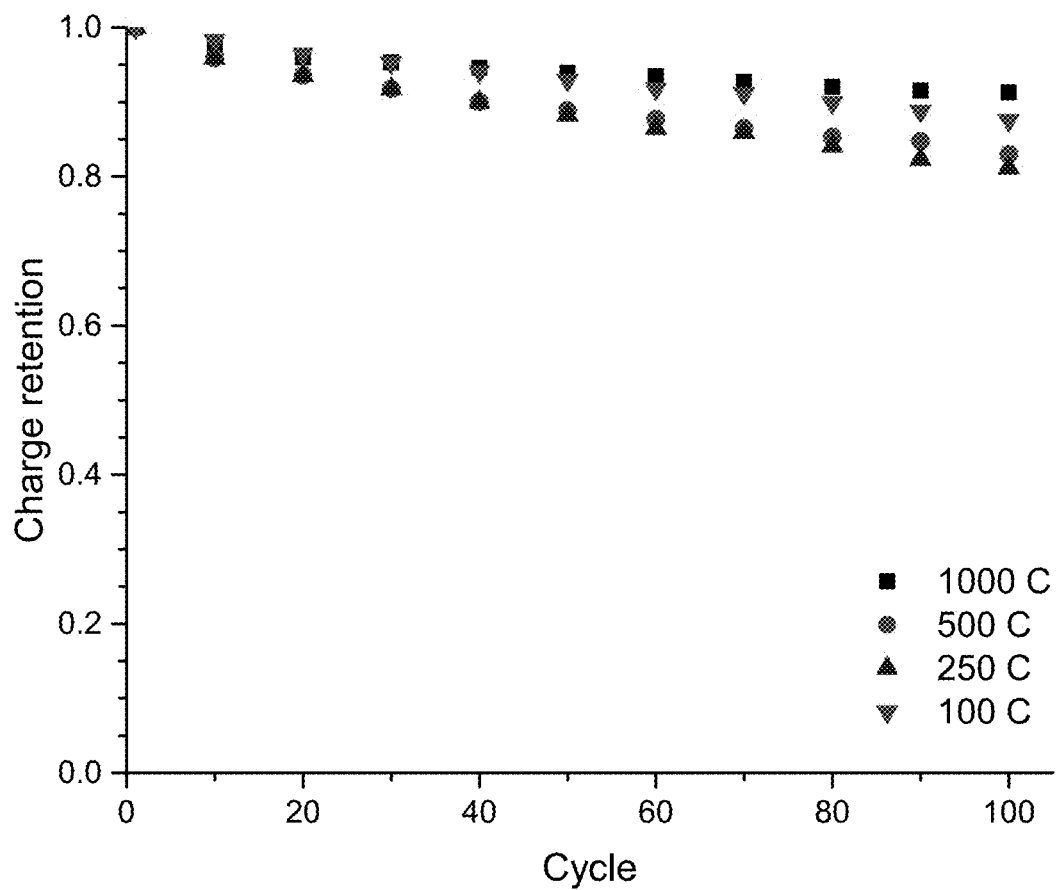
FIG. 15 shows performance of a PDA-6 films cycled at various ° C. rates over 100 cycles. The polymer films on GCE were galvanostatically charged and discharged in 0.5 M [NBu$_4$][PF$_6$]/CH$_3$CN between −0.1-0.5 V. The |applied current| was the same for the charge and discharge except for 100° C. which was charged at 1000 C and discharged at 100° C.

The comparable capacities at high C rates prompted additional tests of thin films of PDA-6 as a high power cathode material. FIG. 4b shows the cycling performance of the PDA-6 film charged and discharged at 1,000 C for 100 cycles at two different positive potential limits. If the polymer was only cycled between the PDA-6/PDA-6$^{+\bullet}$ couple in the range −0.1-0.2 V vs. Ag/Ag$^+$, the capacity is 74 mA h g$^{-1}$ and the film displays desirable cycle performance with >99% discharge retention after 100 cycles and >96% Coulombic efficiency. When the range was expanded to −0.1-0.5 V, PDA-6$^{+\bullet}$ can be further oxidized to PDA-6$^{2+}$, thereby increasing the capacity to 165 mA h g$^{-1}$. We accessed 91% of the theoretical capacity of 181 mA h g$^{-1}$ in the thin film. The polymer film exhibited good cycling stability with 92% discharge retention after 100 cycles and >98% Coulombic efficiency. Similar trends were seen in PDA-6 films cycled at slower rates (FIG. 15). Using capacity values of 74 and 91 mA h g$^{-1}$ for the first and second redox processes, respectively, at voltages of 3.3 and 3.6 V vs. Li/Li$^+$, we obtained energy densities of 244 and 327 W h kg$^{-1}$. Moreover, at a C rate of 1,000, and using the above-mentioned energy densities, they represent very high power densities of 2.4 and 3.3×10$^5$ W kg$^{-1}$.

Figure 12:
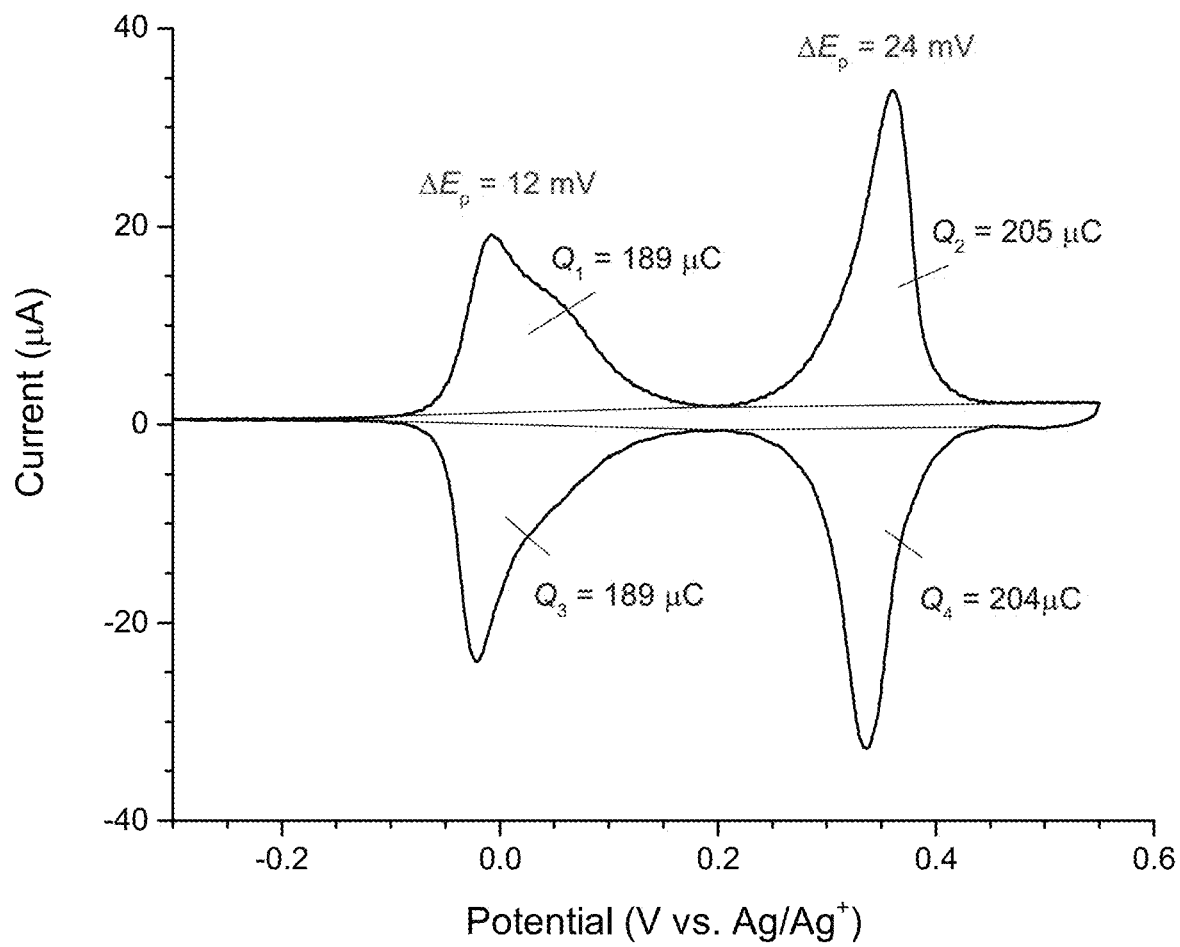
FIG. 12 shows cyclic voltammogram of PDA-6 cycled in 0.5 M [NBu$_4$][PF$_6$]/CH$_3$CN at 10 mV s$^{-1}$. Shown in the plot are the differences in the peak potentials ($\Delta E_p$) of the two redox couples as well as the charge (Q) for each peak after subtraction of the contribution from the double layer (shown in blue lines).
Figure 16:
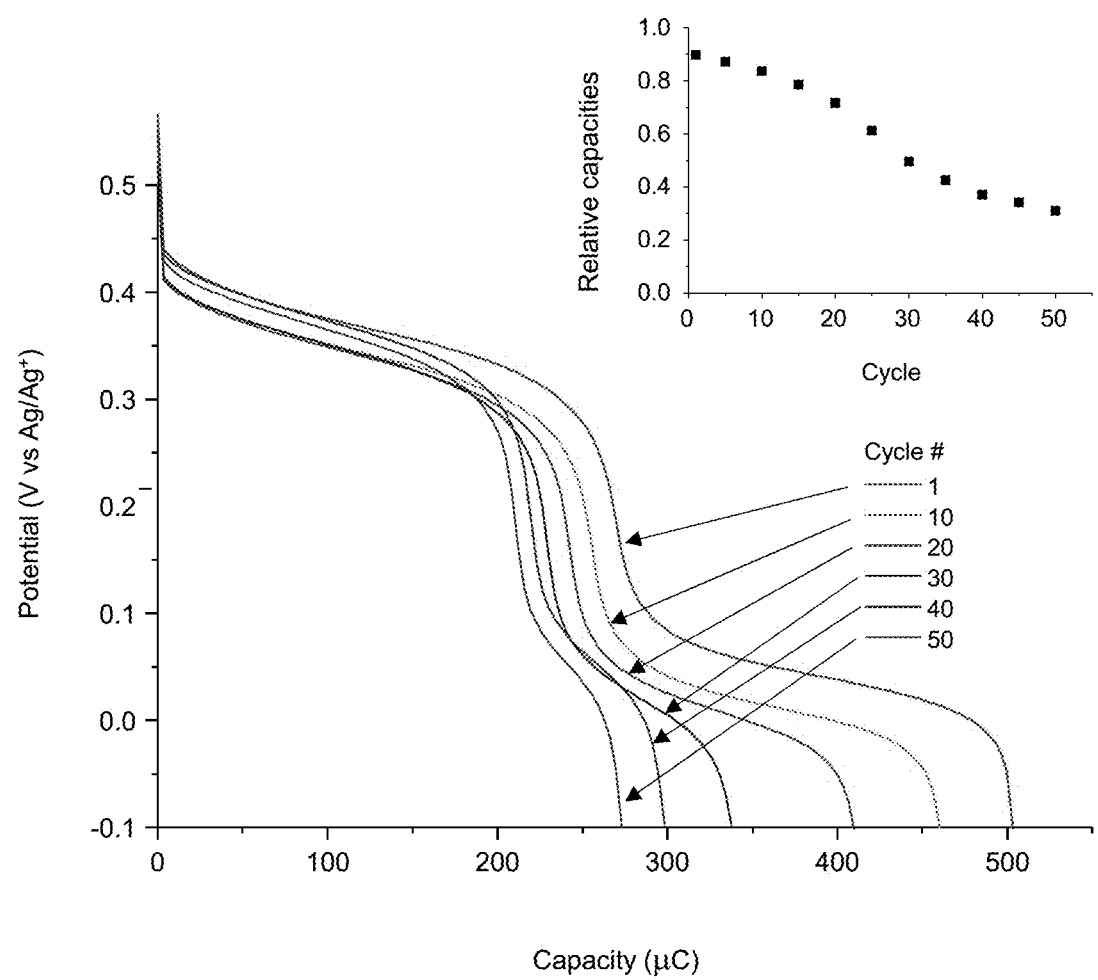
FIG. 16 shows discharge curves of PTA-6 in 0.5 M [NBu$_4$][PF$_6$]/CH$_3$CN at an applied current of 36 μA. Inset: The relative capacities between the two couples with cycling, where the first reduction occurs between +0.2 and −0.1 V and the second reduction is between +0.5 and +0.2 V vs. Ag/Ag$^+$. Relative capacities=capacity (1$^{st}$ reduction)/capacity (2$^{nd}$ reduction).

When the polymer film was cycled around both redox couples, the total capacity was expected to have equal contribution from each redox couple. However, the second redox couple had a higher capacity than the first (91 compared to 74 mA h g$^{-1}$). The additional capacity can be accounted for by the flatter discharge plateau at +0.31 V than at 0 V which enables more capacity from the PDA-6⁺·/PDA-6²⁺ couple than the PDA-6/PDA-6⁺-couple (FIG. 4a). Also, the charge calculated from a CV of PDA-6 film revealed that there is more charge from the second redox couple than the first couple (FIG. 12). One possible reason for this imbalance is that the film contains fragments of PDA-6⁺· that can be oxidized to PDA-6²⁺ but not reduced to PDA-6. This charge trapping phenomenon was also seen in films of PTA-6 where the capacity of the first redox couple decreases relative to the second couple during cycling (FIG. 16). Attempts to improve charge retention by co-electropolymerizing the crosslinker TA-6 with DA-6 also gave rise to charge trapping and poorer cycling than PDA-6.

In summary, we describe a series of di- and trianilinoalkanes capable of forming thin electroactive films directly on electrodes, by electrochemical oxidative polymerization. Increasing the length of the alkyl linker between aniline groups facilitated the electropolymerization process and more polymer was deposited on the electrode. In comparison to shorter alkyl analogs, PDA-6 and PTA-6 exhibit two redox couples with small $\Delta E_p$s. PDA-6 displayed reversible electrochromic behavior as the neutral, colorless polymer turns green as the radical cation (PDA-6⁺·) and marigold as the dication (PDA-6²⁺) are generated. The ability to visually identify the state of charge of the cathode material could be useful in transparent EES devices. Due to the fast kinetics of the two electron transfers and the 100 nm thick film, PDA-6 can be charged and discharged at rates up to 1,000 C without an appreciable loss in capacity. The polymer displayed exceptional stability (>99% retention) when cycled only around the first couple. When the polymer is fully oxidized to PDA-6²⁺, there are two distinct voltage plateaus and the film retains 92% of the initial capacity of 165 mA h g⁻¹ after 100 cycles. These findings indicate the potential usage of PDA-6 as a cathode material in thin-film batteries that combines the high capacity of batteries with the high power of supercapacitors. Investigation is currently underway to use the polymers on high surface area electrodes for 3D and flexible batteries.

1. General Considerations. All manipulations of air and water sensitive compounds were carried out under dry nitrogen using a Braun UniLab drybox or standard Schlenk line techniques. ¹H NMR spectra were recorded on a Varian INOVA 400 (¹H, 400 MHz) and referenced with residual non-deuterated solvent shift (CHCl₃=7.26 ppm). ¹³C NMR spectra were recorded on Varian INOVA 500 (¹³C, 125 MHz) spectrometer and referenced to chloroform (77.16 ppm). High resolution mass spectrometry (HRMS) analyses were carried out on a Thermo Scientific Exactive Orbitrap MS system equipped with an Ion Sense DART ion source. Flash column chromatography was performed using silica gel (particle size 40-64 m, 230-400 mesh).

Electrochemistry experiments were performed at 22° C. using a Hokuto Denko HABF1510m or a Princeton Applied Research VersaSTAT 3 potentiostat. All cyclic voltammetry (CV) measurements were carried out in a fritted three compartment cell using a glassy carbon working electrode (GCE, 3 mm diameter), a large-area Pt counter electrode, and a Ag/Ag⁺ (0.05 M AgClO₄ and 0.1 M [NBu₄][ClO₄] in CH₃CN) reference electrode. The potential, 0 V, measured using a Ag/Ag⁺ reference electrode is +3.3 V vs. Li/Li⁺. UV-Vis absorption spectra were obtained using a HP 8453 diode array spectrophotometer using a fritted three compartment cell.

The thickness of the electropolymerized films on GCEs were measured with a contact profilometer (Tencor Alpha Step 500) after scraping away a section of the polymer film with a razor blade. Line scans were performed at different points along the film edge. The thickness readings were then averaged to determine the mean film thickness.

2. Materials. Tris(dibenzylideneacetone)dipalladium(0) (Pd₂(dba)₃), DavePhos (2-(dicyclohexylphosphino)-2'-(N,N-dimethylamino))-1,1'-biphenyl), and sodium tertbutoxide (NaOt-Bu) were purchased from Strem and used as received. Bromobenzene and acetonitrile were purchased from Sigma-Aldrich and distilled over CaH₂. N,N'-dimethylethylenediamine, N,N'-dimethyl-1,3-propanediamine, and N,N'-dimethyl-1,6-hexanediamine were purchased from Sigma-Aldrich and distilled over KOH. HPLC grade toluene and dichloromethane were purchased from Fischer Scientific and dried over an alumina column. Tetrabutylammonium hexafluorophosphate was purchased from TCI America and recrystallized twice from absolute ethanol and dried under vacuum. Indium-tin oxide (ITO) coated glass slides (10 Ω/sq. in.) were purchased from Nanocs and cleaned by sonicating in acetone, and then isopropanol. All other reagents were purchased from commercial sources and used as received.

3. Synthesis of Di- and Trianilinoalkane Monomers

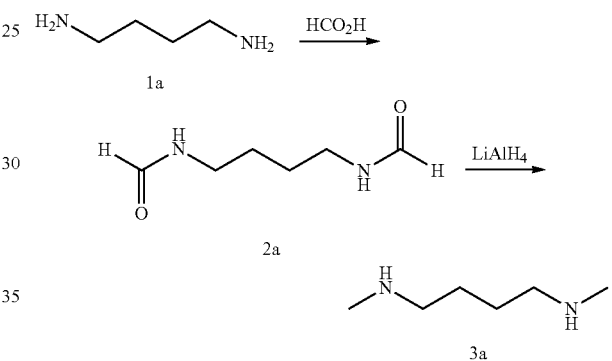

N,N'-Dimethyl-1,4-butanediamine (3a). N,N'-Dimethyl-1,4-butanediamine was prepared according to a literature procedure. Formic acid (88% Macron, 35.2 mL, 0.821 mol) was added dropwise to 1,4-butanediamine (1a, Aldrich, 25 mL, 0.25 mol) at 0° C. The solution was refluxed for 1 h, and then the pressure was lowered slowly until the reaction was refluxing under full vacuum for 4 h. A white precipitate crashed out of the cooled reaction and was collected by filtration. The intermediate 2a was recrystallized using isoamyl alcohol and dried under reduced pressure to give a white powder (81% yield). The diamide (2a, 6.49 g, 45.0 mmol) was reduced using LiAlH₄ (7.25 g, 191 mmol) in 180 mL ether. After stirring overnight, the mixture was quenched with 20 mL water at 0° C. The white mixture was filtered over Celite and washed with ether. The filtrate was dried over MgSO₄ and concentrated. Distillation under vacuum with KOH (b.p. 52° C., 14 mmHg) afforded 3a in 54% isolated yield. ¹H NMR spectrum in ppm (CDCl₃, 400 MHz): δ 2.56 (m, 4H), 2.40 (s, 6H), 1.49 (m, 4H), 1.23 (br s, 2H) and was consistent with previous literature.

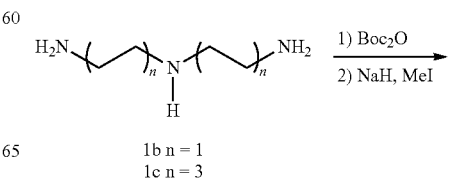

1b n = 1
1c n = 3

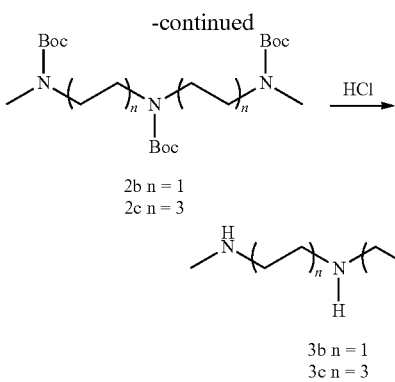

2b n = 1
2c n = 3

3b n = 1
3c n = 3

N-Methyl-N'-[2-(methylamino)ethyl]-1,2-ethanediamine trihydrochloride (3b). The triamine hydrochlorides were prepared by the method of Edwards. Diethylenetriamine (1b, Aldrich, 1.02 g, 9.89 mmol) was dissolved in methanol (15 mL) and di-tert-butyl dicarbonate (TCI America, 7.3 g, 33 mmol) was added and the reaction stirred overnight (12 h). Water was added and the product was extracted with ether, washed with brine, dried with $MgSO_4$, and concentrated. The clear, colorless oil crystallized on standing at 25° C. resulting in a white powder (88% yield). In the glovebox, NaH (Aldrich 95%, 0.56 g, 23 mmol) was added to a Schlenk flask. The solution of tris-Boc-protected diethylenetriamine (2.98 g, 7.38 mmol) dissolved in dry DMF (4.5 mL) was injected in under N2. After the mixture was stirred at 25° C. for 1 h, methyl iodide (Aldrich, 1.4 mL, 22 mmol) was added in dropwise. After 12 h, the reaction was quenched with water and the product was extracted into $CH_2Cl_2$ and washed with brine. The crude product was purified via flash column chromatography using 30% ethyl acetate/hexanes as the eluent to give 2b as a clear, viscous oil (42% isolated yield).

Compound 2b (1.35 g, 3.13 mmol) was dissolved in absolute ethanol (8 mL) and 2 M HCl in ether (8 mL, 16 mmol) was added. After 5 h, the white precipitate was collected by filtration and dried under vacuum to give 3b (89% isolated yield). $^1$H NMR spectrum ($D_2O$, 400 MHz): δ 3.42-3.56 (m, 8H), 2.80 (s, 6H) and was consistent with previous literature.

N-Methyl-N'-[6-(methylamino)hexyl]-1,6-hexanediamine trihydrochloride (3c), bis(hexamethylene)triamine (1c, Aldrich, 0.50 g, 2.3 mmol) was dissolved in methanol (5 mL) and di-tert-butyl dicarbonate (TCI America, 1.68 g, 7.70 mmol) was added and the reaction stirred overnight (12 h). Water was added and the product was extracted with ether, washed with brine, dried with $MgSO_4$, and concentrated. The product was purified by column chromatography using 20% ethyl acetate/hexanes to obtain a clear, colorless oil (91% yield). In the glovebox, NaH (Aldrich 95%, 0.275 g, 11.4 mmol) was added to a Schlenk flask. The tris-Boc-protected bis(hexamethylene)triamine (1.47 g, 2.86 mmol) dissolved in dry DMF (6 mL) was injected in under N2. After the mixture was stirred at 25° C. for 1 h, methyl iodide (Aldrich, 1.36 mL, 21.8 mmol) was added in dropwise. After 12 h, the reaction was quenched with water and the product was extracted into $CH_2Cl_2$ and washed with brine. The crude product was purified via flash column chromatography using 30% ethyl acetate/hexanes as the eluent to give 2c as a clear, viscous oil (62% isolated yield).

Compound 2c (0.82 g, 1.5 mmol) was dissolved in absolute ethanol (4 mL) and 2 M HCl in ether (10 mL, 20 mmol) was added. After 5 h, the white precipitate was collected by filtration and dried under vacuum to give 3c (79% isolated yield). $^1$H NMR spectrum ($D_2O$, 400 MHz): δ 3.02 (t, 8H), 2.70 (s, 6H), 1.69 (br s, 8H), 1.41 (br s, 8H).

Representative Pd-catalyzed Coupling Procedure A

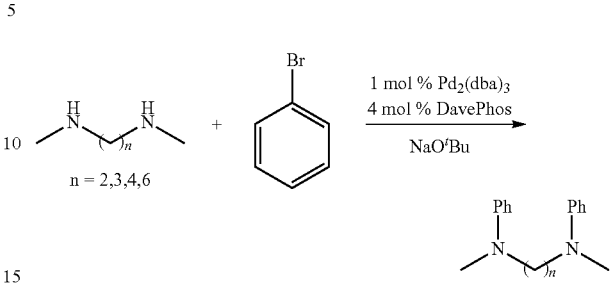

n = 2,3,4,6

In the glovebox, $Pd_2(dba)_3$ (1 mol %), DavePhos (4 mol %), and NaOt-Bu (2.3 equiv.) were added to an oven-dried Schlenk tube equipped with a magnetic stir bar. Then chlorobenzene (2.5 mL) was added, followed by bromobenzene (9 equiv.) and the diamine (1 equiv.). After sealing, the tube was heated in an oil bath set at 100° C. for 5 d. After cooling, the cooled mixture was filtered over Celite and washed with $CH_2Cl_2$. The filtrate was concentrated and evacuated under reduced pressured to remove excess bromobenzene and solvent. The crude product was purified by flash column chromatography.

Representative Pd-catalyzed Coupling Procedure B. In the glovebox, NaO$^t$Bu (2.8 equiv.) and bromobenzene (9 equiv.) were added to an oven-dried Schlenk tube equipped with a magnetic stir bar. Then the diamine (1 equiv.) in 0.25 mL of toluene was added, followed by a mixture of $Pd_2(dba)_3$ (1 mol %) and DavePhos (4 mol %) in 0.5 mL toluene. After sealing, the tube was heated in an oil bath set at 50° C. overnight for 12 h, then at 100° C. for 12 h. After cooling, the cooled mixture was filtered over Celite and washed with $CH_2Cl_2$. The filtrate was concentrated and the crude product was purified by flash column chromatography.

Representative Pd-Catalyzed Coupling Procedure C

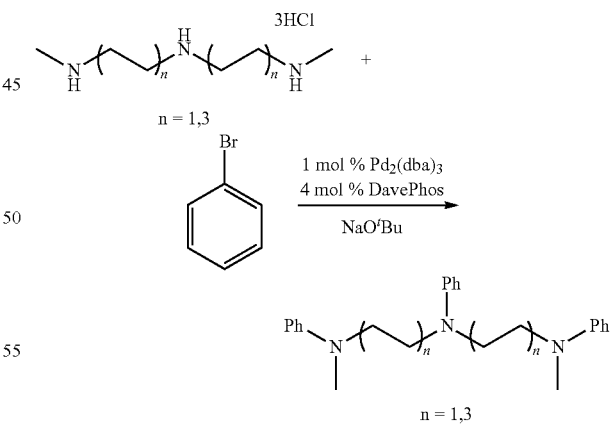

n = 1,3

In the glovebox, $Pd_2(dba)_3$ (1 mol %), DavePhos (4 mol %) and NaOt-Bu (6 equiv.) were added to an oven-dried Schlenk tube equipped with a magnetic stir bar. Then, bromobenzene and the triamine (1 equiv.) were added. After sealing, the tube was heated in an oil bath set at 100° C. for 3 d. After cooling, the cooled mixture was filtered over Celite and washed with $CH_2Cl_2$. The filtrate was concentrated and evacuated under reduced pressured to remove excess bromobenzene. The crude product was purified by flash column chromatography.

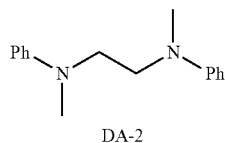

DA-2

N,N'-Dimethyl-N,N'-diphenylethylenediamine (DA-2). Following the general procedure B, a mixture of bromobenzene (1.5 g, 9.6 mmol), N,N'-dimethylethylenediamine (88 mg, 1.0 mmol), Pd$_2$(dba)$_3$ (9.5 mg, 10 μmol), DavePhos (16.7 mg, 42.4 μmol), NaO$^t$Bu (272 mg, 2.83 mmol), and toluene (0.75 mL) was heated to 50° C. for 12 h then 100° C. for 12 h. The crude product was purified by flash column chromatography using 5% ethyl acetate/hexanes as the eluent ($R_f$=0.32) to give a yellow powder (97% isolated yield). Spectroscopic characterization was consistent with that reported in previous literature. $^1$H NMR spectrum (CDCl$_3$, 400 MHz): δ 7.22-7.29 (m, 4H), 6.69-6.75 (m, 6H), 3.55 (s, 4H), 2.95 (s, 6H). $^{13}$C NMR (CDCl$_3$, 125 MHz): δ 148.98, 129.43, 116.36, 111.94, 49.85, 38.82. HRMS (DART-MS m/z calculated for C$_{16}$H$_{20}$N$_2$$^+$ (M+H$^+$) 241.1621, found 241.1700.

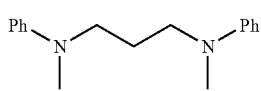

DA-3

N,N'-Dimethyl-N,N'-diphenyl-1,3-propanediamine (DA-3). Following the general procedure A, a mixture of bromobenzene (1.5 g, 9.6 mmol), N,N'-dimethyl-1,3-propanediamine (107 mg, 1.05 mmol), Pd$_2$(dba)$_3$ (9.5 mg, 10 μmol), DavePhos (20.7 mg, 52.6 μmol), NaO$^t$Bu (230 mg, 2.39 mmol), and chlorobenzene (2.5 mL) was heated to 100° C. for 5 d. The crude product was purified by flash column chromatography using 5% ethyl acetate/hexanes as the eluent ($R_f$=0.24) to give a yellow oil (88% isolated yield). $^1$H NMR spectrum (CDCl$_3$, 400 MHz): δ 7.18-7.25 (m, 4H), 6.66-6.73 (m, 6H), 3.37 (t, 4H), 2.92 (s, 6H), 1.83-1.93 (m, 2H). $^{13}$C NMR (CDCl$_3$, 125 MHz): δ 129.28, 116.43, 112.57, 50.61, 38.50, 24.28. HRMS (DART-MS) m/z calculated for C$_{17}$H$_{22}$N$_2$$^+$ (M+H$^+$) 255.1778, found 255.1854.

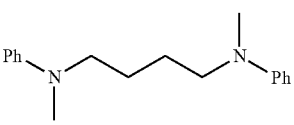

DA-4

N,N'-Dimethyl-N,N'-diphenyl-1,4-butanediamine (DA-4). Following the general procedure A, a mixture of bromobenzene (1.5 g, 9.6 mmol), 3a (122 mg, 1.05 mmol), Pd$_2$(dba)$_3$ (9.2 mg, 10 μmol), DavePhos (22.7 mg, 57.7 μmol), NaO$^t$Bu (235 mg, 2.44 mmol), and chlorobenzene (2.5 mL) was heated to 100° C. for 5 d. The crude product was purified by flash column chromatography using 5% ethyl acetate/hexanes as the eluent ($R_f$=0.23) to give a yellow powder (78% isolated yield). $^1$H NMR spectrum (CDCl$_3$, 400 MHz): δ 7.20-7.26 (m, 4H), 6.66-6.72 (m, 6H), 3.34 (m, 4H), 2.92 (s, 6H), 1.59-1.64 (m, 4H). $^{13}$C NMR (CDCl$_3$, 125 MHz): δ 149.37, 129.30, 116.14, 112.28, 52.80, 38.43, 24.56. HRMS (DART-MS) m/z calculated for C$_{18}$H$_{25}$N$_2$$^+$ (M+H$^+$) 269.2012, found 269.2012.

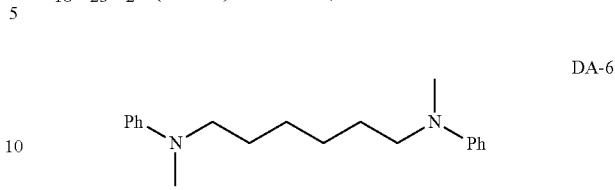

DA-6

N,N'-Dimethyl-N,N'-diphenyl-1,6-hexanediamine (DA-6). Following the general procedure B, a mixture of bromobenzene (1.5 g, 9.6 mmol), N,N'-dimethyl-1,6-hexanediamine (146 mg, 1.01 mmol), Pd$_2$(dba)$_3$ (9.4 mg, 10 μmol), DavePhos (17 mg, 43 mol), NaO$^t$Bu (270 mg, 2.81 mmol), and toluene (0.75 mL) was heated to 50° C. for 12 h then 100° C. for 12 h. The crude product was purified by flash column chromatography using 5% ethyl acetate/hexanes as the eluent ($R_f$=0.26) to give a yellow oil (82% isolated yield). Spectroscopic characterization was consistent with that reported in previous literature. $^1$H NMR spectrum (CDCl$_3$, 400 MHz): δ 7.19-7.25 (m, 4H), 6.66-6.71 (m, 6H), 3.30 (t, 4H), 2.91 (s, 6H), 1.54-1.63 (m, 4H), 1.33-1.40 (m, 4H). $^{13}$C NMR (CDCl$_3$, 125 MHz): δ 149.38, 129.23, 115.95, 112.17, 52.79, 38.38, 27.20, 26.75. HRMS (DART-MS) m/z calculated for C$_{20}$H$_{28}$N$_2$$^+$ (M+H$^+$) 297.2247, found 297.2325.

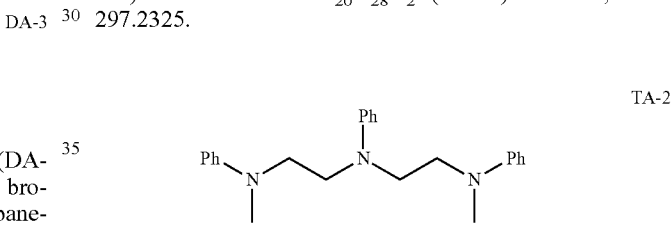

TA-2

N$^1$,N$^2$-dimethyl-N$^1$-(2-(methyl(phenyl)amino)ethyl)-N-phenylethane-1,2-diamine (TA-2). Following the general procedure C, a mixture of bromobenzene (2.5 g, 16 mmol), 3b (128 mg, 0.532 mmol), Pd$_2$(dba)$_3$ (16 mg, 17 μmol), DavePhos (38 mg, 96 μmol), NaO$^t$Bu (360 mg, 3.75 mmol) was heated to 100° C. for 3 d. The crude product was purified by flash column chromatography using 4% ethyl acetate/hexanes as the eluent ($R_f$=0.15) to give a yellow powder (74% isolated yield). $^1$H NMR spectrum (CDCl$_3$, 400 MHz): δ 7.18-7.29 (m, 5H), 6.63-6.76 (m, 9H), 3.50 (s, 8H), 2.90 (s, 6H). $^{13}$C NMR (CDCl$_3$, 125 MHz): δ 148.95, 147.57, 129.72, 129.47, 116.51, 116.37, 112.02, 111.58, 50.08, 48.24, 38.87. HRMS (DART-MS) m/z calculated for C$_{24}$H$_{30}$N$_3$$^+$ (M+H$^+$) 360.2434, found 360.2434.

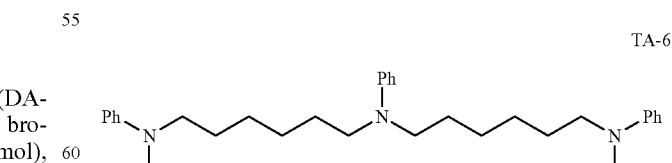

TA-6

N$^1$,N$^7$-dimethyl-N$^1$-(6-(methyl(phenyl)amino)hexyl)-N-phenylheptane-1,7-diamine (TA-6). Following the general procedure C, a mixture of bromobenzene (2.5 g, 16 mmol), 3c (470 mg, 1.33 mmol), Pd$_2$(dba)$_3$ (29 mg, 32 μmol), DavePhos (54 mg, 0.14 mmol), NaO$^t$Bu (813 mg, 8.46 mmol) was heated to 100° C. for 3 d. The crude product was purified by flash column chromatography using 5% ethyl acetate/hexanes as the eluent ($R_f$=0.18) to give a yellow oil (47% isolated yield). $^1$H NMR spectrum (CDCl$_3$, 400 MHz): δ 7.17-7.24 (m, 6H), 6.61-6.70 (m, 9H), 3.30 (t, 4H), 3.23 (t, 4H), 2.91 (s, 6H), 1.54-1.62 (m, 8H), 1.33-1.37 (m, 8H). $^{13}$C NMR (CDCl$_3$, 125 MHz): δ 149.41, 148.14, 129.33, 129.26, 115.98, 115.35, 112.19, 111.83, 52.83, 51.10, 38.42, 27.35, 27.23, 26.79. The γ-carbon to aniline groups (27.23 ppm) exhibit chemical shift equivalence. HRMS (DART-MS) m/z calculated for $C_{32}H_{45}N_3^+$ (M+H$^+$) 471.3608, found 471.3686.

4. Electrochemical Measurements. 4.1 Cyclic Voltammetry (CV) & Chronoamperometry. CV and chronoamperometry measurements were taken in a three-electrode cell configuration using a 3 mm diameter GCE working electrode, a Ag/Ag$^+$ reference electrode and a coiled Pt wire counter electrode in separate compartments connected by medium porosity glass frits. The GCEs were polished with 1.0 m, 0.3 m, and 0.05 m alumina (EXTEC) mixtures, rinsed with distilled water and acetone, sonicated in acetone for 1 min, and dried prior to use. The Pt counter electrode was flame annealed prior to use.

Films of PDA-6 were prepared on GCEs by anodic electrochemical polymerization of 5 mM DA-6 in 0.5 M [NBu$_4$][PF$_6$]/CH$_2$Cl$_2$ at 20 mV s$^{-1}$ between −0.5-0.8 V for two cycles, unless specified otherwise. After the polymerization, the modified electrodes were rinsed gently with CH$_2$Cl$_2$ and CH$_3$CN. After air-drying, the electrodes were dried under vacuum for at least 4 h. Throughout this report, the first couple refers to the electron transfer between the neutral and radical cation species, while the second couple refers to the electron transfer between the radical cation and dicationic species.

PDA-6 was prepared on an ITO electrode by electropolymerization of 5 mM DA-6 in 0.1 M [NBu$_4$][PF$_6$]/CH$_2$Cl$_2$ at 20 mV s$^{-1}$ between −0.5-0.8 V. After the polymerization, the modified electrodes were rinsed gently with CH$_2$Cl$_2$ and CH$_3$CN. The modified electrode was cycled in 0.5 M [NBu$_4$][PF$_6$]/CH$_3$CN at 20 mV s$^{-1}$ between −0.5-0.6 V.

The electron transfer coefficient, α, and the electron transfer rate constant, $k_s$, were calculated using equation 1 and the straight lines from FIG. 10.

$$E_p = E^{0\prime} - \frac{RT}{\alpha nF}\ln\left(\frac{\alpha nF}{RTk_s}\right) - \frac{RT}{\alpha nF}\ln(v) \quad (1)$$

where R is the gas constant (8.314 J K$^{-1}$ mol$^{-1}$), T is the temperature (293 K), n is the number of electrons, and F is the Faraday constant (96,485 C mol$^{-1}$). The constants were determined to be α=0.42 and $k_s$=0.4 s$^{-1}$ for the first redox couple, and α=0.46 and $k_s$=0.5 s$^{-1}$ for the second redox couple.

Determination of Diffusion Coefficient. Chronoamperometry was performed by holding the potential at 0.8 V for several seconds, and measuring the current with time. The graph, known as a Cottrell plot, of the current vs. the reciprocal square root of time was plotted. The slope of the linear portion of the plot was used to determine the diffusion coefficient of PDA-6 film as 2.4×10$^{-9}$ cm$^2$ s$^{-1}$.

4.2 Spectroelectrochemical Experiments. ITO coated glass slides were cut to 5×75 mm sized electrodes and copper tape was wrapped around the top of the electrode to facilitate electrical contact. For the in situ spectroelectrochemical studies, PDA-6 was deposited on an ITO electrode by electropolymerization of 0.5 mM DA-6 in 0.1 M [NBu$_4$][PF$_6$]/CH$_2$Cl$_2$ at 20 mV s$^{-1}$ between −0.5-0.8 V. After the polymerization, the modified electrodes were rinsed gently with CH$_2$Cl$_2$ and CH$_3$CN. The modified ITO electrode was placed facing the light path in a fritted three compartment glass cell, along with the Ag/Ag$^+$ reference electrode and a coiled Pt wire counter electrode. The modified electrode was cycled in 0.1 M [NBu$_4$][PF$_6$]/CH$_3$CN at 10 mV s$^{-1}$ between −0.5-0.6 V and UV-Vis spectra were collected every 8 seconds.

For the switching time experiments, the ITO electrodes were deposited as described above. For measuring the switching time for the dication from the neutral polymer, the potential was held at −0.2 V and 0.5 V for 3 cycles of 5, 2, 1, 0.5 seconds, and the absorbance was measured at 469 nm. For measuring the switching time for the radical cation, the potential was held at −0.2 V and 0.3 V for 3 cycles of 5, 2, 1, 0.5 seconds, and the absorbance was measured at 400 nm.

TABLE 1

The electrochemical values for polymer films from FIG. 2b.

| Name | $E^{0\prime}_1$ (V) | $\Delta E_{p1}$ (V) | $E^{0\prime}_2$ (V) | $\Delta E_{p2}$ (V) | Theoretical capacity (mA h g$^{-1}$) |
|---|---|---|---|---|---|
| PDA-2 | — | — | — | — | 223 |
| PDA-3 | 0.067 | 0.192 | 0.452 | 0.029 | 211 |
| PDA-4 | 0.068 | 0.285 | 0.381 | 0.044 | 200 |
| PDA-6 | 0.002 | 0.041 | 0.354 | 0.058 | 181 |
| PTA-2 | — | — | — | — | 224 |
| PTA-6 | 0.019 | 0.089 | 0.350 | 0.083 | 170 |

Laviron Analysis. The Laviron method was used for the determination of the charge transfer rate constants of adsorbed species. The same CVs used for FIG. 6 (scan rate dependence of PDA-6) were used for the analysis. The dependence of the difference between peak potentials ($E_p$) and the formal redox potential ($E^{0\prime}$) was plotted vs. the logarithm of the scan rate (log(v)). The plot yields two straight lines per redox couples when log(scan rate)>−1.0.

TABLE 2

Figure 3:
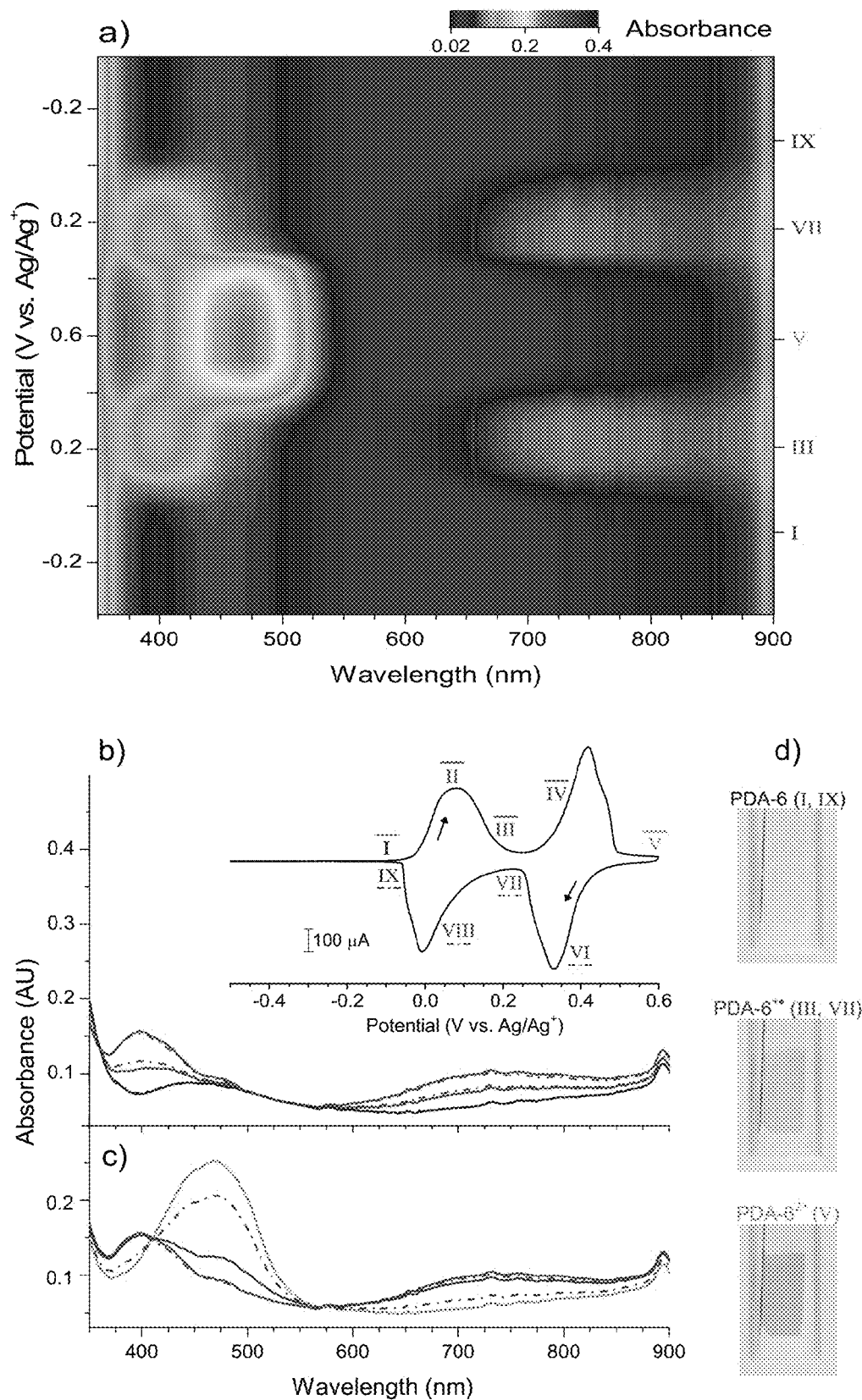
FIG. 3 shows (a) contour plot of the in situ UV-Vis spectroelectrochemistry of PDA-6 deposited onto ITO electrode during one cycle. Inset: Corresponding CV of PDA-6 film cycled in 0.1 M $(C_4H_9)_4NPF_6$ in $CH_3CN$ at 10 mV s$^{-1}$ with Roman numeral markers relating designated potentials to UV-Vis spectra. UV-Vis spectra of PDA-6 at designated potentials (b) between −0.10-0.22 V for the PDA-6/PDA-6$^{+\cdot}$ couple and (c) between +0.20-0.60 V for the PDA-6$^{+\cdot}$/PDA-6$^{2+}$ couple. (d) Pictures of PDA-6 film on ITO in the neutral, cationic and dicationic states.

Spectroelectrochemical data from FIG. 3.

| Label | Potential (V vs. Ag/Ag$^+$) | λ (nm) | Absorbance |
|---|---|---|---|
| I | −0.093 | 457 | 0.086 |
| II | 0.067 | 414 | 0.107 |
|  |  | 731 | 0.079 |
| III | 0.207 | 399 | 0.154 |
|  |  | 729 | 0.101 |
| IV | 0.347 | 401 | 0.154 |
|  |  | 472 | 0.125 |
|  |  | 721 | 0.093 |
| V | 0.587 | 469 | 0.252 |
| VI | 0.373 | 467 | 0.207 |
| VII | 0.223 | 397 | 0.154 |
|  |  | 729 | 0.097 |
| VIII | 0.063 | 400 | 0.117 |
|  |  | 732 | 0.084 |
| IX | −0.087 | 450 | 0.086 |

4.3 Galvanostatic Cycling. Galvanostatic charge-discharge measurements were taken in a three-electrode cell configuration using the modified GCE, a Ag/Ag$^+$ reference electrode and a Pt wire counter electrode in 0.5 M [NBu$_4$][PF$_6$]/CH$_3$CN. Initially, a CV at 10 mV/s of the electrode was taken between −0.3-0.2 V to determine the amount of charge (capacity) stored for the initial one-electron process (charge of reduction peak). Then, the applied current was calculated to obtain the desired C-rate. The |applied current| was the same for charging and discharging, unless specified otherwise. The polymer was charged and discharged (at a specific current density) in 0.5 M [NBu$_4$][PF$_6$]/CH$_3$CN between −0.1-0.5 V.

$$C\ \text{rate}(h^{-1}) = \frac{\text{applied current}(\mu A)}{\text{capacity}(\mu C)} \quad (2)$$

$$\text{applied current} = \frac{C\ \text{rate}}{3600} \times \text{capacity} \quad (3)$$

The capacities (mA h g$^{-1}$) were calculated from galvanostatic cycling experiments using the total charge (mA h) passed during charge/discharge and the approximate mass of the polymer film (w). The mass, w, of the film was calculated by the following equation: w=hρA. The film thickness, h, was determined by profilometry, the density, ρ, was estimated to be 1.0 g cm$^{-3}$, and the area, A, of the GCE was 0.0707 cm$^2$. The Coulombic efficiency (%) was calculated from the capacity of the film after discharging divided by the capacity from charging.

Figure 17:
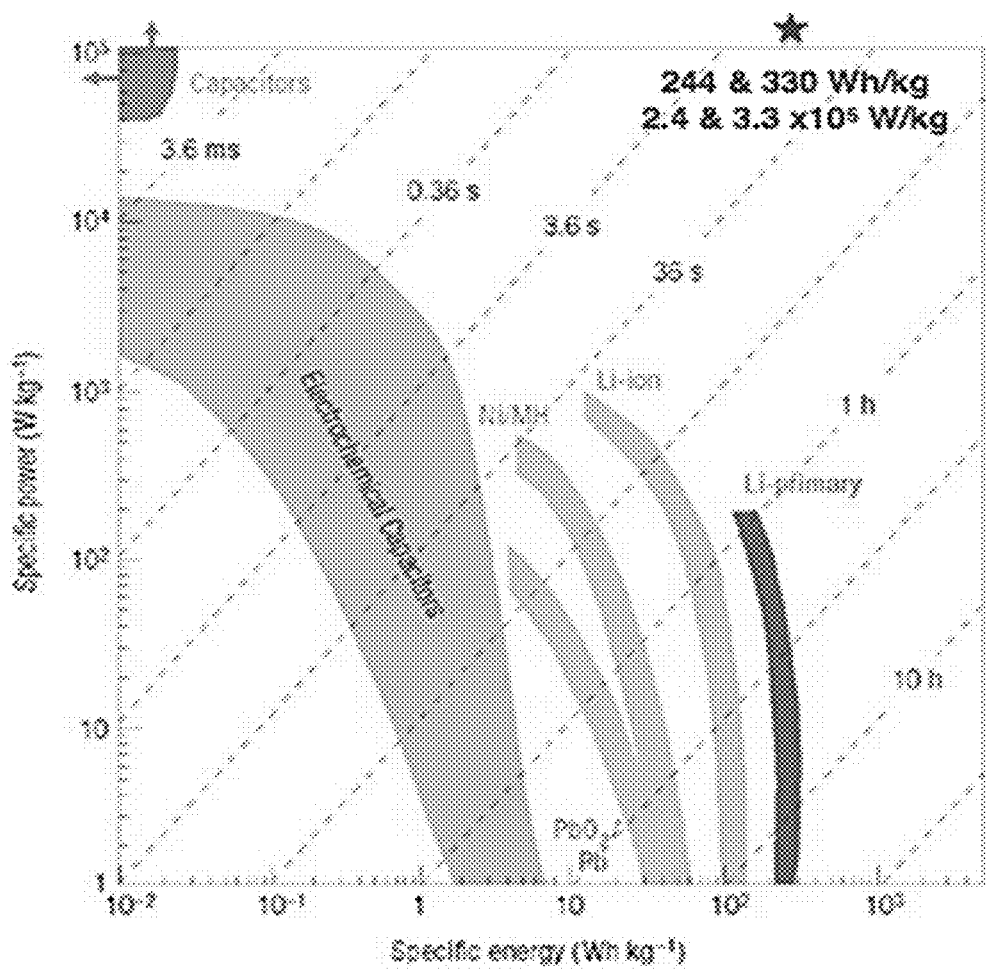
FIG. 17. Star indicates the approximate location of our materials on the Ragone plot from P. Simon & Y. Gogotsi: *Nature Materials* 7, 845-854 (2008).

FIG. 17 shows a Ragone plot (from the review by P. Simon and Y. Gogotsi: *Nature Materials* 7, 845-854 (2008)) in which we present the performance of our materials.

Example 2

This example provides a description of examples of synthesis and characterization of polymers of the present disclosure.

Figure 18:
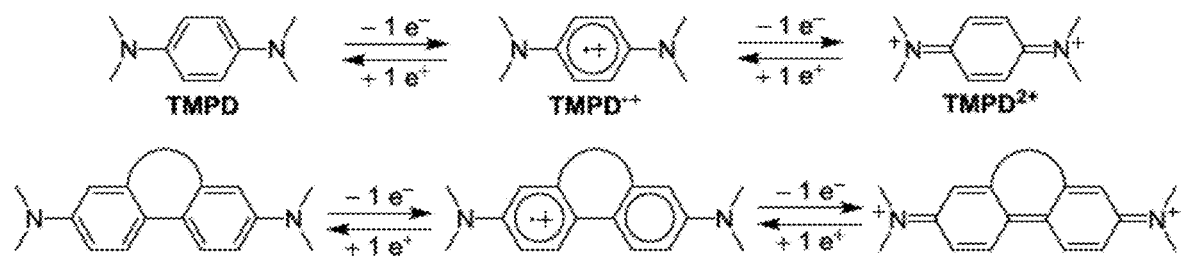
FIG. 18 shows a mechanism of redox processes of TMPD and arylamine analogs.

We describe compounds as candidates for cathodes in EES devices. We are interested in N,N,N',N'-tetramethyl-p-phenylenediamine (TMPD) due to its two reversible one-electron transfers at high redox potentials and low molecular weight. The oxidation of TMPD yields the well-known stable radical cation, Wurster's Blue, which can be further oxidized to the quinoidal dication, TMPD$^{2+}$ (FIG. 18). We previously anchored TMPD to conductive polymer backbones to mitigate the dissolution of active material into the electrolyte, and to increase the conductivity of the electrode material. This approach yielded electroactive polymer films directly on conductive substrates but involved optimization of the monomer and multistep synthesis. In the present case, the intent was to develop a modular and simpler process to synthesize polyarylamines in order to study the electrochemical activity of various arylamines for EES applications.

Figure 19:
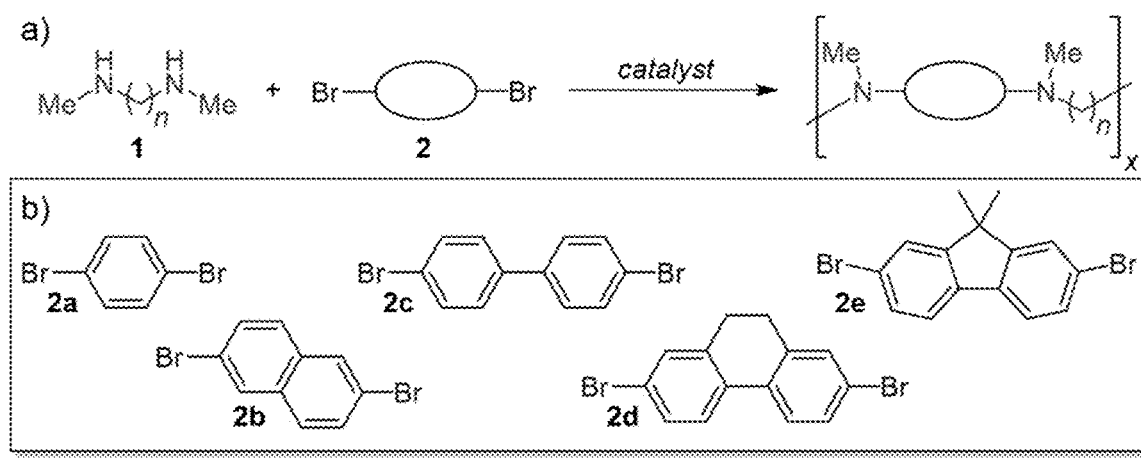
FIG. 19 shows (a) Pd-catalyzed polycondensation of diamines with dibromoarenes. (b) Dibromoarenes investigated in this example.

The Pd-catalyzed amination reaction couples aryl halides with primary or secondary amines to form arylamines. The cross coupling reaction can be used to synthesize polymers, such as polytriarylamines and polyanilines. This polymerization method allowed for facile, modular synthesis of an array of polyarylamines by varying the structure of the aryl halide and amine monomers (FIG. 19).

Four factors can be taken into account when designing organic cathode materials. First, the capacity of a material is inversely proportional to its molar mass (of the repeat unit for polymers). Second, the electron transfer processes should be at high redox potentials (>3.0 V vs. Li/Li$^+$) to maximize energy densities. Third, the materials should exhibit fast charge transfer kinetics thus enabling high C-rate operation. Finally, the material should have high charge retention and Coulombic efficiency with cycling. With these parameters in mind, we were interested in developing polyarylamines with good cycling performance, and theoretical capacities and energy densities competitive with commercial EES devices. Polytriphenylamine and its derivatives have been explored as electrode materials due to their reversible redox processes at ~3.6 V (vs. Li/Li$^+$) but these polymers have low theoretical capacities (<130 mA h g$^{-1}$). Herein we describe a Pd-catalyzed polycondensation of dibromoarenes with secondary acyclic, aliphatic diamines to synthesize redox-active polyarylamines with theoretical capacities between 160-330 mA h g$^{-1}$. These reactions yield Pd-catalyzed cross-coupled polymers using acyclic, aliphatic amines.

The polymers were synthesized by Pd-catalyzed polycondensation of diaminoalkanes with dibromoarenes using Pd$_2$(dba)$_3$ and 2-dicyclohexylphosphino-2'-(N,N-dimethylamino)biphenyl (DavePhos). The detailed synthetic processes are described herein. Electrochemistry experiments were performed at 22° C. All cyclic voltammetry (CV) measurements were carried out in a fritted three compartment cell using a 3 mm diameter glassy carbon working electrode, a large-area Pt counter electrode, and a Ag/Ag$^+$ reference electrode. The potential, 0 V, measured using an Ag/Ag$^+$ reference electrode is +3.3 V vs. Li/Li$^+$.

Desirable synthetic conditions and electrochemical activity of the polymers were found by varying the alkyl length of diamines 1 (Table 3). Using dibromobenzene, 2a, we obtained four polymers with different alkyl spacers between the redox-active phenylenediamine groups. As the alkyl length increased from ethylene to hexamethylene, the theoretical capacity decreased from 330 to 245 mA h g$^{-1}$ for the phenylenediamine polymers. The Pd$_2$(dba)$_3$/DavePhos catalytic system afforded low molecular weight polymers in good yield (Table 3). It was challenging to obtain high molecular weight polymers because of the step-growth nature of the polycondensation reaction, and the propensity for acyclic secondary amines to β-hydride eliminate and terminate the growing polymer chain. Higher molecular weight polymers have been reported using aromatic amines, or cyclic amines. Kanbara and co-workers were unsuccessful in their attempts to synthesize polymers using acyclic, aliphatic diamines. By using the biaryl phosphine ligand, DavePhos, the polymers were synthesized.

Figure 20:
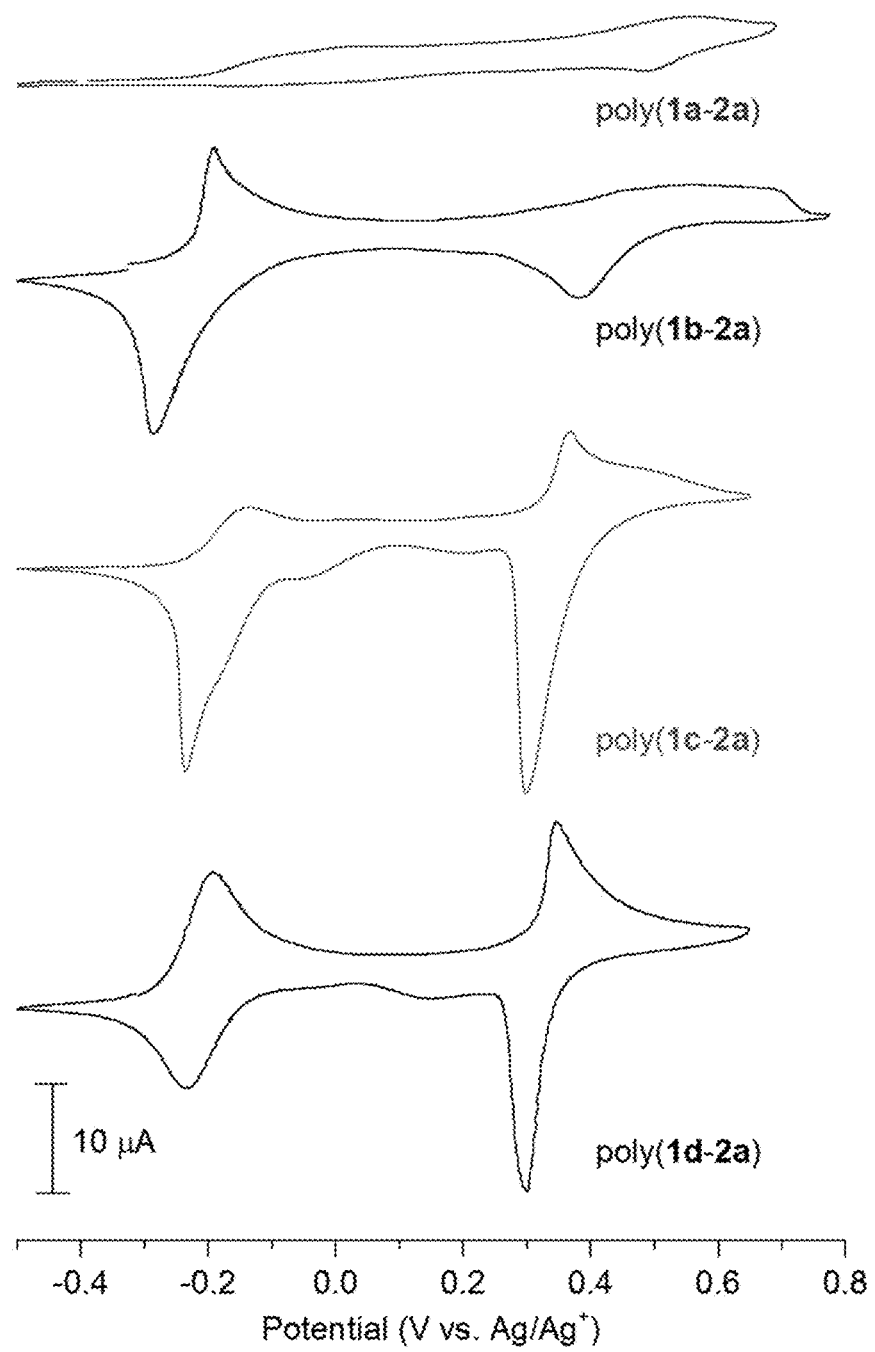
FIG. 20 shows cyclic voltammograms (CVs) of poly(1-2a) in 0.1 M [NBu$_4$][ClO$_4$] in CH$_2$Cl$_2$ at 20 mV s$^{-1}$. All CVs on 10 μA current scale.

FIG. 20 shows the cyclic voltammograms (CV) of the phenylenediamine polymers, poly(1-2a), at 2 mM concentration in repeat unit, in 0.1 M [NBu$_4$][ClO$_4$]/CH$_2$Cl$_2$. The length of the alkyl spacer between arylamine groups significantly affected the electrochemical response of the polymers. The polymer with an ethylene linker, poly(1a-2a), did not display the two well-defined and reversible redox waves expected for a TMPD-containing polymer. Instead, it exhibited two small irreversible processes at −75 mV and 524 mV, respectively. FIG. 20 shows that as the alkyl linker was increased from ethylene to hexamethylene, the corresponding polymer displayed better resolved redox processes. The first redox couple for poly(1b-2a) is reversible at −142 mV, and the second redox couple exhibited a broad oxidation peak that is indicative of more complex processes than a simple one-electron transfer. The reductive sweep exhibited two well-resolved peaks at peak potential values of 381 mV and −284 mV, respectively. The morphology of these peaks is typical of a "stripping-type" response, suggesting that the oxidation of the polymer to charged species resulted in the precipitation of a polymer film on the electrode surface, in a way reminiscent of the behaviour of poly(vinylferrocene). Both the tetramethylene and hexamethylene linked phenylenediamine polymers displayed two redox couples with sharp reduction peaks, again reminiscent of poly(vinylferrocene) behaviour. The formal potentials for both processes shifted negative as the alkyl linker increased in length, indicating that the phenylenediamine polymers are more stable when the redox-active TMPD groups are separated by a longer distance. This trend suggests that the irreversible response for poly(1a-2a) is likely due to repulsive interactions between TMPD moieties in the polymer. These findings agree with the electrochemical responses of electropolymerized benzidine polymer films with different alkyl spacers. Poly(1d-2a) displayed the most reversible redox processes with the smallest peak to peak separations ($\Delta E_p$). These data show that arylamines should be separated by hexamethylene linkers to obtain the most well-defined and reversible redox responses. We found desirable polymerization conditions by lowering the temperature to 50° C. and running the reactions for 3 days (Table 4).

Previous studies by Michaelis on Wurster's salts, and Roberts on polycyclic aromatics established that resonance delocalization and coplanarity of the molecules are important factors in stabilizing arylamine radical cations. The cycling performance of the electrode material is critical for EES applications, and better capacity retention can often offset a lower capacity. We describe the electrochemical performance of extended aryl systems that can undergo analogous redox processes to the TMPD-containing polymers (FIG. 18). Five polycyclic arylamine polymers were synthesized in good yield (Table 5). The theoretical capacities of the polymers decreased for these polymers (160-200 mA h g$^{-1}$) relative to those described above for phenylenediamine derivatives. However, some of the redox processes shifted to higher potentials providing some compensation on energy density.

Figure 21:
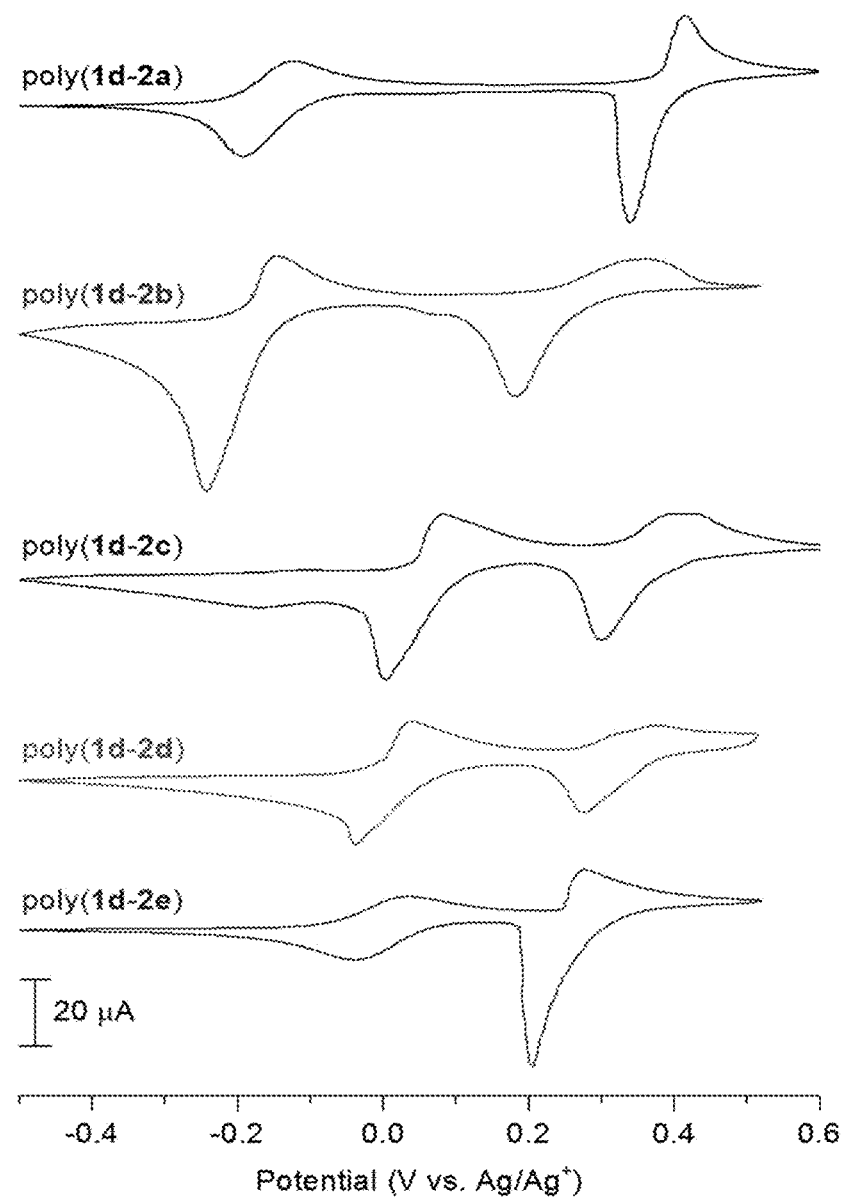
FIG. 21 shows cyclic voltammograms (CVs) of poly(ad-2) in 0.1 M [NBu$_4$][ClO$_4$] in CH$_2$Cl$_2$ at 20 mV s$^{-1}$. All CVs on 20 μA scale.

FIG. 21 shows the CVs of poly(1d-2), at 4 mM concentration in repeat unit, in 0.1 M [NBu$_4$][ClO$_4$]/CH$_2$Cl$_2$. All of the polymers exhibited the anticipated two reversible, one-electron redox couples. As was the case for poly(1-2a), the voltammetric profiles were typical of processes that involve polymer deposition upon oxidation and stripping upon subsequent reduction. The two waves were spaced at least 450 mV apart for the phenylenediamine and naphthalenediamine polymers, poly(1d-2a) and poly(1d-2b), respectively. The difference between the formal potentials was smaller, <325 mV, for the other polycyclic arylamine polymers, poly(1d-2c/2d/2e). The formal potentials for the first redox couple shifted positive from −194 mV for the naphthalenediamine-based poly(1d-2b) to >−4 mV for these polycyclic arylamine polymers. Positive potential shifts improve the theoretical energy density of the electrode materials as they increase the cell voltage. For batteries, energy density is the product of capacity and cell voltage. For these polymers, the potentials for both redox couples shifted negative as the aryl group changed from biphenylene to dihydrophenanthrene and to dimethylfluorene. This negative shift indicates that the latter polymers, with higher molar mass and more constrained structures, are easier to oxidize to the radical cation and dication species.

All of the polymers with two well-defined redox processes generated an electroactive film on the electrode as indicated by the sharp reduction peaks. After polymer films were deposited onto electrodes, the electrode was gently rinsed with CH$_2$Cl$_2$ to remove electrolyte and soluble polymers. The modified electrodes were subsequently cycled in monomer-free electrolyte to examine their electrochemical cycling performance (FIG. 23-31). Films of poly(1d-2c), poly(1d-2d), and poly(1d-2e) showed good cycling performance, while the rest of the polymers quickly lost half of their initial charge. These results suggested that larger arylamine groups deposited stable, insoluble films onto GCEs. The polycyclic arylamine polymers have lower theoretical capacities than the phenylenediamine polymers, but this effect is offset, at least in part, by the higher redox potentials. In addition, the larger arylamine polymers are more stable with cycling due to the larger delocalization systems for the cation radical and dication species. Based upon those results and the theoretical energy densities of the polymers, we further characterized the charge retention of poly(1d-2c).

The performance of poly(1d-2c) was tested by cycling the polymer film in solvents typically used in practical EES applications. The modified electrode was cycled in 0.5 M LiBF$_4$/solvent. FIG. 22b shows that the charge retention of poly(1d-2c) is highly dependent on the solvent employed. When cycled in tetraglyme or ethylene carbonate:diethyl carbonate (EC:DEC, v/v=1:1), the polymer film lost half of its initial capacity after only 5 cycles. However, in a mixture of 1,3-dioxolane and dimethoxyethane (DOL:DME, v/v=1:1), the polymer film exhibited a charge retention of 90% after 20 cycles. Initially, the charge increased for the first few cycles. This is likely due to improved polymer-electrolyte interactions which allowed more polymer to be accessible to undergo electron transfer reactions. After the first few cycles, the charge retention of the polymer film levelled off and the CVs overlapped very well with each other (FIG. 22a). The second redox couple exhibited the symmetrical shape and small $\Delta E_p$ expected for surface-confined materials. However, the first oxidation peak was broader and flatter. This response was likely due to the polymer film reorganizing to accommodate the incorporation of electrolyte and counterions, as well as shifting to a more stable conformation to optimize the delocalization of charge. The shape of the first oxidation peak varied in different solvents, once again emphasizing the importance of electrolyte-polymer interactions on electrochemical performance. In acetonitrile, the first oxidation peak shifted negative by 220 mV in the first few cycles, demonstrating a distinct reorganization of the polymer film (FIG. 28b). While in tetraglyme, the first oxidation peak was a symmetrical wave, matching the second oxidation peak (FIG. 29).

The Pd-catalyzed coupling reaction is a valuable technique to synthesize arylamine polymers. We describe using acyclic, aliphatic amines to form various redox-active polyarylamines. The alkyl spacer between arylamine groups had a large effect on the electrochemistry of the polymers, and two redox processes were observed for compounds with trimethylene or longer linkers. The hexamethylene-linked phenylenediamine polymers exhibited the most reversible redox processes, and other arylamine polymers were synthesized with this alkyl spacer. Poly(1d-2c) exhibited two reversible redox reactions at high potentials (>3.3 V vs. Li/Li), high theoretical capacity (182 mA h g$^{-1}$), and good cycling performance in practical EES electrolytes. These polymers are promising candidates for EES, and ongoing work is focused on synthesizing insoluble, redox-active polyarylamines. These initial cycling performance studies demonstrated the promise of arylamine polymers as cathode materials for electrochemical energy storage applications.

1. General Considerations. All manipulations of air and water sensitive compounds were carried out under dry nitrogen using a Braun UniLab drybox or standard Schlenk line techniques. $^1$H NMR spectra were recorded on a Varian INOVA 400 ($^1$H, 400 MHz) and referenced with residual non-deuterated solvent shift (CHCl$_3$=7.26 ppm, C$_6$D$_6$=7.16 ppm). $^{13}$C NMR spectra were recorded on Varian INOVA 500 ($^{13}$C, 125 MHz) spectrometer and referenced to chloroform (77.16 ppm) or benzene (128.06 ppm).

Gel permeation chromatography (GPC) analyses were carried out using an Agilent Technologies PL-GPC 50 Integrated GPC equipped with a UV detector and a refractive index detector as well as a Polymer Laboratories PL-AS RT GPC autosampler. The GPC used two PL gel Mini-MIX C columns (5 micron, 4.6 mm ID). The GPC columns were eluted with tetrahydrofuran at 30° C. at 0.3 mL/min and were calibrated using monodisperse polystyrene standards.

Polymer samples that were partially soluble in tetrahydrofuran were analyzed by Eastman Kodak Company. The polymers were examined using size-exclusion chromatography (SEC) at 40.0° C. in 1,1,1,3,3,3-hexafluoro-2-propanol (HFIP) containing 0.01 M tetraethylammonium nitrate. The GPC used three 8 mm×300 mm KF-806L column from Shodex calibrated with narrow-molecular-weight distribution poly(methyl methacrylate) (PMMA) standards. The results provided are from a spectrophotometric detector operating at 270 and 320 nm.

Differential scanning calorimetry (DSC) measurements of polymer samples were performed on a Mettler-Toledo Polymer DSC instrument equipped with a chiller and an autosampler. Standard DSC experiments were made in aluminum pans using the following heating program: −70° C. to 200° C. at 10° C./min, 200 to −70° C. at 10° C./min, and then −70° C. to 200° C. at 10° C./min, except as noted. Data was processed using StarE software. All reported glass and melting temperatures were observed on the second heating cycle.

Electrochemistry experiments were performed at 22° C. using a Hokuto Denko HABF1510m or a Princeton Applied Research VersaSTAT 3 potentiostat. All cyclic voltammetry (CV) measurements were taken in a fritted three compartment cell using glassy carbon electrode (GCE, 3 mm diameter), a large-area Pt counter electrode, and a Ag/Ag$^+$ (0.05 M AgClO$_4$ and 0.1 M [NBu$_4$][ClO$_4$] in CH$_3$CN) reference electrode. The potential, 0 V, measured using Ag/Ag$^+$ reference electrode is +3.3 V vs. Li/Li$^+$.

2. Materials. Tris(dibenzylideneacetone)dipalladium(0) (Pd$_2$(dba)$_3$), DavePhos (2-(dicyclohexylphosphino)-2'-(N,N-dimethylamino))-1,1'-biphenyl), and sodium tertbutoxide (NaOt-Bu) were purchased from Strem and used as received. N,N'-Dimethylethylenediamine (1a), N,N'-dimethyl-1,3-propanediamine (1b), and N,N'-dimethyl-1,6-hexanediamine (1d) were purchased from Sigma-Aldrich and distilled from KOH. N,N'-Dimethyl-1,4-butanediamine (1c) were prepared according to literature procedures. 1,4-Dibromobenzene (2a) was purchased from Sigma-Aldrich and sublimed under vacuum at 50° C. 2,6-Dibromonaphthalene (2b) was purchased from Alfa Aesar and used as received. 4,4'-Dibromobiphenyl (2c) was purchased from Aldrich and recrystallized from toluene, and dried under vacuum. 2,7-Dibromo-9,9-dimethyl-9H-fluorene (2e) was purchased from TCI America and recrystallized from 5% ethyl acetate in hexanes, and dried under vacuum. 2,7-Dibromo-9,10-dihydrophenanthrene (2d) was prepared according to literature procedures.

HPLC grade toluene was purchased from Fischer Scientific and dried over an alumina column. Tetrabutylammonium perchlorate was purchased from TCI America and recrystallized twice from ethyl acetate and dried under vacuum. All other reagents were purchased from commercial sources and used as received.

3. Representative Polycondensation Procedure A (representative of polymers shown in Table 3)

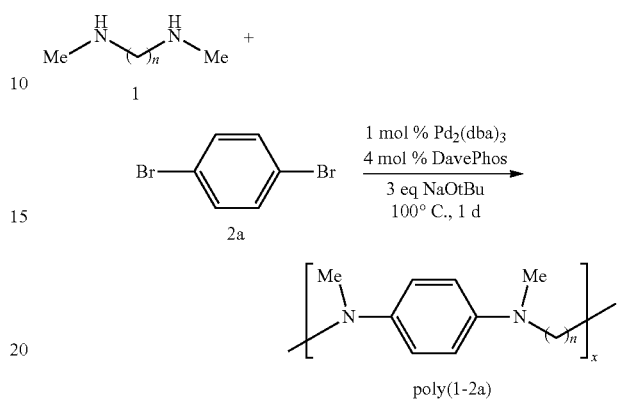

In the glovebox, Pd$_2$(dba)$_3$ (1 mol %), DavePhos (4 mol %), NaO$^t$Bu (3.0 mmol, 3 equiv), and dibromobenzene 2a (1.1 mmol, 1.1 equiv) were added to a 20-mL vial equipped with a magnetic stir bar. Then toluene (0.27 M in diamine) was added, followed by diamine 1 (1.0 mmol, 1.0 equiv). The vial was sealed with a Teflon-lined cap, removed from the glovebox, and heated in an oil bath set at 100° C. for 1 day. After removal from the oil bath, the cooled mixture was added dropwise to MeOH. The precipitate was isolated by filtration and the polymer was dried under vacuum.

TABLE 3

Polymerization of alkyldiamines with dibromobenzene.

| Entry[a] | 1 | Theoretical Capacity (mA h g$^{-1}$) | Isolated yield[b] (%) | Mn[c] (kD a) | Mw/Mn[c] |
|---|---|---|---|---|---|
| 1 | 1a (n = 2) | 330 | 61 | n.d.[d] | n.d.[d] |
| 2 | 1b (n = 3) | 304 | 73 | 1.3 | 1.2 |
| 3 | 1c (n = 4) | 282 | 76 | 1.1 | 1.1 |
| 4 | 1d (n = 6) | 245 | 81 | 2.3 | 1.5 |

[a]Polymerizations were run at 0.27M concentration in toluene.
[b]Determined after precipitating the polymer in MeOH.
[c]Determined by gel permeation chromatography in THF at 30° C., calibrated with polystyrene standards.
[d]Not determined due to low solubility in THF.

Optimization of Polymerization

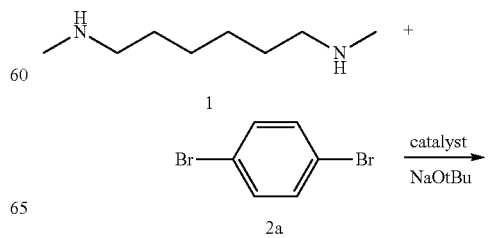

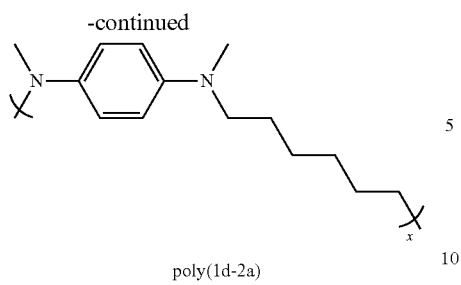

poly(1d-2a)

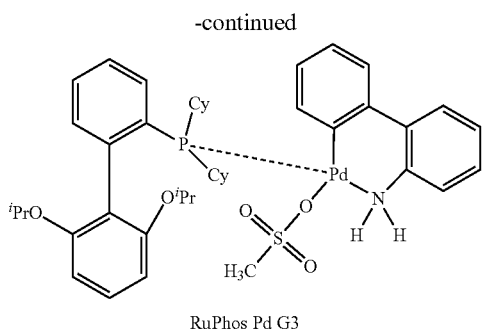

RuPhos Pd G3

TABLE 4

Optimization of the polycondensation of poly(1d-2a).

| Entry[a] | Catalyst | Temperature (°C.) | Time (d) | Solvent | Isolated Yield[b] (%) | $Mn^c$ (kDa) | $M_W/Mn^c$ |
|---|---|---|---|---|---|---|---|
| 1 | A | 100 | 1 | toluene | 0 | — | — |
| 2 | B | 100 | 1 | toluene | 70 | 2.3 | 1.5 |
| 3 | B | 50 | 1 | toluene | 0 | — | — |
| 4 | B | 50 | 3 | toluene | 89 | 2.9 | 1.7 |
| 5 | B | 50 | 6 | toluene | 93 | 4.2 | 2.0 |
| 6[d] | B | 50 | 6 | toluene | 86 | 2.2 | 1.9 |
| 7[e] | B | 50 | 6 | toluene | 67 | 1.2 | 1.5 |
| 8 | C | 50 | 10 | toluene | 0 | — | — |
| 9 | C | 50 | 4 | THF | 0 | — | — |
| 10 | C | 80 | 4 | THF | 77 | 1.5 | 1.8 |
| 11 | D | 80 | 4 | THF | 78 | 1.6 | 2.0 |

[a]Polymerization conditions: 1.1 eq dibromobenzene, 1.0 eq diamines, 2.8 eq NaOt-Bu, solvent (0.27 M in diamine).
[b]Determined after precipitating the polymer in MeOH
[c]Determined by gel permeation chromatography in THF at 30° C., calibrated with polystyrene standards.
[d]0.17M in diamine.
[e]0.09M in diamine.

A: 1 mol % Pd[P(o-tolyl)$_3$]$_2$Cl$_2$, 4 mol % P(o-tolyl)$_3$
B: 1 mol % Pd$_2$(dba)$_3$, 4 mol % DavePhos
C: 1 mol % DavePhos Pd G3, 1 mol % DavePhos
D: 1 mol % RuPhos Pd G3, 1 mol % RuPhos

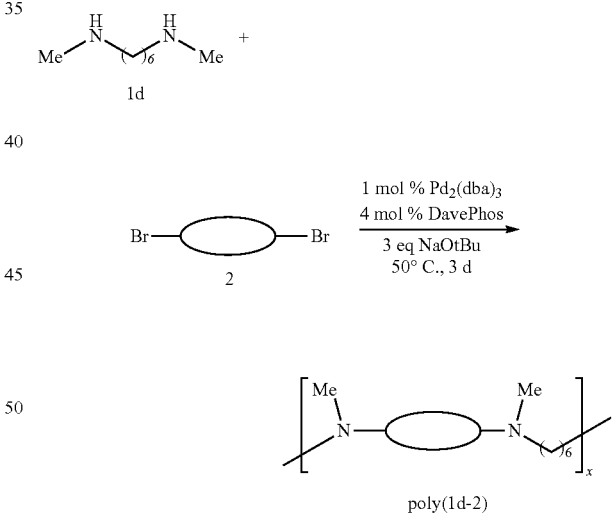

DavePhos    RuPhos

DavePhos Pd G3

After the initial electrochemical studies on poly(1-2a), optimization of the polycondensation of poly(1d-2a) was performed to obtain higher molecular weight polymers (Table 4=Table S2). Using catalyst A, we were unable to isolate any precipitated polymer after adding the reaction mixture dropwise into MeOH, in agreement with the previously published results. Then, we used the diaryl phosphine ligand, DavePhos, with Pd$_2$(dba)$_3$ (catalyst B). We were able to precipitate polymer but the polymer contained the dehalogenation product (from β-hydride elimination). To disfavor β-hydride elimination, the temperature was lowered from 100° C. to 50° C. (entry 4), and stirring for 6 days (entry 5) yielded polymers with the longest molecular weight. Entry 5 gave the best results for the polycondensation of poly(1d-2a) but due to the lower solubility of poly(1d-2), they were ran under the conditions of entry 4.

Representative Polycondensation Procedure B (Table 5)

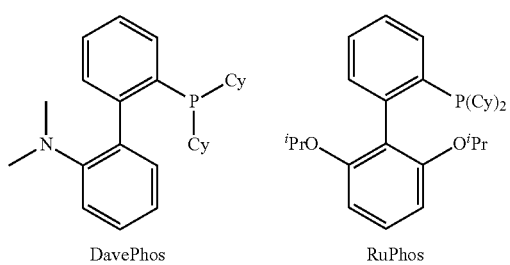

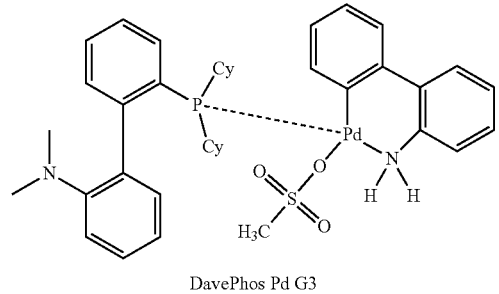

poly(1d-2)

In the glovebox, Pd$_2$(dba)$_3$ (1 mol %), DavePhos (4 mol %), NaO$^t$Bu (2.1 mmol, 3 equiv), and dibromoarene 2 (0.77 mmol, 1.1 equiv) were added to a 20-mL vial equipped with a magnetic stir bar. Then toluene (0.27 M in diamine) was added and the mixture was stirred for at least 2 minutes. Finally, diamine 1d (0.70 mmol, 1.0 equiv) was added in. The vial was sealed with a Teflon-lined cap, removed from the glovebox, and heated in an oil bath set at 50° C. for 3 days. After removal from the oil bath, the cooled mixture was added dropwise to MeOH. The precipitate was isolated by filtration and the polymer was dried under vacuum.

TABLE 5

Polymerization of hexamethylenediamine with dibromoarenes.

| Entry | 1 | Theoretical Capacity (mA h g$^{-1}$) | Isolated yield[a] (%) | Mn[b] (kD a) | Mw/Mn[b] |
|---|---|---|---|---|---|
| 1 | 2a | 245 | 89 | 3.1 | 3.6 |
| 2 | 2b | 200 | 96 | 2.2 | 2.0 |
| 3 | 2c | 182 | 90 | 3.1 | 3.6 |
| 4 | 2d | 167 | 96 | 4.8 | 6.0 |
| 5 | 2e | 160 | 85 | 11.1 | 4.8 |

[a]Determined after precipitating the polymer in MeOH.
[b]Determined by gel permeation chromatography in 1,1,1,3,3,3-hexafluoro-2-propanol containing 0.01M tetraethylammonium nitrate, calibrated with poly(methyl methacrylate) standards.

4. Electrochemical Measurements: Cyclic Voltammetry (CV) & Chronoamperometry. CV and chronoamperometry measurements were taken in a three-electrode cell configuration using 3 mm diameter GCE working electrode, Ag/Ag$^+$ reference electrode and coiled Pt wire counter electrode in separate compartments connected by medium porosity glass frits. The GCE were polished with 1.0 m, 0.3 m, and 0.05 m alumina (EXTEC) mixtures, rinsed with distilled water and acetone, sonicated in acetone for 1 min, and dried prior to use. The Pt counter electrode was flame annealed prior to use.

Films of poly(1d-2c) were prepared on GCEs by chronoamperometry of 4 mM in repeat unit of poly(1d-2c) in 0.5 M [NBu$_4$][BF$_4$]/CH$_2$Cl$_2$ at 275 mV vs. Ag/Ag$^+$ for 10 seconds. After the polymer films were adsorbed onto the GCEs, the modified electrodes were rinsed gently with CH$_2$Cl$_2$. After air-drying, the electrodes were dried under vacuum for at least 4 h. Throughout this example, the first couple refers to the electron transfer between the neutral and radical cation species, while the second couple refers to the electron transfer between the radical cation and dicationic species.

TABLE 6

The electrochemical values for polymer films from FIG. 20.

| Name (mV) | E$^{o'}_1$ (mV) | ΔE$_{p1}$ (mV) | E$^{o'}_2$ (mV) | ΔE$_{p2}$ (mV) | Theoretical capacity (mA h g$^{-1}$) |
|---|---|---|---|---|---|
| poly(1a-2a) | −75 | — | 524 | 72 | 330 |
| poly(1b-2a) | −237 | 93 | 469 | 177 | 304 |
| poly(1c-2a) | −185 | 98 | 335 | 66 | 282 |
| poly(1d-2a) | −213 | 41 | 321 | 49 | 245 |

TABLE 7

The electrochemical values for polymer films from FIG. 21.

| Name | E$^{o'}_1$ (V) | ΔE$_{p1}$ (V) | E$^{o'}_2$ (V) | ΔE$_{p2}$ (V) | Theoretical capacity (mA h g$^{-1}$) |
|---|---|---|---|---|---|
| poly(1d-2a) | −157 | 71 | 376 | 74 | 245 |
| poly(1d-2b) | −194 | 99 | 270 | 175 | 200 |
| poly(1d-2c) | 43 | 78 | 356 | 107 | 182 |
| poly(1d-2d) | 1 | 77 | 326 | 99 | 167 |
| poly(1d-2e) | −4 | 63 | 240 | 71 | 160 |

All of the polymers that show two reversible redox processes adsorb onto the electrodes during electrochemical experiments (FIG. 20-21). Deposition by cyclic voltammetry or chronoamperometry produced films that had similar electrochemical responses, and both methods were used to form polymer films on GCEs. The modified electrodes were rinsed in CH$_2$Cl$_2$ and then cycled in polymer-free electrolyte (acetonitrile or tetraglyme) to examine the electrochemical performance of the deposited polymer films.

The CV of poly(1b-2a) shows a slightly sharp reduction peak and non-diffusional looking tail, indicating that the polymer is adsorbed onto the electrode (FIG. 23a). This assumption is proven by cycling the modified electrode in polymer-free electrolyte (FIG. 23b). On the first cycle around the first redox couple, sharp oxidation and reduction peaks are observed. These sharp peaks are suggestive of charge trapping. The subsequent cycles showed two redox couples, as expected of N,N,N',N'-tetramethyl-p-phenylenediamine (TMPD) containing polymers. However, with successive cycles, the current decreased, indicating a loss of poly(1b-2a), either from dissolution of the polymer into the electrolyte or irreversible reactions. The first redox couple lost most of its Faradaic current by the fourth cycle, while the second redox couple exhibited oxidation and reduction peaks, although at lower currents. The loss of Faradaic response for the first redox couple is another indicator that the polymer has trapped charges. Poly(1b-2a) should thermodynamically be reduced or oxidized at ~−275 mV, but the polymer is trapped in the monocationic state. The retention of the second redox couple shows that the polymer can readily be oxidized to the dicationic polymer, and reduced to the monocationic polymer. However, further reduction to the neutral polymer was impeded by charge trapping.

The CV of poly(1c-2a) shows two sharp reduction peaks, indicating that the polymer is adsorbed onto the electrode (FIG. 20). The potential was held at 0 V, past the first oxidation peak, for one minute to deposit a polymer film onto GCE. The modified electrode was in 0.1 M [NBu$_4$][ClO$_4$]/CH$_3$CN at 10 mV s$^{-1}$ (FIG. 24b). The CVs show two symmetrical redox couples, as expected for a surface-confined system. However, the current for both processes decreased with cycling, indicating a loss of active material, likely from dissolution of the polymer film into the electrolyte. The first redox couple lost most of its initial Faradaic current by the fifth cycle, while the second redox couple still exhibited oxidation and reduction peaks, although at lower currents. Similar to poly(1b-2a), this polymer system had trapped charges, wherein the polymer should thermodynamically be oxidized or reduced but did not undergo electron transfers for the first redox couple. The second redox couple is not affected as the polymer can be oxidized to the dicationic state and reduced to the monocationic state.

The CV of poly(1d-2a) shows two sharp reduction peaks, indicating that the polymer is adsorbed onto the electrode (FIG. 20). The potential was held at 0 V, past the first oxidation peak, for one minute to deposit a polymer film onto GCE. The modified electrode was cycled around both redox couples in 0.1 M [NBu$_4$][ClO$_4$]/CH$_3$CN at 10 mV s$^{-1}$ (FIG. 25b). The CVs show two symmetrical redox couples, as expected for a surface-confined system. However, the current for both processes decreased with cycling, indicating a loss of active material, likely from dissolution of the polymer film into the electrolyte. The first redox couple lost all Faradaic current by the fifth cycle, while the second redox couple still exhibited oxidation and reduction peaks, although at lower currents. Similar to poly(1b-2a), this polymer system had trapped charges, wherein the polymer should thermodynamically be oxidized or reduced but did not undergo electron transfers for the first redox couple. The second redox couple is not affected as the polymer can be oxidized to the dicationic state and reduced to the monocationic state.

Figure 26:
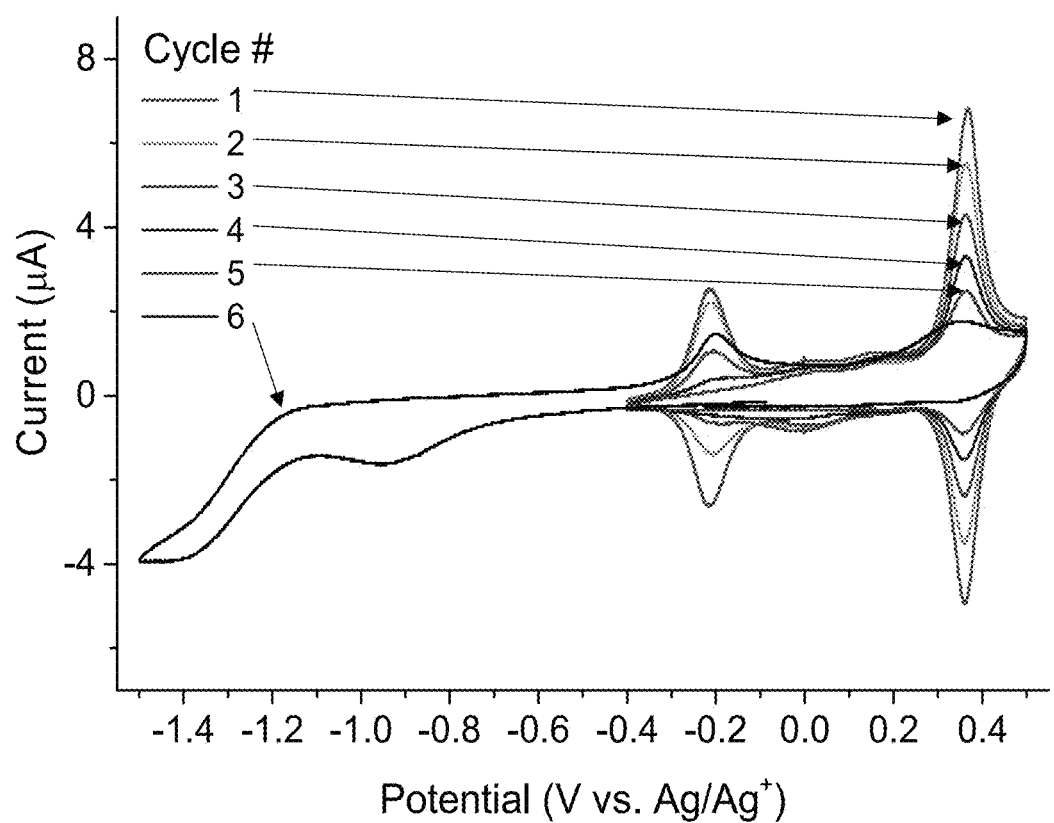
FIG. 26 shows the CV of the modified electrode from FIG. 25 cycled in 0.1M [NBu$_4$][ClO$_4$]/CH$_3$CN at 10 mV s$^{-1}$ to more negative potentials.
Figure 27:
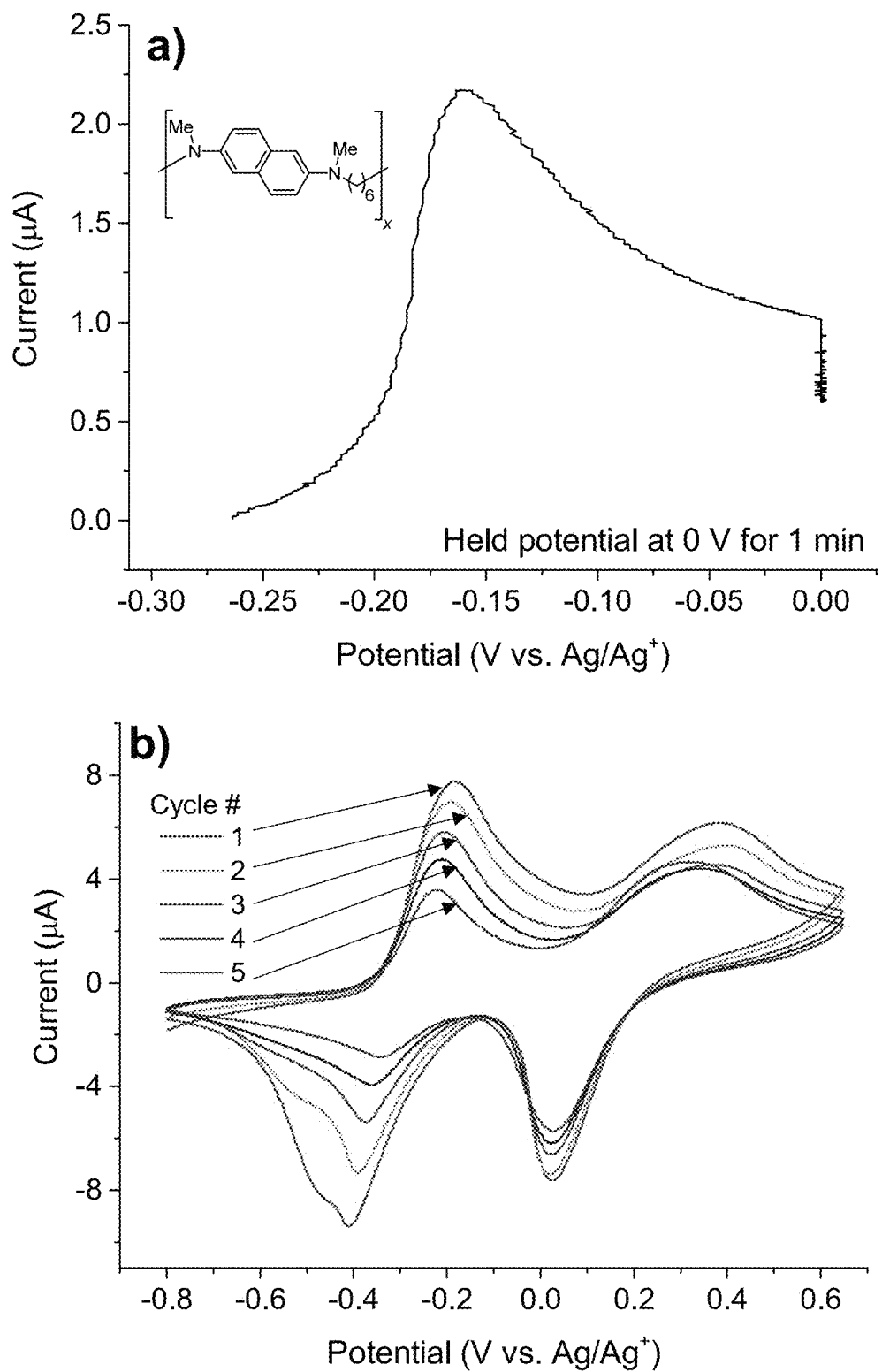
FIG. 27 shows (a) a polymer film of poly(1d-2b) was adsorbed onto GCE by holding the potential at 0 V for 1 minute in 4 mM concentration in repeat unit of poly(1d-2b) in 0.1 M [NBu$_4$][ClO$_4$]/CH$_2$Cl$_2$, after cycling to 0 V at 10 mV s$^{-1}$. (b) The CV of the modified electrode from a) cycled in 0.1 M LiClO$_4$/tetraglyme at 20 mV s$^{-1}$.

To investigate the charge trapping of poly(1d-2a), the modified electrode was swept more negative to −1.5 V, thereby increasing the driving force to reduce the polymer (FIG. 26). A reduction peak could be seen at approximately −950 mV, and an oxidation peak at −202 V was observed on the positive sweep. This experiment demonstrated that the charges trapped in the polymer can be reduced if there is a high enough driving force, amounting to an overpotential of 735 mV. The peak to peak separation ($\Delta E_p$) for the first redox couple is −750 mV due to charge trapping compared to 4 mV before the polymer film became charge trapped. Charge trapping decreased the available species that can undergo electron transfers (charge or discharge a device), and the method of releasing the trapped charges lowered the energy output and the Coulombic efficiency. The poly (arylamine) must not trap charges to be a viable cathode material.

The CV of poly(1d-2b) shows two reduction peaks with non-diffusional looking tails, indicating that the polymer adsorbed onto the electrode (FIG. 21). The potential was held at 0 V, past the first oxidation peak, for one minute to deposit a polymer film onto GCE. The modified electrode was cycled around both redox couples in 0.1 M LiClO$_4$/tetraglyme at 20 mV s$^{-1}$ (FIG. 27b). The CVs show two redox couples. However, the current for both processes decreased with cycling, indicating a loss of active material, likely from dissolution of the polymer film into the electrolyte. Also, similar to poly(1b-2a), the first redox couple lost Faradaic current faster than the second redox couple. As we conjectured above, this phenomenon is likely due to charge trapping, where the polymer is trapped in the monocationic state and cannot be reduced without a large driving force.

The CV of poly(1d-2c) shows two reduction peaks with non-diffusional looking tails, indicating that the polymer adsorbed onto the electrode (FIG. 21). The polymer film was deposited onto GCE by cycling in the polymer solution for 5 CV cycles. The modified electrode was cycled around both redox couples in 0.1 M [NBu$_4$][ClO$_4$]/CH$_3$CN at 20 mV s$^{-1}$ (FIG. 28b). The CVs show two redox couples. The first oxidation peak was at 205 mV while the corresponding reduction peak was at −37 mV, resulting in a large $\Delta E_p$ of 242 mV. The second redox couple exhibited an $\Delta E_p$ of 21 mV, as expected of surface-confined systems. The large splitting in potentials for the first redox couple suggested that there was significant reorganization of the film as it transitioned from a neutral film to an oxidized polymer film. This trend has been observed in substituted cinnolines, tetrathiafulvalene in a Nafion matrix, and oligomers of p-phenylenes. On subsequent cycles, the first oxidation peak was at −15 mV and the $\Delta E_p$ decreased to 21 mV. This negative shift in potentials for the first oxidation peak is indicative of the polymer film having been reorganized to a more thermodynamically stable phase on the first cycle. We believe this reorganization stems from the phenyl rings rotating to optimize the conjugation between the rings.

Initially, the current for both processes decreased with cycling, indicating a loss of active material, likely from dissolution of the polymer film into the electrolyte. After five cycles, the current stabilizes and subsequent cycles overlap with each other very well.

Figure 22:
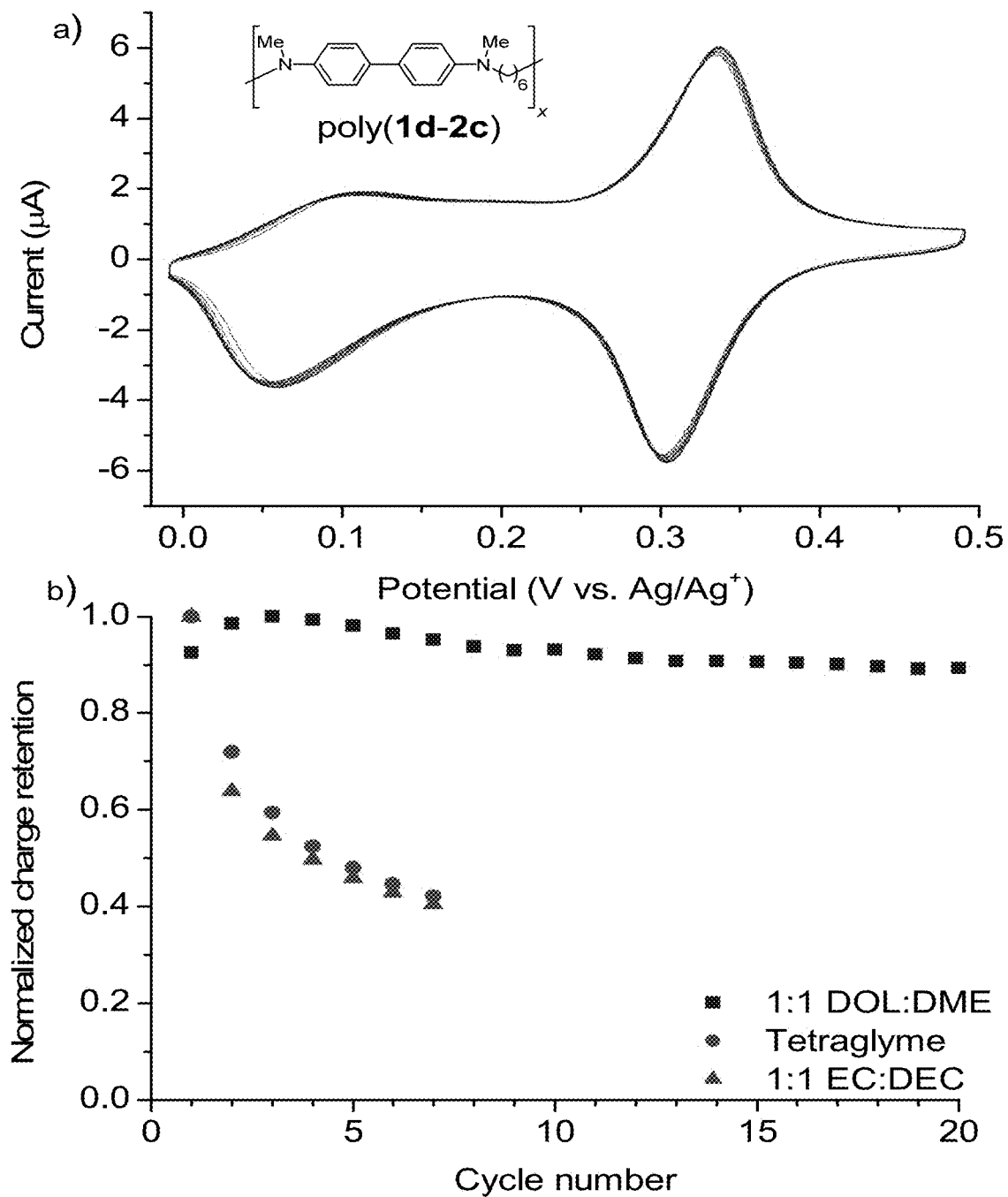
FIG. 22 shows (a) ten CV cycles of poly(1d-2c) in 0.5 M LiBF$_4$ in 1,3-dioxolane/dimethoxyethane (DOL/DME) at 20 mV s$^{-1}$. (b) The electrochemical cycling of poly(1d-2c) in 0.5 M LiBF$_4$ in various solvents at 20 mV s$^{-1}$.
Figure 23:
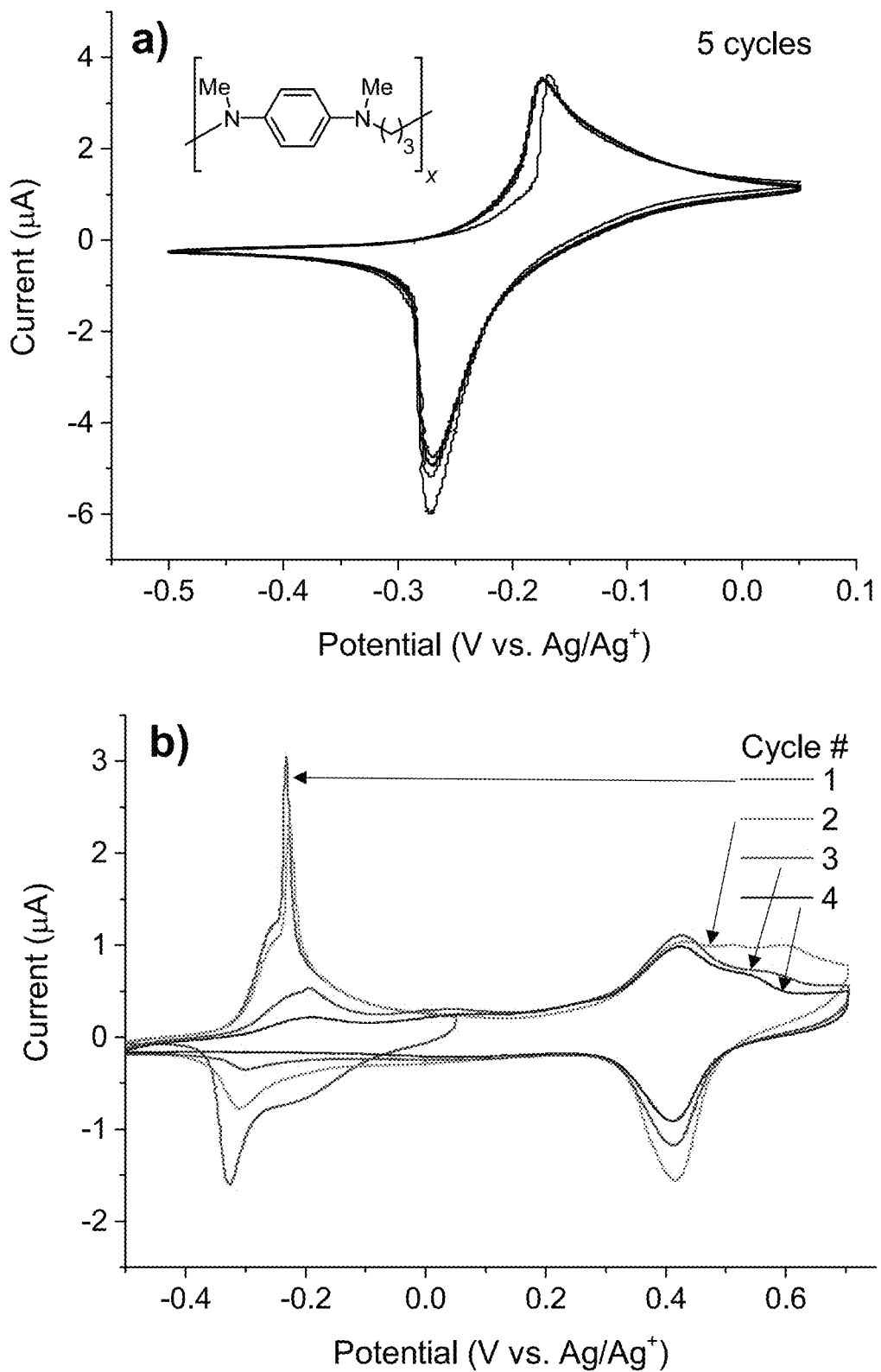
FIG. 23 shows (a) a polymer film of poly(1b-2a) was adsorbed onto GCE by five CV cycles of 2 mM concentration in repeat unit of poly(1b-2a) in 0.1 M [NBu$_4$][ClO$_4$]/CH$_2$Cl$_2$ at 10 mV s$^{-1}$. (b) The CV of the modified electrode from (a) cycled in 0.1 M [NBu$_4$][ClO$_4$]/CH$_3$CN at 10 mV s$^{-1}$.
Figure 24:
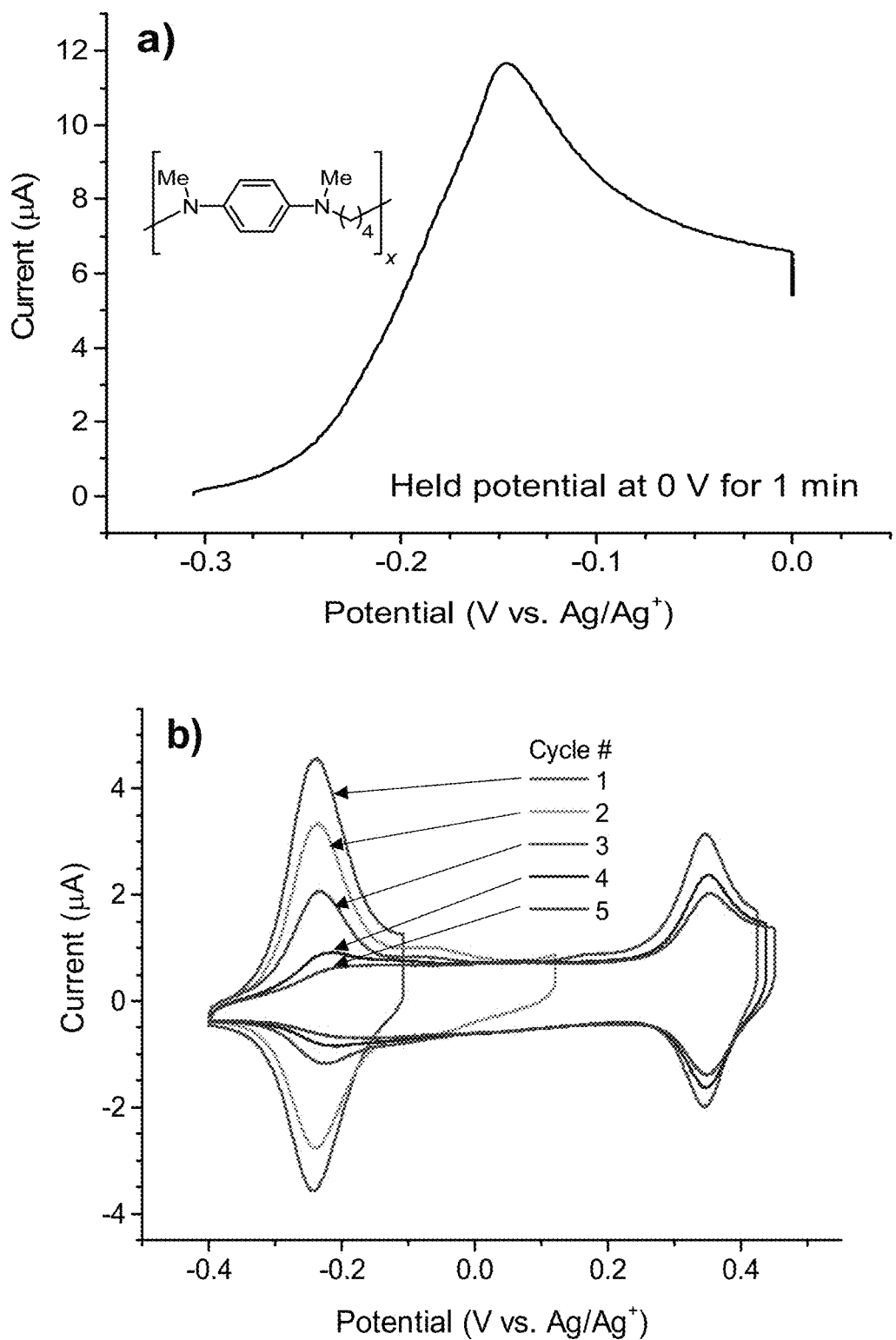
FIG. 24 shows (a) a polymer film of poly(1c-2a) was adsorbed onto GCE by holding the potential at 0 V for 1 minute in 4 mM concentration in repeat unit of poly(1c-2a) in 0.1 M [NBu$_4$][ClO$_4$]/CH$_2$Cl$_2$, after cycling to 0 V at 10 mV s$^{-1}$. (b) The CV of the modified electrode from (a) cycled in 0.1 M [NBu$_4$][ClO$_4$]/CH$_3$CN at 10 mV s$^{-1}$.
Figure 25:
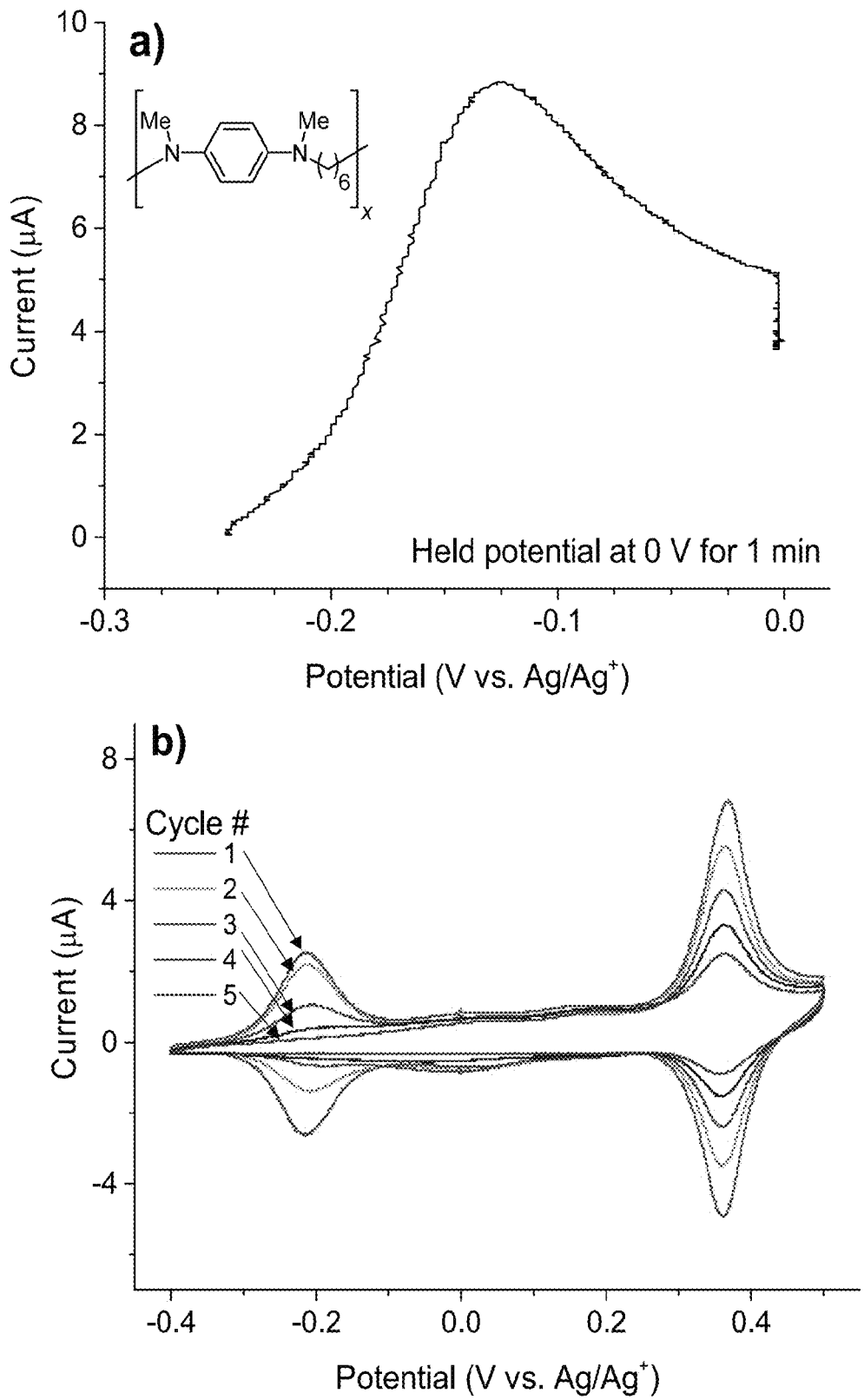
FIG. 25 shows (a) a polymer film of poly(1d-2a) was adsorbed onto GCE by holding the potential at 0 V for 1 minute in 4 mM concentration in repeat unit of poly(1d-2a) in 0.1 M [NBu$_4$][ClO$_4$]/CH$_2$Cl$_2$, after cycling to 0 V at 10 mV s$^{-1}$. (b) The CV of the modified electrode from (a) cycled in 0.1 M [NBu$_4$][ClO$_4$]/CH$_3$CN at 10 mV s$^{-1}$.

The electrochemical response of polymer films of poly (1d-2c) on GCE are dependent upon the electrolyte. As shown above, there is a clear potential shift for the first oxidation peak in acetonitrile upon initial cycling, and the first oxidation peak is broadened and flatter in 1,3-dioxolane:dimethoxyethane (DOL:DME, 1:1 v/v) (FIG. 22). However, when the polymer film was cycled in 0.1 M LiPF$_6$/tetraglyme (FIG. 29), the first oxidation wave is symmetrical and resembles the second oxidation peak. Optimizing the polymer-electrolyte interactions is critical to form a conformal film during deposition, and to have good cycling performance.

The CV of poly(1d-2d) shows two sharp reduction peaks, indicating that the polymer is adsorbed onto the electrode (FIG. 21). The polymer film was deposited onto GCE by cycling in the polymer solution for 5 CV cycles. The modified electrode was cycled around both redox couples in 0.1 M LiClO$_4$/tetraglyme at 20 mV s$^{-1}$ (FIG. 30b). The CVs show two redox couples. Unlike previous systems, the current for both redox processes did not diminish significantly with cycling. Furthermore, the polymer film did not trap charges after 5 cycles. The dihydrophenanthrene polymer is a potential cathode material due to its two redox processes and stable cycling.

The CV of poly(1d-2e) shows two sharp reduction peaks, indicating that the polymer is adsorbed onto the electrode (FIG. 21). The polymer film was deposited onto GCE by cycling in the polymer solution for 5 CV cycles. The modified electrode was cycled around both redox couples in 0.1 M LiClO$_4$/tetraglyme at 20 mV s$^{-1}$ (FIG. 31b). The CVs show two redox couples. Unlike previous systems, the current for both redox processes did not diminish significantly with cycling. Furthermore, the polymer film did not trap charges after 5 cycles. The dihydrophenanthrene polymer is a potential cathode material due to its two redox processes and stable cycling.

5. Differential Scanning Calorimetry Thermograms

TABLE 8

The polymer properties of poly(arylamine)s.

| Entry | $T_g{}^a$ (°C.) | $T_m{}^a$ (°C.) |
|---|---|---|
| Poly(1a-2a) | 45 | 179 |
| Poly(1b-2a) | 10 | n.a.$^b$ |
| Poly(1c-2a) | 42 | 1W |
| Poly(1d-2a) | 41 | 89 |
| Poly(1d-2b) | 43 | 137 |
| Poly(1d-2c) | 50 | 168 |
| Poy(1d-2d) | 78 | n.a.$^b$ |
| Poly(1d-2e) | 78 | n.a.$^b$ |

$^a$Determined by DSC.
$^b$Not applicable; no melting transition observed.

Poly(1a-2a) (Table 1, entry 1)

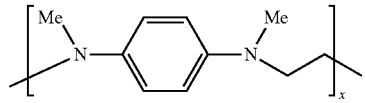

(See FIG. 32 for DSC thermogram)

Poly(1b-2a) (Table 1, entry 2)

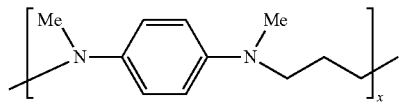

(See FIG. 33 for DSC thermogram)
Poly(1c-2a) (Table 1, entry 3)

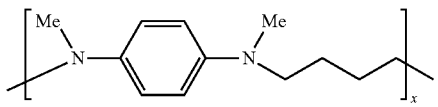

(See FIG. 34 for DSC thermogram)
Poly(1d-2a) (Table, entry 4)

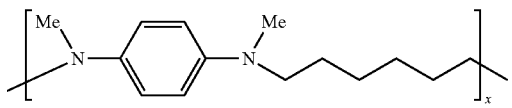

(See FIG. 35 for DSC thermogram)
Poly(1d-2b) (Table 2, entry 1)

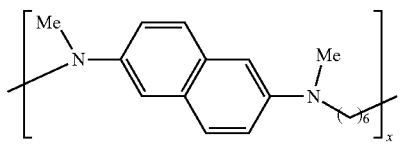

(See FIG. 36 for DSC thermogram)
Poly(1d-2c) (Table 2, entry 2)

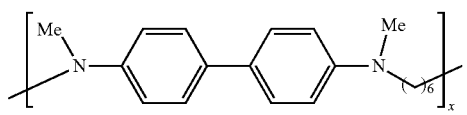

(See FIG. 37 for DSC thermogram)
Poly(1d-2d) (Table 1, entry 3)

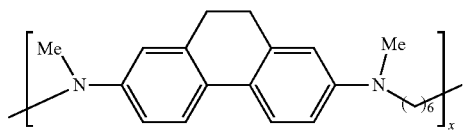

(See FIG. 38 for DSC thermogram)
This sample used the following heating program: −70° C. to 350° C. at 10° C./min, 350 to −70° C. at 10° C./min, and then −70° C. to 350° C. at 10° C./min.
Poly(1d-2e) (Table 1, entry 4)

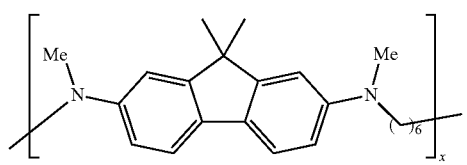

(See FIG. 39 for DSC thermogram)
This sample used the following heating program: −70° C. to 350° C. at 10° C./min, 350 to −70° C. at 10° C./min, and then −70° C. to 350° C. at 10° C./min.

6. $^1$H and $^{13}$C NMR Spectra of Poly(arylamines)
Poly(1a-2a) (Table 1, entry 1)
$^1$H NMR spectrum (CDCl$_3$, 400 MHz): δ 6.73 (s, 4H), 3.38 (s, 4H), 2.87 (s, 6H).
$^{13}$C NMR (CDCl$_3$, 125 MHz): δ 142.15, 115.06, 51.36, 39.73.
Poly(1b-2a) (Table 1, entry 2)
$^1$H NMR spectrum (CDCl$_3$, 400 MHz): δ 6.72 (s, 4H), 3.20 (t, 4H), 2.80 (s, 6H), 1.75-1.82 (p, 2H).
$^{13}$C NMR spectrum (125 MHz, CDCl$_3$): $^{13}$C NMR (CDCl$_3$, 125 MHz): δ 142.89, 115.85, 52.29, 39.54, 24.43.
Poly(1c-2a) (Table 1, entry 3)
$^1$H NMR spectrum (CDCl$_3$, 400 MHz): δ 6.72 (s, 4H), 3.16-3.21 (m, 4H), 2.81 (s, 6H), 1.53-1.58 (m, 4H).
$^{13}$C NMR (CDCl$_3$, 125 MHz): δ 142.60, 115.58, 54.45, 39.39, 24.64.
Poly(1d-2a) (Table 1, entry 4)
$^1$H NMR spectrum (CDCl$_3$, 400 MHz): δ 6.71 (s, 4H), 3.14 (t, 4H), 2.80 (s, 6H), 1.48-1.56 (m, 4H), 1.29-1.35 (m, 4H).
$^{13}$C NMR (CDCl$_3$, 125 MHz): δ 142.60, 115.50, 54.49, 39.40, 27.39, 26.84.
Poly(1d-2b) (Table 2, entry 1)
$^1$H NMR spectrum (CDCl$_3$, 400 MHz): δ 7.51 (d, 2H), 7.06 (m, 2H), 6.82 (d, 2H), 3.32 (t, 4H), 2.94 (s, 6H), 1.54-1.61 (m, 4H), 1.34-1.37 (m, 4H).
$^{13}$C NMR (CDCl$_3$, 125 MHz): δ 145.40, 128.48, 127.23, 117.50, 107.41, 53.74, 38.92, 27.33, 26.87.
Poly(1d-2c) (Table 1, entry 2)
$^1$H NMR spectrum (CDCl$_3$, 400 MHz): δ 7.42 (d, 4H), 6.73 (d, 4H), 3.32 (t, 4H), 2.94 (s, 6H), 1.58-1.63 (m, 4H), 1.36-1.40 (br s, 4H).
$^{13}$C NMR (CDCl$_3$, 125 MHz): δ 147.98, 129.30, 127.11, 112.61, 53.01, 38.57, 27.30, 26.90.
Poly(1d-2d) (Table 1, entry 3)
$^1$H NMR spectrum (C$_6$D6, 400 MHz): δ 7.79 (d, 2H), 6.73 (d, 2H), 6.66 (s, 2H), 2.16 (t, 4H), 2.01 (s, 4H), 2.71 (s, 6H), 1.44-1.49 (m, 4H), 1.13-1.17 (m, 4H).
$^{13}$C NMR (CDCl$_3$, 125 MHz): δ 148.31, 137.56, 128.06, 124.86, 124.04, 112.61, 111.89, 53.07, 38.44, 30.92, 27.43, 27.20.
Poly(1d-2e) (Table 2, entry 4)
$^1$H NMR spectrum (C$_6$D6, 400 MHz): δ 7.65 (d, 2H), 6.90 (s, 2H), 6.77 (d, 2H), 3.18 (t, 4H), 2.74 (s, 6H), 1.57 (s, 6H), 1.46-1.51 (m, 4H), 1.16-1.20 (br s, 4H).
$^{13}$C NMR (C$_6$D6, 125 MHz): δ 154.90, 148.97, 129.90, 119.88, 112.28, 107.52, 53.61, 47.08, 38.86, 28.37, 27.50, 27.32.

Example 3

This example provides a description of examples of synthesis and characterization of polymers of the present disclosure.

General Procedure for synthesis of Polymers: A flame dried reaction tube was equipped with a magnetic stir bar and charged with dibromophenothiazine (1 equivalent), an amine (1 equivalent), RuPhos ligand, Pd precatalyst, and sodium tertbutoxide. The reaction vessel was fitted with a Teflon screw cap and evacuated and backfilled three times with nitrogen. toluene was added via syringe and the reaction was stirred at 80° C. overnight. The mixture was allowed to cool to room temperature, and diluted into a 200 mL biphasic solution consisting of equal parts water and dichloromethane. The insoluble polymer was filtered off and Polymer 1

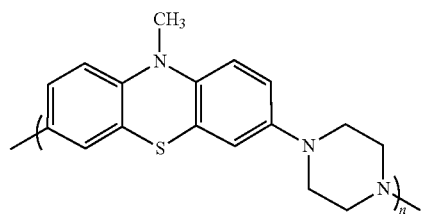

Synthesis of Polymer 1: A flame dried 10 mL reaction tube was equipped with a magnetic stir bar and charged with dibromophenothiazine (93 mg, 0.25 mmol), piperazine (21.5 mg, 0.25 mmol), 6 mol % RuPhos ligand (7.0 mg, 0.0075 mmol), 6 mol % RuPhos Pd G2 precatalyst (12 mg, 0.0075 mmol), and NaOt-Bu (36.0 mg, 0.375 mmol). Toluene (1 mL) was added via syringe, and the reaction was stirred at 80° C. overnight. The mixture was allowed to cool to room temperature, and diluted into a 200 mL biphasic solution consisting of equal parts water and dichloromethane. The insoluble polymer was filtered off and washed with an additional 25 mL of water and subsequently 25 mL of dichloromethane. The polymer was dried under vacuum, yielding 88 mg.

Polymer 2

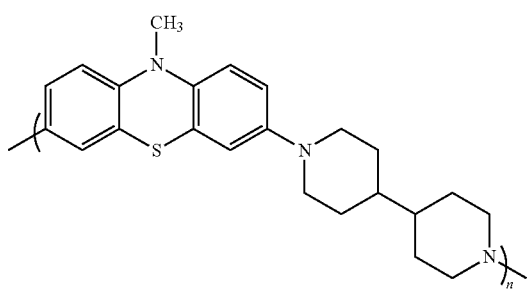

Synthesis of Polymer 2: A flame dried 30 mL reaction tube was equipped with a magnetic stir bar and charged with dibromophenothiazine (557 mg, 1.5 mmol), 4,4'-bipiperidine (234 mg, 1.5 mmol), 1 mol % RuPhos ligand (7.0 mg, 0.015 mmol), 1 mol % RuPhos Pd G2 precatalyst (13 mg, 0.015 mmol), and NaOt-Bu (370 mg, 3.75 mmol). Toluene (6 mL) was added via syringe and the reaction was stirred at 80° C. for 21.5 hours. The mixture was allowed to cool to room temperature, and diluted into a 200 mL biphasic solution consisting of equal parts water and dichloromethane. The insoluble polymer was filtered off and washed with an additional 25 mL of water and subsequently 25 mL of dichloromethane. The polymer was dried under vacuum, yielding 680 mg.

Polymer 3

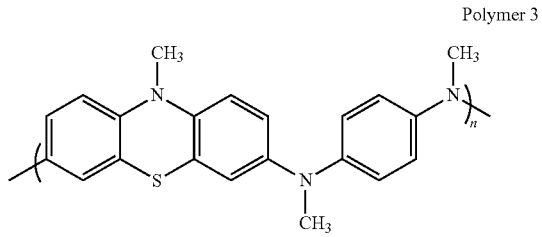

Synthesis of Polymer 3: A flame dried 30 mL reaction tube was equipped with a magnetic stir bar and charged with dibromophenothiazine (204 mg, 0.55 mmol), N,N'-dimethyl-paraphenylenediamine (75 mg, 0.55 mmol), 3 mol % RuPhos ligand (7.5 mg, 0.0165 mmol), 3 mol % RuPhos Pd G2 precatalyst (13 mg, 0.0165 mmol), and NaOt-Bu (170 mg, 1.65 mmol). Toluene (2 mL) was added via syringe and the reaction was stirred at 80° C. overnight. The mixture was allowed to cool to room temperature, and diluted into a 200 mL biphasic solution consisting of equal parts water and dichloromethane. The insoluble polymer was filtered off and washed with an additional 25 mL of water and subsequently 25 mL of dichloromethane. The polymer was dried under vacuum, yielding 128 mg.

Polymer 4

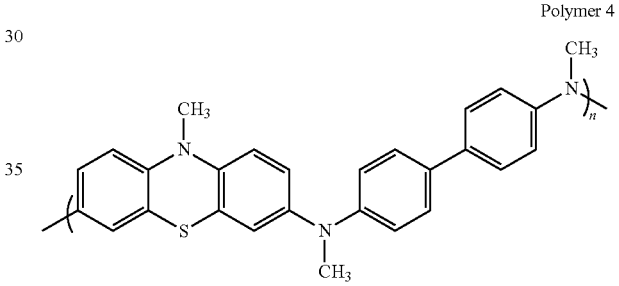

Synthesis of Polymer 4: A flame dried 30 mL reaction tube was equipped with a magnetic stir bar and charged with dibromophenothiazine (371 mg, 1 mmol), N,N'-dimethyl-4,4'-diaminobiphenyl (212 mg, 1 mmol), 1 mol % RuPhos ligand (6 mg, 0.01 mmol), 3 mol % RuPhos Pd G2 precatalyst (8 mg, 0.01 mmol), and NaOt-Bu (288 mg, 3 mmol). 3 mL toluene was added via syringe, and the reaction was heated to 80° C. and stirred for 10.5 hours. The mixture was allowed to cool to room temperature, and diluted into a 200 mL biphasic solution consisting of equal parts water and dichloromethane. The insoluble polymer was filtered off and washed with an additional 25 mL of water and subsequently 25 mL of dichloromethane. The polymer was dried under vacuum, yielding 515 mg.

Polymer 5

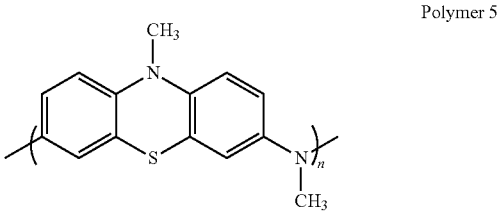

Synthesis of Polymer 5: A flame dried 10 mL reaction tube was equipped with a magnetic stir bar and charged with dibromophenothiazine (93 mg, 0.25 mmol), 3 mol % RuPhos ligand (4 mg, 0.0075 mmol), 3 mol % BrettPhos Pd G3 precatalyst (8 mg, 0.0075 mmol), and NaOt-Bu (60 mg, 0.625 mmol). 2 M methylamine in THF (125 μL, 0.25 mmol) and toluene (1 mL) was added via syringe. The reaction was stirred at 80° C. overnight. The mixture was allowed to cool to room temperature, and diluted into a 200 mL biphasic solution consisting of equal parts water and dichloromethane. The insoluble polymer was filtered off and washed with an additional 25 mL of water and subsequently 25 mL of dichloromethane. The polymer was dried under vacuum, yielding 72 mg.

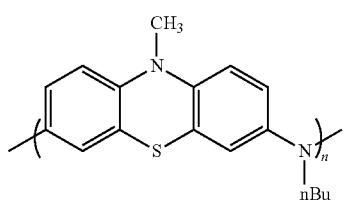

Polymer 6

Synthesis of Polymer 6: A flame dried 10 mL reaction tube was equipped with a magnetic stir bar and charged with dibromophenothiazine (93 mg, 0.25 mmol), 2 mol % RuPhos ligand (2 mg, 0.005 mmol), 2 mol % BrettPhos Pd G3 precatalyst (4.5 mg, 0.005 mmol), and NaOt-Bu (53 mg, 0.55 mmol). N-butylamine (24.5 μL, 0.25 mmol) and toluene (1 mL) was added via syringe and the reaction was stirred at 80° C. overnight. The mixture was allowed to cool to room temperature, diluted in dichloromethane, and washed with water. The product was concentrated in vacuo. The polymer was dissolved in dichloromethane and precipitated out of hexanes. The polymer was dried under vacuum, yielding 86 mg.

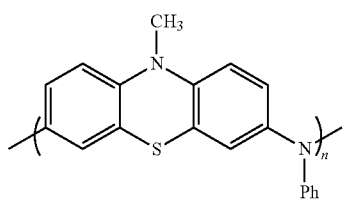

Polymer 7

Synthesis of Polymer 7: A flame dried 10 mL reaction tube was equipped with a magnetic stir bar and charged with dibromophenothiazine (93 mg, 0.25 mmol), 2 mol % RuPhos ligand (2 mg, 0.005 mmol), 2 mol % BrettPhos Pd G3 precatalyst (4.5 mg, 0.005 mmol), and NaOt-Bu (53 mg, 0.55 mmol). Aniline (23 μL, 0.25 mmol) and toluene (1 mL) was added via syringe and the reaction was stirred at 80° C. overnight. The reaction was allowed to cool to room temperature, and diluted into a 200 mL biphasic solution consisting of equal parts water and dichloromethane. The insoluble polymer was filtered off and washed with an additional 25 mL of water and subsequently 25 mL of dichloromethane. The polymer was dried under vacuum, yielding 91 mg.

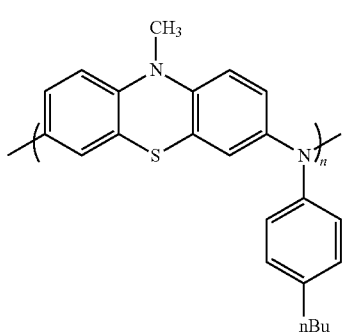

Polymer 8

Synthesis of Polymer 8: A flame dried 10 mL reaction tube was equipped with a magnetic stir bar and charged with dibromophenothiazine (93 mg, 0.25 mmol), 2 mol % RuPhos ligand (2 mg, 0.005 mmol), 2 mol % BrettPhos Pd G3 precatalyst (4.5 mg, 0.005 mmol), and NaOt-Bu (53 mg, 0.55 mmol). 4-butylaniline (39.5 μL, 0.25 mmol) and toluene (1 mL) was added via syringe and the reaction was stirred at 80° C. overnight. The mixture was allowed to cool to room temperature, diluted in dichloromethane, and washed with water. The product was concentrated in vacuo. The polymer was dissolved in dichloromethane and precipitated out of hexanes. The polymer was dried under vacuum, yielding 108 mg.

The polymers were characterized by cyclic voltammetry. Examples of CV plots are shown in FIGS. 41 to 52. The cyclic voltammetry was carried out as described in Example 1, with the exception of FIG. 41, which was carried out as described in Example 2.

The CV profiles exhibited discrete redox couples, scan rate dependence, and CV cycling/stability. Inherent/Internal conductivity of the polymers appear to be different based on the connecting units.

The invention claimed is:
1. A polymer comprising:

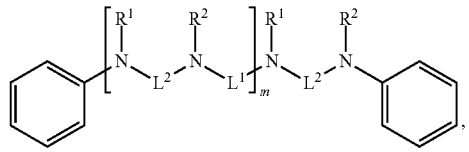

wherein
$R^1$ is independently, at each occurrence in the polymer, an alkyl group comprising 1 to 6 carbons;
$R^2$ is independently, at each occurrence in the polymer, an alkyl group comprising 1 to 6 carbons or an aryl group comprising 6 to 24 carbons;
$L^1$ is independently, at each occurrence in the polymer, an aryl moiety comprising 6 to 24 carbons, wherein the aryl moiety is completely aromatic or partially aromatic; or a heteroaryl moiety comprising 6 to 24 carbons, wherein the heteroaryl moiety is completely aromatic or partially aromatic;
$L^2$ is independently, at each occurrence in the polymer, an aliphatic moiety comprising 1 to 24 carbons; a heteroaryl moiety comprising 6 to 24 carbons, wherein the heteroaryl moiety is completely aromatic or partially aromatic; or a heteroalkyl branching moiety comprising one or more alkyl moiety comprising 1 to 24 carbons and one or more heteroatom; and m is an integer from 1 to 20,000.

2. The polymer of claim 1, wherein L¹ is:

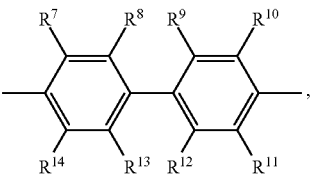

wherein $R^7$, $R^8$, $R^9$, $R^{10}$, $R^{11}$, $R^{12}$, $R^{13}$, and $R^{14}$ are individually at each occurrence in the polymer selected from hydrogen, alkyl groups comprising 1 to 6 carbons, halogen substituents, amines, ethers, and thioethers.

3. The polymer of claim 1, wherein the alkyl moiety is:

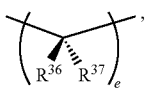

wherein $R^{36}$ and $R^{37}$ are individually at each occurrence in the polymer selected from hydrogen, and an alkyl group comprising 1 to 6 carbons; and e is an integer from 1 to 10.

4. The polymer of claim 1, wherein at each occurrence in the polymer the heteroalkyl branching moiety comprises a secondary nitrogen or a tertiary nitrogen.

5. The polymer of claim 1, wherein the heteroalkyl branching moiety is:

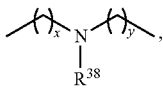

wherein x is individually at each occurrence in the polymer from 1 to 6;

y is individually at each occurrence in the polymer from 1 to 6; and $R^{38}$ is individually at each occurrence in the polymer selected from an alkyl group, an aryl group, and covalent linkage to different heteroalkyl branching moiety in the polymer.

6. The polymer of claim 5, wherein the polymer comprises one or more intrachain crosslink and/or one or more interchain crosslink.

7. The polymer of claim 1, wherein L¹ is:

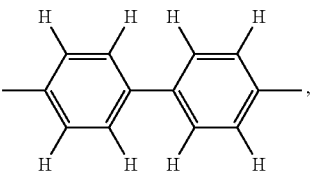

and

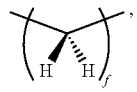

wherein f is an integer from 1 to 6.

8. An electrode comprising a film comprising a polymer having the following structure:

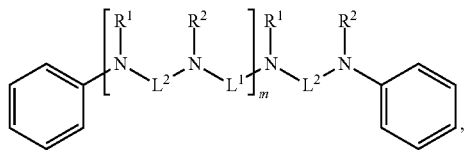

wherein $R^1$ is independently, at each occurrence in the polymer, an alkyl group comprising 1 to 6 carbons;

$R^2$ is independently, at each occurrence in the polymer, an alkyl group comprising 1 to 6 carbons or an aryl group comprising 6 to 24 carbons;

$L^1$ is independently, at each occurrence in the polymer, an aryl moiety comprising 6 to 24 carbons, wherein the aryl moiety is completely aromatic or partially aromatic; or a heteroaryl moiety comprising 6 to 24 carbons, wherein the heteroaryl moiety is completely aromatic or partially aromatic;

$L^2$ is independently, at each occurrence in the polymer, an aliphatic moiety comprising 1 to 24 carbons, a heteroaryl moiety comprising 6 to 24 carbons, wherein the heteroaryl moiety is completely aromatic or partially aromatic; or a heteroalkyl branching moiety comprising one or more alkyl moiety comprising 1 to 24 carbons and one or more heteroatom; and m is an integer from 1 to 20,000.

9. The electrode of claim 8, wherein the film is disposed on at least a portion of a substrate.

10. The electrode of claim 9, wherein the polymer is electropolymerized on the substrate.

11. The electrode of claim 10, wherein the substrate is a current collector.

12. A device comprising an electrode of claim 8.

13. The device of claim 12, wherein the device is an electrochemical energy storage (EES) system.

14. The device of claim 13, wherein the EES is a battery.

15. The device of claim 13, wherein the EES is a capacitor or battery-capacitor hybrid.

16. A capacitor or battery-capacitor hybrid comprising an electrode comprising a film comprising a polymer comprising:

(Structure I)

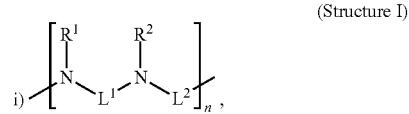

i)

wherein

R$^1$ and R$^2$ are is independently, at each occurrence in the polymer, an alkyl group comprising 1 to 6 carbons or an aryl group comprising 6 to 24 carbons;

L$^1$ is:

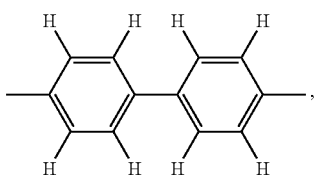

and

L$^2$ is:

wherein f is an integer from 1 to 6; and n is an integer from 1 to 20,000 or ii)

ii)

(Structure II)

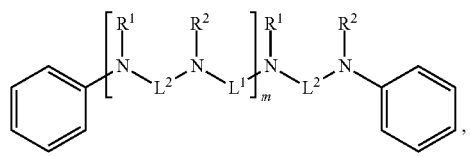

(Structure II), wherein

R$^1$ and R$^2$ are independently, at each occurrence in the polymer, an alkyl group comprising 1 to 6 carbons or an aryl group comprising 6 to 24 carbons;

L$^1$ is independently, at each occurrence in the polymer, an aryl moiety comprising 6 to 24 carbons, wherein the aryl moiety is completely aromatic or partially aromatic; or a heteroaryl moiety comprising 6 to 24 carbons, wherein the heteroaryl moiety is completely aromatic or partially aromatic;

L$^2$ is independently, at each occurrence in the polymer, an aliphatic moiety comprising 1 to 24 carbons; an aryl moiety comprising 6 to 24 carbons, wherein the aryl moiety is completely aromatic or partially aromatic; a heteroaryl moiety comprising 6 to 24 carbons, wherein the heteroaryl moiety is completely aromatic or partially aromatic; or a heteroalkyl branching moiety comprising one or more alkyl moiety comprising 1 to 24 carbons and one or more heteroatom; and m is an integer from 1 to 20,000.

17. The capacitor or battery-capacitor hybrid of claim 16, wherein the film is disposed on at least a portion of a substrate.

18. The capacitor or battery-capacitor hybrid of claim 17, wherein the polymer is electropolymerized on the substrate.

19. The capacitor or battery-capacitor hybrid of claim 18, wherein the substrate is a current collector.

20. A polymer comprising:

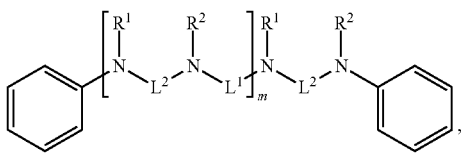

wherein m is 1 to 20,000;

R$^1$ and R$^2$ are independently, at each occurrence in the polymer, an alkyl group comprising 1 to 6 carbons or an aryl group comprising 6 to 24 carbons;

L$^1$ is:

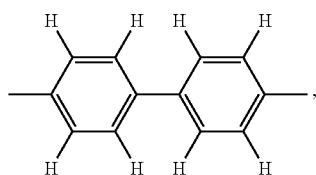

and

L$^2$ is:

wherein f is an integer from 1 to 6.

21. The electrode of claim 8, wherein the alkyl moiety is:

wherein R$^{36}$ and R$^{37}$ are individually at each occurrence in the polymer selected from hydrogen, and an alkyl group comprising 1 to 6 carbons; and e is an integer from 1 to 10.

22. The electrode of claim 8, wherein at each occurrence in the polymer the heteroalkyl branching moiety comprises a secondary nitrogen or a tertiary nitrogen.

23. The electrode of claim 8, wherein $L^1$ is:

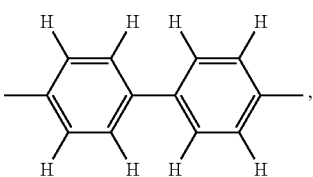

and
$L^2$ is:

wherein f is an integer from 1 to 6.

24. The electrode of claim 8, wherein the heteroalkyl branching moiety is:

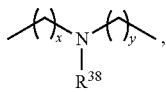

wherein x is individually at each occurrence in the polymer from 1 to 6;
y is individually at each occurrence in the polymer from 1 to 6; and
$R^{38}$ is individually at each occurrence in the polymer selected from an alkyl group, an aryl group, and covalent linkage to different heteroalkyl branching moiety in the polymer.

25. The electrode of claim 24, wherein the polymer comprises one or more intrachain crosslink and/or one or more interchain crosslink.

26. The capacitor or battery-capacitor hybrid of claim 16, wherein the alkyl moiety is:

wherein $R^{36}$ and $R^{37}$ are individually at each occurrence in the polymer selected from hydrogen, and an alkyl group comprising 1 to 6 carbons; and
e is an integer from 1 to 10.

27. The capacitor or battery-capacitor hybrid of claim 16, wherein at each occurrence in the polymer the heteroalkyl branching moiety comprises a secondary nitrogen or a tertiary nitrogen.

28. The capacitor or battery-capacitor hybrid of claim 16, wherein when the film comprises a polymer comprising Structure I, the polymer has the following structure:

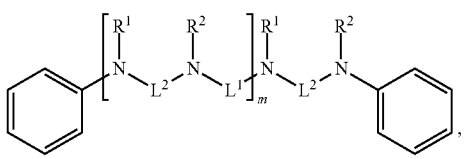

wherein m is 1 to 20,000.

29. The capacitor or battery-capacitor hybrid of claim 16, wherein when the film comprises a polymer comprising Structure II,
$L^1$ is:

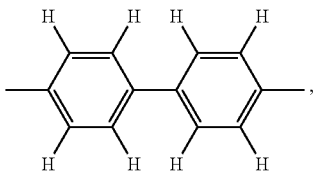

and
$L^2$ is:

wherein f is an integer from 1 to 6.

30. The capacitor or battery-capacitor hybrid of claim 16, wherein the heteroalkyl branching moiety is:

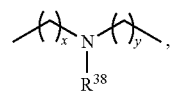

wherein x is individually at each occurrence in the polymer from 1 to 6;
y is individually at each occurrence in the polymer from 1 to 6; and
$R^{38}$ is individually at each occurrence in the polymer selected from an alkyl group, an aryl group, and covalent linkage to different heteroalkyl branching moiety in the polymer.

31. The capacitor or battery-capacitor hybrid of claim 30, wherein the polymer comprises one or more intrachain crosslink and/or one or more interchain crosslink.

* * * * *

UNITED STATES PATENT AND TRADEMARK OFFICE
CERTIFICATE OF CORRECTION

PATENT NO. : 11,034,796 B1
APPLICATION NO. : 15/231368
DATED : June 15, 2021
INVENTOR(S) : Thanh-Tam Truong et al.

It is certified that error appears in the above-identified patent and that said Letters Patent is hereby corrected as shown below:

In the Specification

Column No. 3, Line No. 35, "E'" should be -- E0' --
Column No. 4, Line No. 36, "poly(ad-)" should be -- poly(1d- --
Column No. 4, Line No. 52, "Vat" should be -- V at --
Column No. 4, Line No. 58, "Vat" should be -- V at --
Column No. 4, Line No. 62, "0.1M" should be -- 0.1 M --
Column No. 4, Line No. 67, "Vat" should be -- V at --
Column No. 5, Line No. 12 (approx.), "01.M" should be -- 0.1M --
Column No. 11, Line No. 47 (approx.), "L" should be -- L1 --
Column No. 15, Line No. 57, "R" should be -- R18, --
Column No. 20, Line No. 24, "-165" should be -- ~165 --
Column No. 21, Line No. 3, "-6+-couple" should be -- 6+• couple --
Column No. 21, Line No. 53, "m," should be -- µm, --
Column No. 22, Line No. 7, "tertbutoxide" should be -- tert-butoxide --
Column No. 26, Line No. 18, "mol)," should be -- µmol), --
Column No. 26, Line No. 40, "-N-" should be -- -N2- --
Column No. 26, Line No. 63, "-N-" should be -- N7 --
Column No. 27, Line No. 9 (approx.), "y-carbon" should be -- γ-carbon --
Column No. 27, Line No. 21, "m" should be -- µm --
Column No. 27, Line No. 21, "m" should be -- µm --
Column No. 27, Line No. 21, "m" should be -- µm --
Column No. 28, Line No. 9 (approx.), "Tis" should be -- T is --
Column No. 32, Line No. 58, "Li/Li)," should be -- Li/Li+), --
Column No. 33, Line No. 47, "tertbutoxide" should be -- tert-butoxide --
Column No. 34, Line No. 49 (approx.), "0.27M" should be -- 0.27 M --
Column No. 35, Line No. 19, "MW/" should be -- Mw/ --
Column No. 35, Line No. 36 (approx.), "d0.17M" should be -- d0.17 M --
Column No. 35, Line No. 37 (approx.), "e0.09M" should be -- e0.09 M --
Column No. 37, Line No. 14 (approx.), "0.01M" should be -- 0.01 M --

Signed and Sealed this
Twentieth Day of September, 2022

Katherine Kelly Vidal
*Director of the United States Patent and Trademark Office*

Column No. 37, Line No. 22, "m" should be -- μm --
Column No. 37, Line No. 22, "m" should be -- μm --
Column No. 37, Line No. 22, "m" should be -- μm --
Column No. 39, Line No. 10, "−750" should be -- ~750 --
Column No. 40, Line No. 42 (approx.), "1W" should be -- 110 --
Column No. 41, Line No. 11 (approx.), "(Table," should be -- (Table 1, --